US012724586B2

(12) United States Patent
Nguyen et al.

(10) Patent No.: US 12,724,586 B2
(45) Date of Patent: Sep. 1, 2026

(54) ELECTRONIC DEVICE INCLUDING NEURAL PROCESSING UNIT SUPPORTING DIFFERENT DATA TYPES AND METHOD FOR CONTROLLING THE SAME

(71) Applicant: SAMSUNG ELECTRONICS CO., LTD., Suwon-si (KR)

(72) Inventors: Duy Thanh Nguyen, Suwon-si (KR); Jin Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1069 days.

(21) Appl. No.: 17/877,149

(22) Filed: Jul. 29, 2022

(65) Prior Publication Data

US 2023/0123312 A1 Apr. 20, 2023

Related U.S. Application Data

(63) Continuation of application No. PCT/KR2022/009974, filed on Jul. 8, 2022.

(30) Foreign Application Priority Data

Oct. 18, 2021 (KR) ........................ 10-2021-0138723
Nov. 25, 2021 (KR) ........................ 10-2021-0164971

(51) Int. Cl.
*G06F 7/487* (2006.01)
*G06F 5/01* (2006.01)

(52) U.S. Cl.
CPC .............. *G06F 7/4876* (2013.01); *G06F 5/01* (2013.01); *G06F 2207/3824* (2013.01)

(58) Field of Classification Search
CPC ........... G06F 2207/3824; G06F 7/4876; G06F 7/523; G06F 5/00–012; G06F 7/22; G06F 7/32
See application file for complete search history.

(56) References Cited

U.S. PATENT DOCUMENTS 5,268,854 A * 12/1993 Ikumi ....................... G06F 7/57 708/508
7,805,478 B2 9/2010 Son
(Continued)

FOREIGN PATENT DOCUMENTS

CN 112860218 A 5/2021
JP H05128284 A 5/1993
(Continued)

OTHER PUBLICATIONS

International Search Report and Written Opinion for International Application No. PCT/KR2022/009974; International Filing Date Jul. 8, 2022; Date of Mailing Oct. 20, 2022; 9 Pages.
(Continued)

*Primary Examiner* — Emily E Larocque
(74) *Attorney, Agent, or Firm* — CANTOR COLBURN LLP

(57) ABSTRACT

An operational circuit may include a combiner to combine, based on a request for multiplication of integer numbers different from floating-point numbers, a first integer number and a second integer number. The operational circuit may include a multiplier including first and second ports. A third integer number may be inputted to the first port, and a fourth integer number indicating a combination of the first integer number and the second integer number may inputted to the second port. The operational circuit may include a converter to output, based on a fifth integer number indicating a multiplication of the third integer number and the fourth integer number from a third port of the multiplier, a sixth integer number indicating a multiplication of the first integer number and the third integer number, and a seventh integer number indicating a multiplication of the second integer number and the third integer number.

20 Claims, 21 Drawing Sheets

(56) References Cited

U.S. PATENT DOCUMENTS

| | | | | |
|---|---|---|---|---|
| 10,474,458 | B2 | 11/2019 | Kaul et al. | |
| 10,732,932 | B2 | 8/2020 | Pasca et al. | |
| 10,747,502 | B2 | 8/2020 | Pareek et al. | |
| 11,042,360 | B1 | 6/2021 | Clark et al. | |
| 2013/0036296 | A1* | 2/2013 | Hickey | G06F 9/3889 712/222 |
| 2018/0285727 | A1 | 10/2018 | Baum et al. | |
| 2019/0340489 | A1* | 11/2019 | Mills | G06N 3/045 |
| 2020/0327271 | A1* | 10/2020 | Langhammer | G06F 7/57 |
| 2021/0089390 | A1 | 3/2021 | Lee et al. | |
| 2021/0141857 | A1 | 5/2021 | Mathew et al. | |
| 2021/0312012 | A1 | 10/2021 | Kim et al. | |

FOREIGN PATENT DOCUMENTS

| | | | |
|---|---|---|---|
| JP | 4870932 | B2 | 11/2011 |
| KR | 20200129666 | A | 11/2020 |
| KR | 20210057158 | A | 5/2021 |
| KR | 20210124883 | A | 10/2021 |
| KR | 20210124888 | A | 10/2021 |

OTHER PUBLICATIONS

Efficient Fixed/Floating Point Merged Mixed-Precision Multiply-Accumulate Unit for Deep Learning Processors; H. Zhang, et al., 2018, pp. 1-5.

European Search Report corresponding to Application No. 22883719.1-1218; Dated Nov. 18, 2024.

* cited by examiner

ELECTRONIC DEVICE INCLUDING NEURAL PROCESSING UNIT SUPPORTING DIFFERENT DATA TYPES AND METHOD FOR CONTROLLING THE SAME

CROSS-REFERENCE TO RELATED APPLICATION(S)

This application is based on and claims priority under 35 U.S.C. § 120 to PCT International Application No. PCT/KR2022/009974, which was filed on Jul. 8, 2022, and claims priority to Korean Patent Application No. 10-2021-0138723 filed on Oct. 18, 2021, and Korean Patent Application No. 10-2021-0164971 filed on Nov. 25, 2021, in the Korean Intellectual Property Office, the disclosure of which are incorporated by reference herein their entirety.

BACKGROUND

Technical Field

The descriptions below relate to an electronic device including a neural processing unit (NPU) supporting different data types and methods for controlling the same.

Description of Related Art

With the development of electronic devices, technology development related to electronic devices equipped with artificial intelligence (AI) technology is in progress. An electronic device to which artificial intelligence technology is applied may learn and determine a surrounding situation by itself, independently of updates of instructions by external signals. As an electronic device to which artificial intelligence technology is applied actively learns and determines surrounding situations, it may be possible to automatically respond to situations that otherwise use human judgment based on the electronic device. In an electronic device equipped with artificial intelligence technology, hardware components for performing an operation specialized for artificial intelligence are being studied.

SUMMARY

A method for an electronic device to perform an operation related to artificial intelligence more efficiently may be required.

The technical problems to be achieved in this document are not limited to those described above, and other technical problems not mentioned herein will be clearly understood by those having ordinary knowledge in the art to which the present disclosure belongs, from the following description.

According to an embodiment, an electronic device may includes an operational circuit. The operational circuit may includes a combiner to combine, in response to receiving a request for performing multiplication based on a plurality of integer numbers of a second data type for indicating integers that is different from a first data type for indicating floating-point numbers, a first integer number and a second integer number among the plurality of integer numbers. The operational circuit may includes a multiplier to obtain a product of bits corresponding to mantissas of the floating-point numbers, where in the bits are distinguished by the first data type, and wherein a third integer number of the plurality of integer numbers is inputted to a first port of the multiplier, and a fourth integer number indicating a combination of the first integer number and the second integer number is inputted to a second port of the multiplier. The operational circuit may includes a converter to output, in response to identifying a fifth integer number indicating a multiplication of the third integer number and the fourth integer number from a third port of the multiplier that is different from the first port and the second port, a sixth integer number indicating a multiplication of the first integer number and the third integer number, and a seventh integer number indicating a multiplication of the second integer number and the third integer number, based on the identified fifth integer number.

According to an embodiment, a method may includes combining, in response to receiving a request for performing multiplication based on a plurality of integer numbers of a second data type for indicating integers that is different from a first data type for indicating floating-point numbers, a first integer number and a second integer number among the plurality of integer numbers. The method may includes transmitting, to a first port of a multiplier for obtaining a product of bits corresponding to mantissas of the floating-point numbers distinguished by the first data type, a third integer number of the plurality of integer numbers based on number of bits of the mantissas. The method may includes transmitting, in a state transmitting the third integer number to the first port, a fourth integer number indicating a combination of the first integer number and the second integer number to a second port of the multiplier different from the first port. The method may includes obtaining, in response to identifying a fifth integer number indicating a multiplication of the third integer number and the fourth integer number from a third port of the multiplier that is different from the first port and the second port of the multiplier, a sixth integer number indicating a multiplication of the first integer number and the third integer number, and a seventh integer number indicating a multiplication of the second integer number and the third integer number, based on the identified fifth integer number.

According to an embodiment, an electronic device may includes a first combiner to combine, in response to receiving a request for performing multiplication based on a plurality of integer numbers of a second data type for indicating integers that is different from a first data type for indicating floating-point numbers, a first integer number and a second integer number among the plurality of integer numbers. The electronic device may includes a second combiner to combine, in response to receiving the request, a third integer number and a fourth integer number among the plurality of integer numbers. The electronic device may includes a multiplier to obtain multiplication of bits corresponding to mantissas of the floating-point numbers distinguished by the first data type, wherein a fifth integer number indicating combination of the first integer number and the second integer number by the first combiner is inputted to a first port of the multiplier, and a sixth integer number indicating a combination of the third integer number and the fourth integer number by the second combiner. The electronic device may includes a converter to obtain, in response to identifying a seventh integer number indicating multiplication of the fifth integer number and the sixth integer number from a third port different from the first port and the second port of the multiplier, based on the seventh integer number, multiplication of one of the first integer number and the second integer number, and one of the third integer number or the fourth integer number.

According to an embodiment, a method of electronic device may includes, in response to receiving a request for performing multiplication based on a plurality of integer numbers of a second data type for indicating integers that is different from a first data type for indicating floating-point numbers, combining a first integer number and a second integer number among the plurality of integer numbers. The method may includes, in response to receiving the request, combining a third integer number and a fourth integer number among the plurality of integer numbers. The method may includes inputting each of the fifth integer number indicating a combination of the first integer number and the second integer number and the sixth integer number indicating a combination of the third integer number and the fourth integer number into a first port and a second port of a multiplier for obtaining a product of bits corresponding to mantissas of the floating-point numbers distinguished by the first data type. The method may includes, in response to identifying a seventh integer number indicating multiplication of the fifth integer number and the sixth integer number from a third port different from the first port and the second port of the multiplier, based on the seventh integer number, obtaining multiplication of one of the first integer number or the second integer number, and one of the third integer number or the fourth integer number.

According to an embodiment, an electronic device may includes a processor; a memory; and a neural processing unit comprising a neural engine for training a neural network having a plurality of layers, the neural engine includes: an accumulation circuit; and an operational circuit comprising a combiner, a multiplier, an adder, and a converter, the converter comprising a bit selector, a bit adjuster, a switch, and a shift register; and a controller. The controller may accumulate and store, in the accumulation circuit, numerical values output from different channels of the operational circuit to calculate a weighted sum corresponding to nodes included in a specific layer of the neural network. The controller may selectively activates at least one of the combiner, the adder, the bit selector, or the bit adjuster based at least in part on an operating state.

BRIEF DESCRIPTION OF THE DRAWINGS

Figure 11:
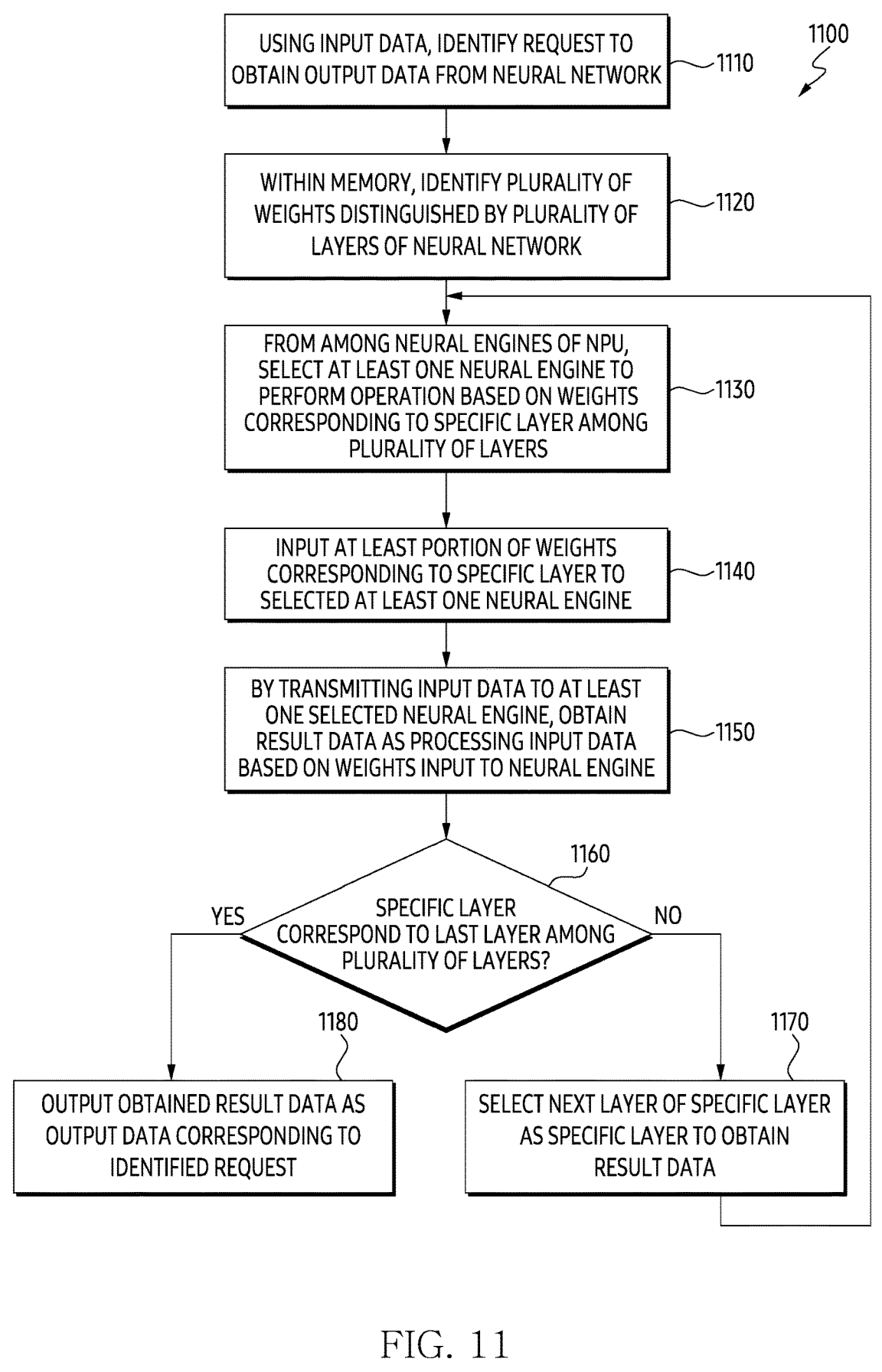

FIG. 11 is a flowchart for explaining an operation of an electronic device according to an embodiment processing input data based on a neural network.

Figure 13:
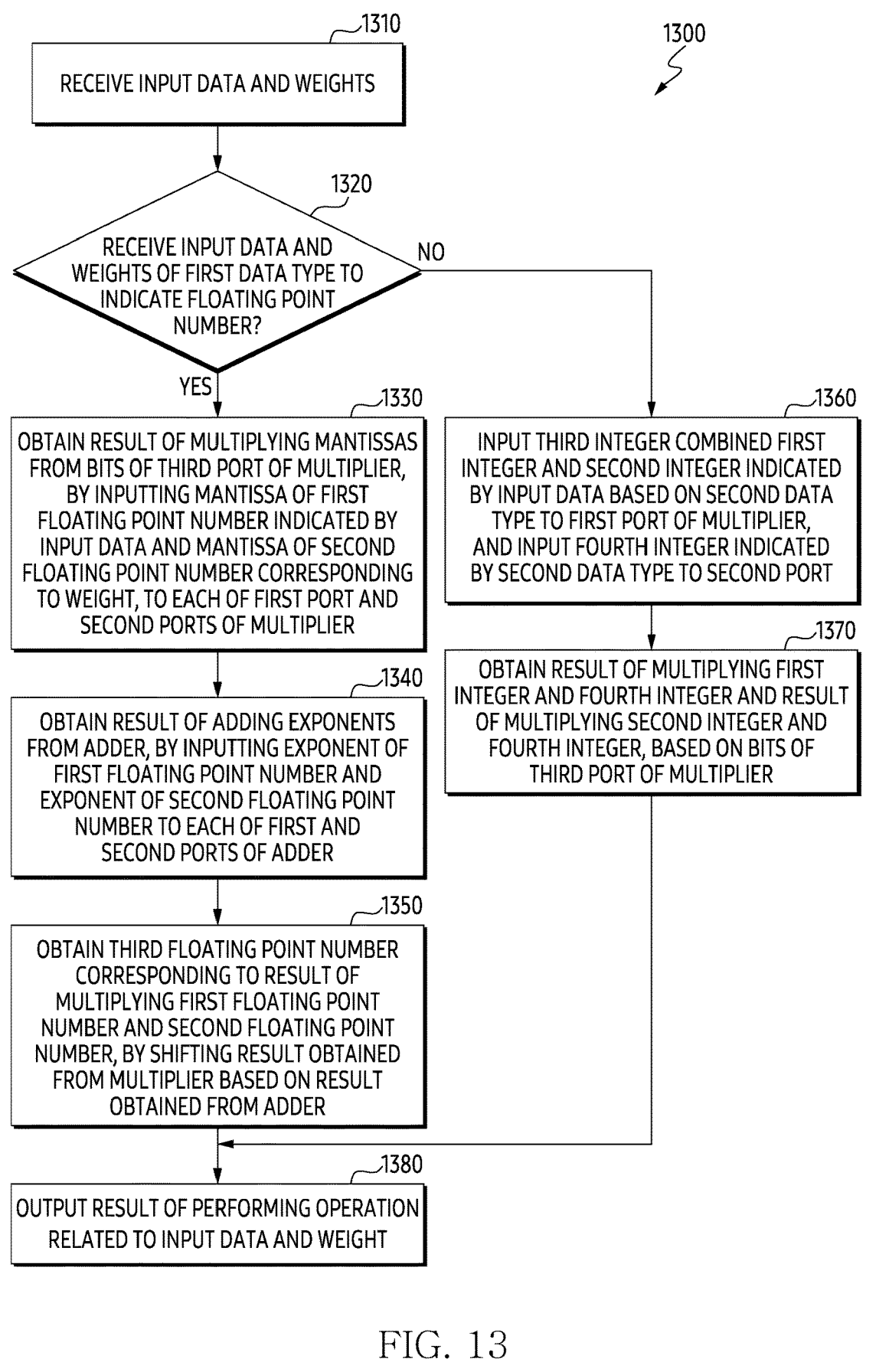

FIG. 13 is a flowchart for explaining an operation in which an electronic device according to an embodiment performs an operation based on different data types.

MODE FOR INVENTION

Figure 1:
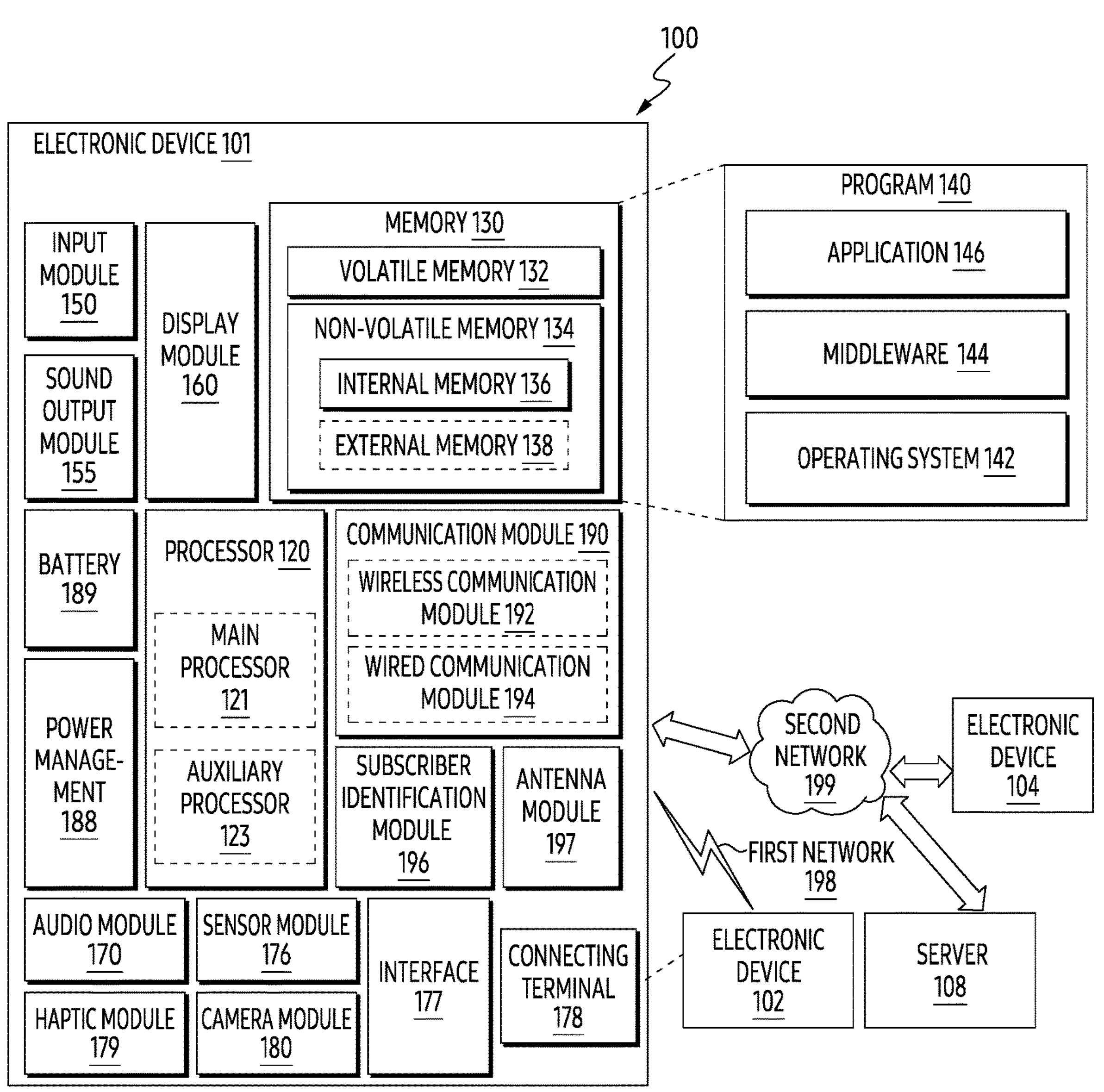
FIG. 1 is a block diagram of an electronic device in a network environment, according to various embodiments.

Hereinafter, various embodiments of the present document will be described with reference to the accompanying drawings.

The electronic device according to an embodiment can more efficiently perform operations related to artificial intelligence.

The various embodiments and terms used herein are not intended to limit the technical features described herein to specific embodiments and should be understood to include various modifications, equivalents, or substitutes of the embodiment. With respect to the description of the drawings, similar reference numerals may be used for similar components. A singular expression may include multiple expressions unless the context clearly indicates otherwise. In this document, expressions such as “A or B”, “At least one of A and/or B”, “A, B or C”, or “At least one of A, B and/or C” may include all possible combinations of listed items together. Expressions such as “the first”, “the second”, “first”, or “second” may modify the corresponding components regardless of order or importance and be used to distinguish one component from another and do not limit the components. When some component (e.g., the first) is referred to as “coupled” or “connected” to another component (e.g., the second) (functionally or communicatively), The one component may be directly connected to the other component or may be connected through another component (e.g., a third component).

The term “module” used in various embodiments of the present document may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150 or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
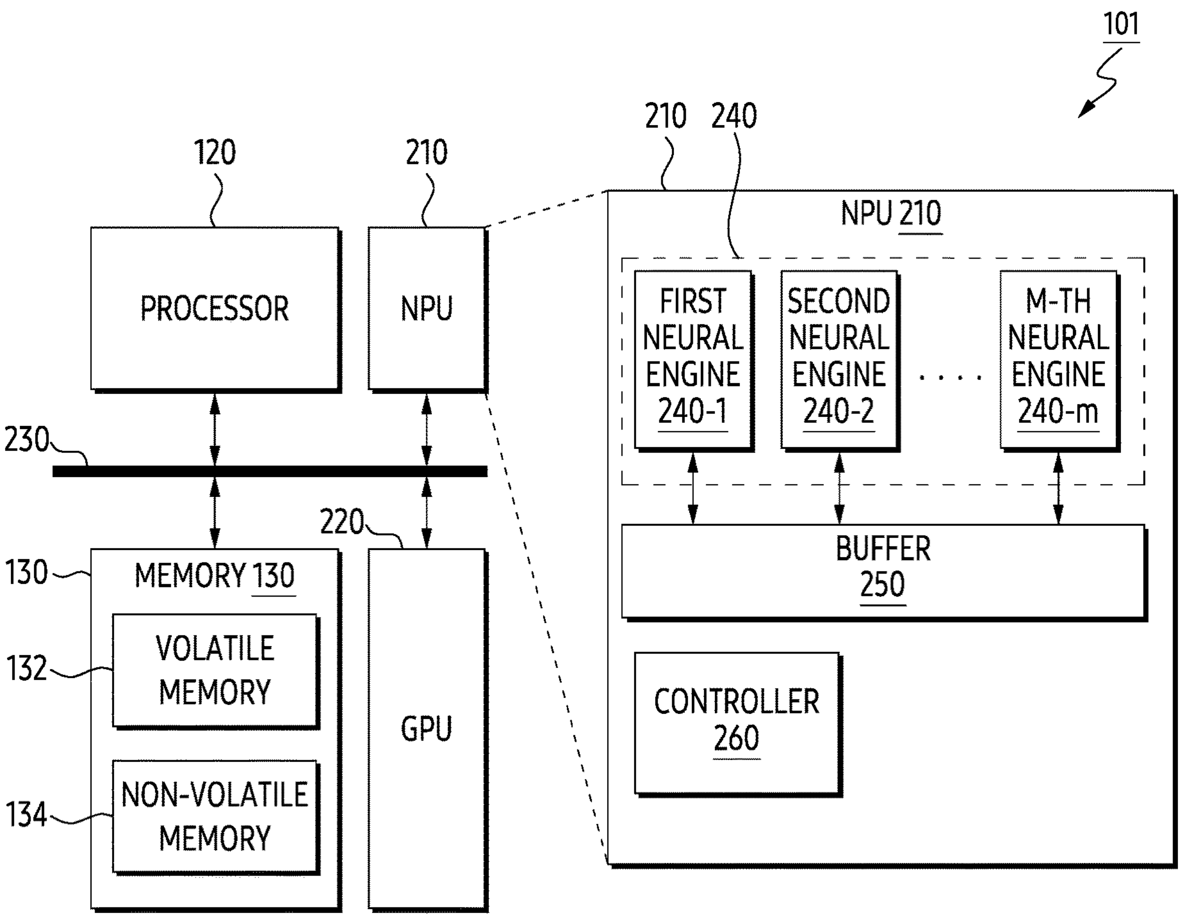
FIG. 2 is a block diagram for explaining one or more processors included in an electronic device according to an embodiment.

FIG. 2 is a block diagram for explaining one or more processors included in an electronic device according to an embodiment. The electronic device 101 of FIG. 2 may correspond to the electronic device 101 of FIG. 1.

Referring to FIG. 2, the electronic device 101 according to an embodiment may include at least one of a processor 120, the NPU 210, a GPU 220, and a memory 130. The processor 120, the NPU 210, the GPU 220, and the memory 130 may be electrically and/or operatively coupled with each other by electronic components such as a communication bus 230. The type and/or number of hardware components included in the electronic device 101 are not limited to FIG. 2, and for example, the electronic device 101 may further include the display module 160 and the communication module 190 of FIG. 1.

The processor 120 of the electronic device 101 according to an embodiment may include a hardware component for processing data based on one or more instructions. Hardware components for processing data may include, for example, an arithmetic and logic unit (ALU), a floating point unit (FPU), and/or a field programmable gate array (FPGA). In an embodiment, the processor 120 may be referred to as application processor (AP). The number of processors 120 may be one or more. For example, the processor 120 may have a structure of a multi-core processor such as a dual core, a quad core, or a hexacore. The processor 120 of FIG. 2 may correspond to an example of the processor 120 and/or the main processor 121 of FIG. 1.

The GPU 220 of the electronic device 101 according to an embodiment may include one or more pipelines for performing a plurality of operations for executing instructions related to computer graphics. For example, the pipeline of the GPU 220 may generate a 3D image, and the GPU 220 may include a graphics pipeline or a rendering pipeline for generating a 2D raster image from the generated 3D image. The graphics pipeline may be included in a file stored in the memory 130 and controlled based on a code written in a shading language. For example, the code written in the shading language may be compiled by the processor 120 into instructions executable in the GPU 220.

The NPU 210 of the electronic device 101 according to an embodiment may include a hardware component for supporting one or more functions based on a neural network. The neural network is a cognitive model implemented in software or hardware that mimics the computational power of a biological system using a large number of artificial neurons (or nodes). For example, the electronic device 101 according to an embodiment may execute functions similar to a human cognitive action or a learning process based on a neural network. In an embodiment, one or more functions based on the neural network supported by NPU 210 may include: a function of training neural networks; a function of performing image recognition, voice recognition, and/or handwriting recognition using the trained neural networks; a function personalized to a user of the electronic device 101 based on the neural network; a function to control a neural network based on an application using an application programming interface (API).

Each of the processor 120, the NPU 210, and the GPU 220 of FIG. 2 may be included as different integrated circuits in the electronic device 101 or may be included in a single IC based on a SoC (System on chip). For example, the processor 120, the NPU 210, the GPU 220, or a combination thereof may be included in a single integrated circuit included in the electronic device 101. The type of processing unit included based on the SoC is not limited to the above example, and for example, another hardware component (e.g., a communication processor) not shown in FIG. 2 may be included in a single integrated circuit together with the processor 120, the NPU 210, and the GPU 220.

A memory 130 of the electronic device 101 according to an embodiment may include a hardware component for storing data and/or instructions input and/or output to the processor 120, the NPU 210, and/or the GPU 220. The memory 130 may include, for example, a volatile memory 132 such as a random-access memory (RAM) and/or a non-volatile memory 134 such as a read-only memory (ROM). The volatile memory 132 may include, for example, at least one of dynamic RAM (DRAM), static RAM (SRAM), cache RAM, and pseudo RAM (PSRAM). The nonvolatile memory 134 may include, for example, at least one of a programmable ROM (PROM), an erasable PROM (EPROM), an electrically erasable PROM (EEPROM), flash memory, hard disk, compact disk, and embedded multimedia card (eMMC). The memory 130, the volatile memory 132, and the nonvolatile memory 134 of FIG. 2 may correspond to the memory 130, the volatile memory 132, and the nonvolatile memory 134 of FIG. 1, respectively.

A set of parameters indicating a neural network to be processed by the NPU 210 may be stored in the memory 130 of the electronic device 101 according to an embodiment. Parameters indicating a neural network may indicate, for example, a plurality of nodes included in the neural network, a weight assigned to a connection between the plurality of nodes, a number of layers of the neural network, a bias, and/or the like, including combinations and/or multiples thereof. A structure of the neural network indicated by the set of parameters stored in the memory 130 of the electronic device 101 according to an embodiment will be described later with reference to FIG. 3.

Referring to FIG. 2, one or more hardware components included in the NPU 210 of the electronic device 101 according to an embodiment are illustrated. For example, the NPU 210 may include a neural engine 240, a buffer 250, and/or a controller 260. Although not shown, the neural engine 240, the buffer 250, and the controller 260 may be electrically and/or operatively connected to each other by an electronic device such as a communication bus.

The neural engine 240 of the NPU 210 according to an embodiment may include a circuit for performing an operation required to execute a function related to the neural network. An exemplary structure of the neural engine 240 will be described later with reference to FIGS. 4A to 4B. Referring to FIG. 2, the number of neural engines 240 included in the NPU 210 may be one or more, as in the first neural engine 240-1 to the m-th neural engine **240-*m* of FIG. 2**.

The buffer 250 of the NPU 210 according to an embodiment may be connected to the neural engine 240, and store one or more numeric values to be input to the neural engine 240 to perform an operation of the neural engine 240, or one or more numeric values output from the neural engine 240 at least temporarily. Referring to FIG. 2, one or more neural engines included in the neural engine 240 may share the buffer 250 of the neural engine 240.

The controller 260 of the NPU 210 according to an embodiment may control an operation based on the neural engine 240 included in the NPU 210. For example, in response to receiving a request from processor 120 to execute a function based on a neural network, the controller 260 may obtain one or more parameters indicating the neural network from the memory 130. The controller 260 may input one or more obtained parameters to at least one of the neural engines included in the NPU 210. The controller 260 may control execution of an operation based on parameters input to at least one of the neural engines. An operation of the controller 260 of the NPU 210 according to an embodiment will be described later with reference to FIG. 11.

In an embodiment, the neural engine 240 may include a circuit for performing binary arithmetic operation between a plurality of numerical values. The binary arithmetic operation may include an addition operation, a subtraction operation, a multiplication operation, and/or a division operation based on bits indicating each of the plurality of numerical values.

The electronic device 101 according to an embodiment may identify a specific numerical value from one or more bits based on a plurality of data types. The data type is a predetermined category for interpretation of one or more bits by the electronic device 101. For example, the electronic device 101 may interpret a set of one or more bits based on a data type corresponding to the set, and identify data indicated by the set. For example, when the electronic device 101 stores one or more bits indicating a specific numerical value in the memory 130, the number of bits corresponding to the specific numerical value may be differentiated according to the data type.

The neural engine 240 of the NPU 210 according to an embodiment may support binary arithmetic operations for each of a plurality of data types. As the neural engine 240 supports binary arithmetic operations of a plurality of data types, the buffer 250 may be managed more efficiently. Hereinafter, a plurality of data types may have different precisions. As the neural engine 240 of the NPU 210 according to an embodiment supports binary arithmetic operations of a plurality of data types, the neural engine 240 may support binary arithmetic operations of a plurality of precisions.

As described above, as a circuit included in the neural engine 240 and the neural engine 240 of the NPU 210 according to an embodiment supports performing a binary arithmetic operation based on a plurality of data types, the buffer 250 of the NPU 210 and the memory 130 of the electronic device 101 may be more efficiently managed. For example, the size of data exchanged between the NPU 210 and the memory 130 may be differentiated according to a plurality of data types supported by the neural engine 240. As the sizes of the data are differentiated, the bandwidth of the memory 130 may be more efficiently managed.

Hereinafter, referring to FIG. 3, an example of a neural network identified based on the NPU 210 by the electronic device 101 according to an embodiment will be described.

Figure 3:
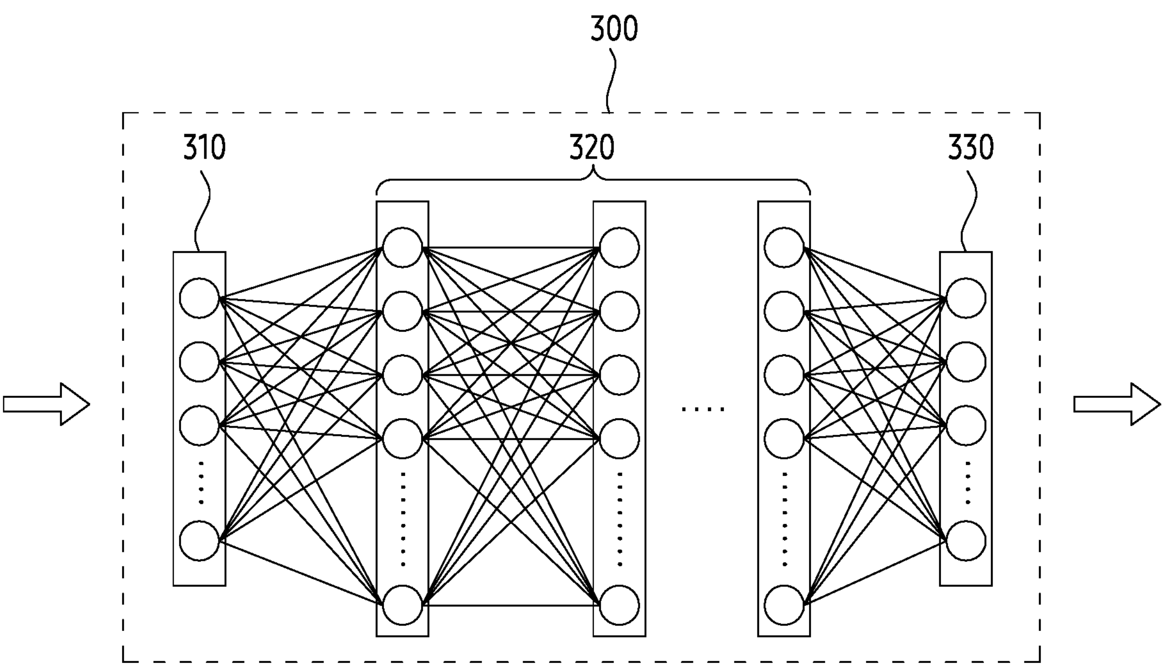
FIG. 3 is an exemplary diagram for explaining a neural network executed in an electronic device according to an embodiment.

FIG. 3 is an exemplary diagram for explaining a neural network 300 executed in an electronic device according to an embodiment. The electronic device of FIG. 3 may correspond to an example of the electronic device 101 of FIGS. 1 and/or 2. For example, the neural network 300 of FIG. 3 may be obtained from a set of parameters stored in a memory (e.g., the memory 130 of FIG. 1 and/or FIG. 2) by an electronic device according to an embodiment.

Referring to FIG. 3, the neural network 300 may include a plurality of layers. For example, the neural network 300 may include an input layer 310, one or more hidden layers 320, and an output layer 330. The input layer 310 may correspond to a vector and/or matrix indicating input data of the neural network 300. For example, the vector indicating the input data may have elements corresponding to the number of nodes included in the input layer 310. For example, the elements included in the matrix indicating the input data may correspond to each of the nodes included in the input layer 310. Signals generated by each of the nodes in the input layer 310 generated by the input data may be transmitted from the input layer 310 to the hidden layers 320. The output layer 330 may generate output data of the neural network 300 based on one or more signals received from the hidden layers 320. The output data may correspond to, for example, a vector and/or a matrix that has elements corresponding to the number of nodes included in the output layer 330.

In an embodiment, first nodes included in a specific layer among a plurality of layers included in the neural network 300 may correspond to at least one weighted sum of second nodes of the previous layer of the specific layer within the sequence of the plurality of layers. The electronic device 101 according to an embodiment may identify a weight to be applied to at least one of the second nodes from a set of parameters stored in a memory. Training the neural network 300 may include an operation of changing and/or determining one or more weights related to the weighted sum.

Referring to FIG. 3, one or more hidden layers 320 may be positioned between the input layer 310 and the output layer 330 and may convert input data transmitted through the input layer 310 into an easily predictable value. The input layer 310, one or more hidden layers 320, and the output layer 330 may include a plurality of nodes. The one or more hidden layers 320 may be a convolution filter in a convolutional neural network (CNN) or fully connected layer or may be various types of filters or layers grouped based on special functions or features. In an embodiment, one or more hidden layers 320 may be layers based on a recurrent neural network (RNN) in which an output value re-input into the hidden layer of a current time. The neural network 300 according to an embodiment may include numerous hidden layers 320 to form a deep neural network. Training a deep neural network is called deep learning. Among the nodes of the neural network 300, a node included in the hidden layers 320 is referred to as a hidden node.

The nodes included in the input layer 310 and the one or more hidden layers 320 may be connected to each other through a connection line having a connection weight, and the nodes included in the hidden layer and the output layer may also be connected to each other through a connection line having a connection weight. Tuning and/or training the neural network 300 may mean changing the connection weight between nodes included in each of the layers (e.g., the input layer 310, one or more hidden layers 320, and the output layer 330) included in the neural network 300. For example, tuning of the neural network 300 may be performed based on supervised learning and/or unsupervised learning.

The electronic device according to an embodiment may tune the neural network 300 based on reinforcement learning in unsupervised learning. For example, the electronic device may change policy information used by the neural network 300 to control an agent based on interaction between the agent and the environment. As an example, the agent takes an action within the environment, and the agent learns from that action by receiving a reward, based on that action, generated using a reward function. The electronic device according to an embodiment may cause a change in the policy information by the neural network 300 in order to maximize the target and/or compensation of the agent by the interaction.

For example, in a state of obtaining the neural network 300 using the NPU 210 of FIG. 2, the electronic device according to an embodiment may identify a weight corresponding to a connection line connecting the input layer 310 stored in the memory, one or more hidden layers 320, and/or the output layer 330. In order to obtain output data from the neural network 300 based on the identified weight, the electronic device may sequentially obtain a weighted sum based on the connection line along a plurality of layers (e.g., the input layer 310, the one or more hidden layers 320, and the output layer 330) of the neural network 300. The obtained weighted sum may be stored in the buffer 250 and/or the memory 130 of FIG. 2. For example, as the weighted sum is sequentially obtained along a plurality of layers, the electronic device may repeatedly update the weighted sum stored in the memory.

Each of a plurality of layers of the neural network 300 may have an independent data type and/or precision. For example, when connection lines between the first layer and the second layer among a plurality of layers have weights based on a first data type for indicating a floating-point number, the electronic device may obtain weighted sums based on the first data type from numerical values corresponding to the nodes of the first layer and the weights. In the above example, when connection lines between the second layer and the third layer among a plurality of layers have weights based on a second data type for indicating an integer number, the electronic device may obtain weighted sums based on the second data type from the obtained weighted sums and weights based on the second data type.

For example, when a plurality of layers has different data types, the electronic device according to an embodiment may obtain weighted sums corresponding to each of the plurality of layers based on different data types using the NPU 210 of FIG. 2. As the electronic device accesses the memory based on the weighted sums obtained based on different data types, the bandwidth of the memory may be used more efficiently. As the bandwidth of the memory is more efficiently used, the electronic device according to an embodiment may more quickly obtain output data from the neural network 300 based on the plurality of layers.

The electronic device according to an embodiment may store sets of parameters indicating each of a plurality of neural networks having different precision. For example, a neural network related to super resolution for upscaling images and/or videos may request precision of a data type (e.g., half-precision floating point format defined by IEEE 754) to indicate a floating-point number based on 16 bits. For example, a neural network for recognizing a subject included in an image and/or video may use precision of a data type to indicate an integer number based on 8 bits and/or 4 bits. For example, a neural network for performing handwriting recognition may use precision of a data type for indicating an integer number based on the first bits and/or the second bits. The electronic device according to an embodiment may perform an operation for obtaining a weighted sum based on different precision corresponding to each of a plurality of neural networks.

Hereinafter, an operation in which the electronic device according to an embodiment obtains the weighted sum will be described in detail with reference to FIGS. 4A to 4B.

Figure 4A:
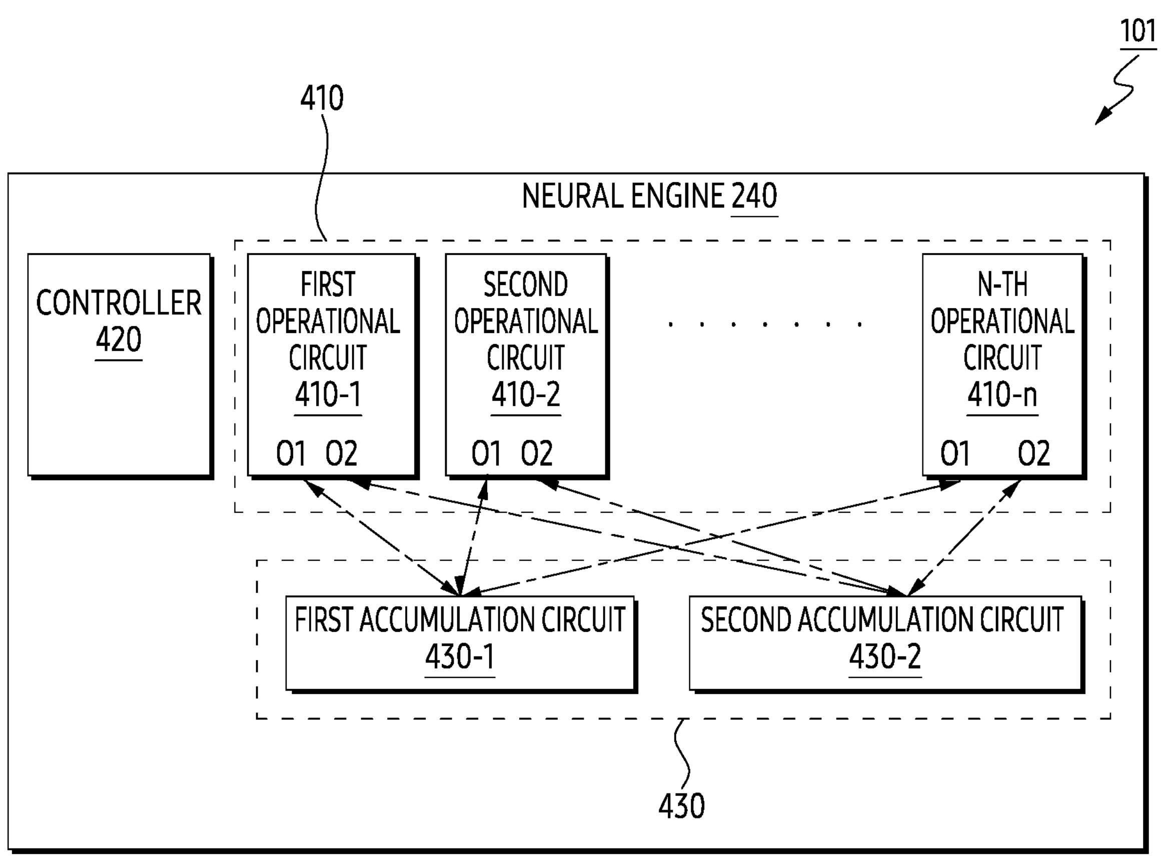
FIGS. 4A to 4B are exemplary block diagrams for explaining a structure of a circuit for performing an operation related to a neural network by an electronic device according to an embodiment.
Figure 4B:
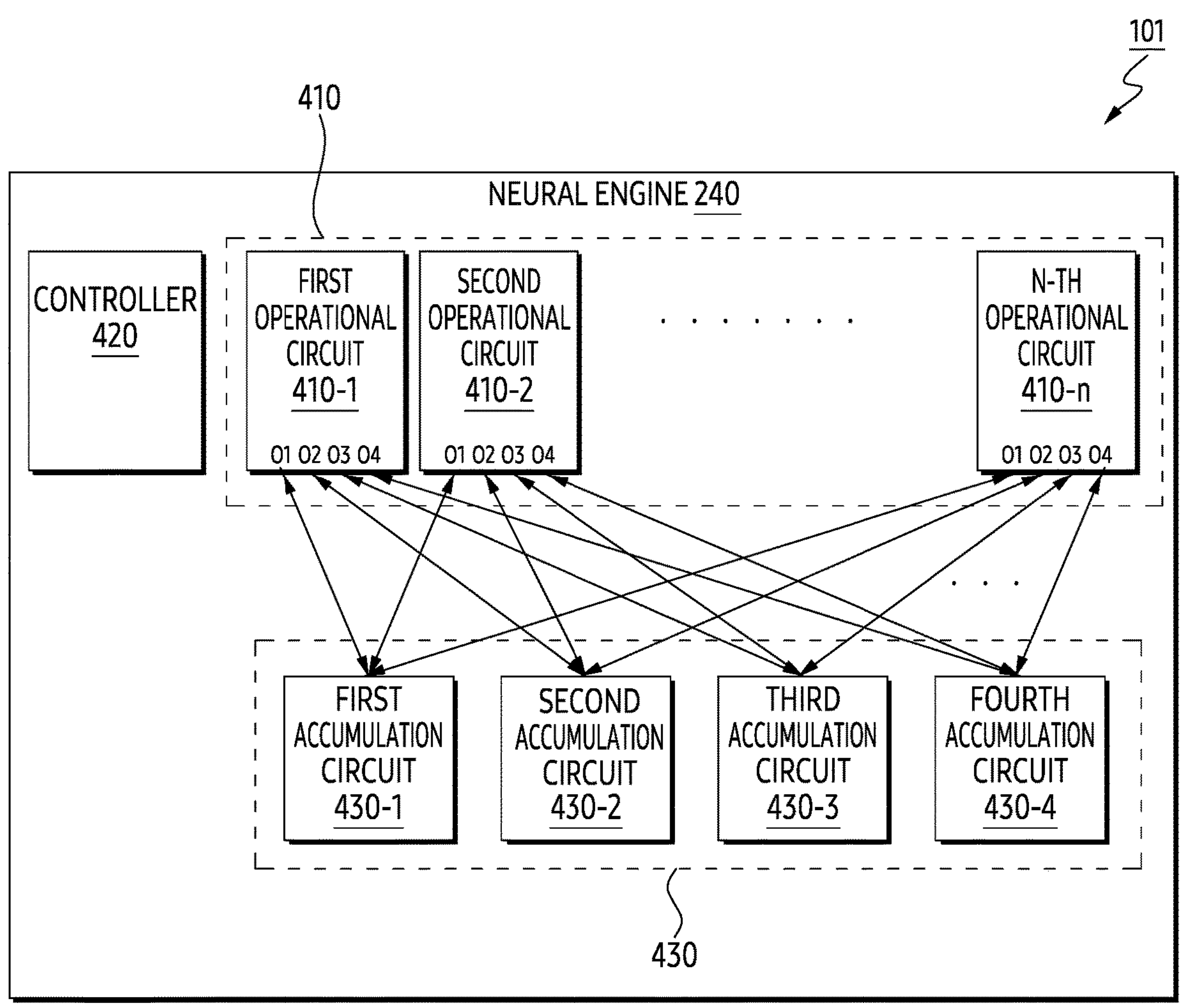

FIGS. 4A to 4B are exemplary block diagrams for explaining a structure of a circuit for performing an operation related to a neural network by an electronic device according to an embodiment. The electronic device 101 of FIGS. 4A to 4B may correspond to the electronic device 101 of FIGS. 1 to 2 and/or an example of the electronic device of FIG. 3. For example, the neural engine 240 of FIGS. 4A to 4B may correspond to the neural engine 240 of FIG. 2.

Referring to FIGS. 4A to 4B, the neural engine 240 of the electronic device 101 according to an embodiment may include an operational circuit 410, a controller 420, and/or an accumulation circuit 430. The number of operational circuit 410 and/or accumulation circuits 430 included in the neural engine 240 may be one or more. Referring to FIGS. 4A to 4B, an example in which the neural engine 240 includes "n" operational circuits (a first operational circuit 410-1 to an n-th operational circuit **410-*n*, inclusive of a second operational circuit 410-2**) is illustrated.

The neural engine 240 of the electronic device 101 according to an embodiment may receive one or more data sets corresponding to the neural engine 240 along channels corresponding to the number of operational circuits included in the neural engine 240. The data set received by the neural engine 240 may include elements corresponding to the number of channels. The elements may correspond to numerical values indicated based on one of a plurality of data types supported by the neural engine 240. For example, the data set received by the neural engine 240 may include numerical values allocated to each node of a specific layer among a plurality of layers of the neural network 300 of FIG. 3. In the example, another data set received by the neural engine 240 may include weights allocated to each of the connection lines corresponding to nodes of the specific layer among the plurality of layers.

The accumulation circuit 430 of the neural engine 240 of the electronic device 101 according to an embodiment may accumulate and store numerical values corresponding to a result of performing an operation from one or more operational circuits included in the neural engine 240. The number of channels used by the operational circuit 410 to output a result of performing a binary arithmetic operation may be differentiated according to an embodiment. The number of accumulation circuits included in the neural engine 240 may correspond to the number of channels used by the operational circuit 410 included in the neural engine 240 to output the result. Referring to FIG. 4A, in one embodiment in which the operational circuit 410 outputs a result using at least one of two channels, the neural engine 240 may include two accumulation circuits (e.g., a first accumulation circuit 430-1 and a second accumulation circuit 430-2). Referring to FIG. 4B, in one embodiment in which the operational circuit 410 outputs a result using at least one of four channels, the neural engine 240 may include four accumulation circuits (e.g., the first accumulation circuit 430-1 to the fourth accumulation circuit 430-4).

The controller 420 of the neural engine 240 of the electronic device 101 according to an embodiment may input numerical values included in each of one or more data sets received by the neural engine 240 to each of the first operational circuit 410-1 of the neural engine 240 to the nth operational circuit **410-*n*. The controller 420 may differently control the operational circuit 410 according to the data types of the one or more datasets. For example, the controller 420 may adjust the signal path in the operational circuit 410 based on the data type of one or more datasets received by the neural engine 240. Examples in which the controller 420 adjusts the signal path in the operational circuit 410 based on the data type will be described with reference to FIGS. 6A to 6C and/or FIGS. 9A to 9**D.

The controller 420 of the neural engine 240 of the electronic device 101 according to an embodiment may select numerical values to be input to the operational circuit 410 from among numerical values accumulated in the accumulation circuit 430 and numerical values included in data sets received by the neural engine 240. For example, in a state of performing an operation corresponding to a specific layer (e.g., one hidden layer of one or more hidden layers 320 of FIG. 3) of a neural network, the controller 420 may accumulate and store numerical values output from different channels of the operational circuit 410 in the accumulation circuit 430 to calculate the weighted sum corresponding to nodes included in a specific layer.

Referring to FIG. 4A, an example of a neural engine 240 including an operational circuit 410 including two channels for outputting numerical values is illustrated. When the neural engine 240 includes n=32 operational circuits (e.g., the first operational circuit 410-1 to the n-th operational circuit 410-*n*), the neural engine 240 may obtain 32×2=64 numerical values from the operational circuit within a single processing cycle. For example, the 64 numerical values are numerical values obtained by applying each of 64 weights related to a specific layer of a neural network to each of 64 numerical values input to the specific layer.

In an embodiment, each of the numerical values obtained by the neural engine 240 may be stored in a specific accumulation circuit corresponding to each of the numerical values among the accumulation circuits of the neural engine 240. Referring to FIG. 4A, the numerical values output from the first channel O1 of a plurality of operational circuits (e.g., the first operational circuit 410-1, the second operational circuit 410-2, . . . the nth operational circuit 410-*n*) may be stored in the first accumulation circuit 430-1 corresponding to the first channel O1. Similarly, the numerical values output from the second channel O2 of the plurality of operational circuit may be stored in the second accumulation circuit 430-2 corresponding to the second channel O2.

As described above, operational circuits such as the first operational circuit 410-1 to the nth operational circuit 410-*n* of the electronic device 101 according to an embodiment may support binary arithmetic operations based on different data types. For example, in a state of performing a binary arithmetic operation related to a data type (e.g., a data type for indicating an integer number using 8 bits and/or 4 bits) to indicate an integer number based on a specified number of bits, the operational circuit of the electronic device 101 may output a numerical value corresponding to the performed binary arithmetic operation using both the first channel O1 and the second channel O2. For example, in a state of performing a binary arithmetic operation related to another data type (e.g., another data type to indicate floating-point number using 16 bits) to indicate a floating-point number based on the number of bits exceeding the specified number, the operational circuit of the electronic device 101 may output a numerical value corresponding to the performed binary arithmetic operation using the first channel O1 from among the first channel O1 and the second channel O2. An operation in which the controller 420 of the electronic device 101 according to an embodiment adjusts a signal path included in the operational circuit 410 and outputs one or more numerical values through the first channel O1 and/or the second channel O2 will be described later with reference to FIGS. 6A to 6C.

Referring to FIG. 4B, an example of a neural engine 240 including an operational circuit 410 including four channels for outputting numerical values is illustrated. When the neural engine 240 includes n=32 operational circuits (e.g., the first operational circuit 410-1 to the nth operational circuit 410-*n*), the neural engine 240 may obtain 32×4=128 numerical values from the operational circuit within a single processing cycle. For example, each of the 128 numerical values may correspond to a numerical value allocated to a node of a CNN related to convolution by applying different weights indicated based on a kernel. Hereinafter, the kernel may be referred to as a filter.

Referring to FIG. 4B, the first accumulation circuit 430-1 may store numerical values output from the first channel O1 of a plurality of operational circuits (e.g., the first operational circuit 410-1, the second operational circuit 410-2, . . . the nth operational circuit 410-*n*). Similarly, each of the second accumulation circuit 430-2, the third accumulation circuit 430-3, and the fourth accumulation circuit 430-4 may store numerical values output from each of the second channel O2, the third channel O3, and the fourth channel O4 of the plurality of operational circuits. The number of channels activated by the operational circuit 410 of the electronic device 101 according to an embodiment in the first to fourth channels O1 to O4 may be adjusted according to a data type of a numerical value input to the operational circuit 410 and/or a signal path in the operational circuit 410 adjusted by the controller 420.

For example, in a state in which the operational circuit 410 of the neural engine 240 according to an embodiment performs a multiplication operation based on a first data type for indicating floating-point numbers along 16 bits and/or the second data type for indicating an integer number along 8 bits, the operational circuit 410 may transmit a numerical value corresponding to the result of the multiplication operation to the accumulation circuit(e.g., the first accumulation circuit 430-1 corresponding to the first channel O1) using the first channel O1 among the first channels O1 to fourth channels O4 within a single processing cycle. In the accumulating circuit, numerical values transmitted along the first channel O1 from the operational circuit included in the neural engine 240 may be accumulated. In this case, the neural engine 240 may output numerical values accumulated in the accumulation circuit, within the single processing cycle, based on the first data type and/or the second data type, through one channel corresponding to the accumulation circuit.

For example, in a state in which the operational circuit 410 of the neural engine 240 according to an embodiment performs a multiplication operation based on a third data type for indicating an integer number along four bits, the operational circuit 410 may store two numerical values corresponding to the result of the multiplication operation to two accumulation circuits (e.g., the first accumulation circuit 430-1 and the second accumulation circuit 430-2 corresponding to each of the first channel O1 and the second channel O2), within a single processing cycle, using the first channel O1 and the second channel O2 from among the first channel O1 to the fourth channel O4. In each of the two accumulation circuits, numerical values transmitted along each of the first channel O1 and the second channel O2 from the operational circuit included in the neural engine 240 may be accumulated. In this case, the neural engine 240 may output numerical values based on the third data type through two channels corresponding to each of the two accumulation circuits within the single processing cycle.

For example, in a state in which the operational circuit 410 of the neural engine 240 according to an embodiment performs a multiplication operation based on a fourth data type for indicating an integer number along two bits, the operational circuit 410 may store four numerical values corresponding to the result of the multiplication operation in four accumulation circuits (e.g., the first accumulation circuit 430-1 to the fourth accumulation circuit 430-4), within a single processing cycle, using all of the first channel O1 to fourth channels O4. In each of the four accumulation circuits, numerical values transmitted along each of the first channel O1 to fourth channels O4 from the operational circuit included in the neural engine 240 may be accumulated. In this case, the neural engine 240 may output numerical values based on the fourth data type through four channels corresponding to each of the four accumulation circuits within the single processing cycle.

A signal path in the operational circuit 410 controlled by the controller 420 of the neural engine 240 according to an embodiment of FIG. 4B will be described later with reference to FIGS. 9A to 9D. In this case, the neural engine 240 may output numerical values based on the fourth data type through four channels corresponding to each of the four accumulation circuits.

As described above, the neural engine 240 of the electronic device 101 according to an embodiment may comprise one or more operational circuits supporting binary arithmetic operations based on a plurality of data types. The one or more operational circuits may output one or more numerical values using one or more channels activated according to the data type. The neural engine 240 may accumulate one or more numerical values output through one or more channels of the one or more operational circuits using one or more accumulation circuits. The accumulated one or more numerical values may indicate a weighted sum corresponding to each of the nodes included in a specific layer of the neural network.

Hereinafter, referring to FIG. 5, an exemplary structure of the operational circuit 410 of FIG. 4A will be described.

Figure 5:
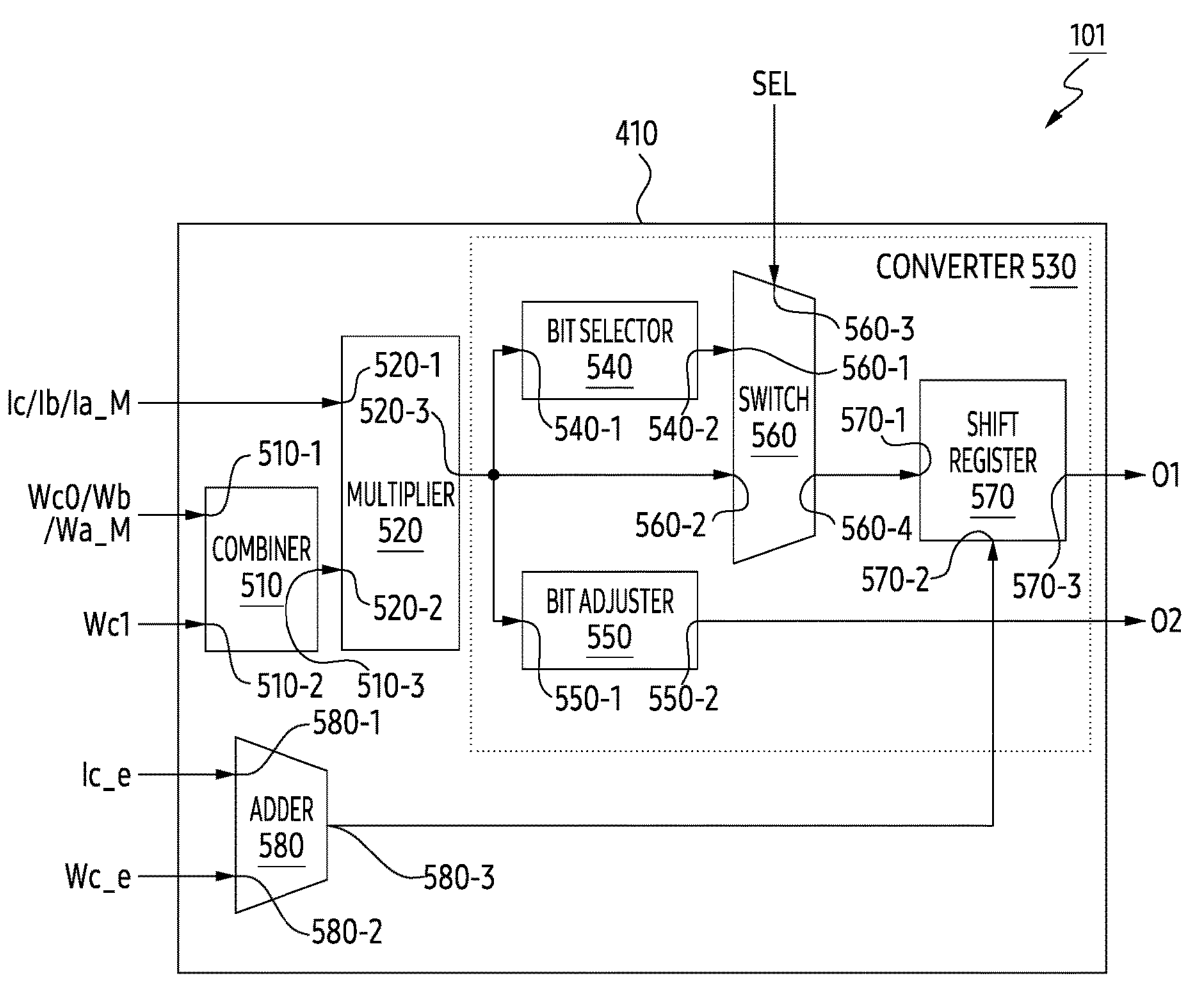
FIG. 5 is a block diagram for explaining an example of an operational circuit of an electronic device according to an embodiment.

FIG. 5 is a block diagram for explaining an example of an operational circuit 410 of an electronic device 101 according to an embodiment. The electronic device 101 of FIG. 5 may correspond to an example of the electronic device 101 of FIGS. 1 to 2 and 4A to 4B, and/or the electronic device of FIG. 3. For example, the operational circuit 410 of FIG. 5 may correspond to an example of the operational circuit 410 of FIG. 4A.

Referring to FIG. 5, the operational circuit 410 according to an embodiment may include a combiner 510, a multiplier 520, a converter 530, an adder 580, or a combination thereof. The operational circuit 410 according to an embodiment may perform a multiplication operation based on a multiplier and one or more multiplicands. For example, weights allocated to each of the connection lines connecting the plurality of layers of FIG. 3 correspond to an example of the one or more multipliers, and numerical values allocated to each of the nodes included in the plurality of layers of FIG. 3 correspond to an example of the one or more multiplicands.

Referring to FIG. 5, the operational circuit 410 may include a combiner 510 including ports 510-1 and 510-2 for receiving bits indicating one or more multiplicands and a port 510-3 for outputting bits to which the one or more multiplicands are combined. The operational circuit 410 may include a multiplier 520 including a port 520-1 for receiving at least a portion of the bits indicating the multiplier, a port 520-2 connected to the port 510-3 of the combiner 510, and a port 520-3 for outputting bits corresponding to a result of performing a binary multiplication operation corresponding to bits received from the ports 520-1 and 520-2. The operational circuit 410 may include an adder 580 including a port 580-1 for receiving a portion of the bits indicating the multiplicand, a port 580-2 for receiving bits indicating a multiplier, and a port 580-3 for outputting bits indicating a result of performing a binary addition operation corresponding to bits received from the ports 580-1 and 580-2. For example, the ports (510-1, 510-2, 520-1, 580-1, 580-2) of the operational circuit 410 may correspond to ports on which the operational circuit 410 receives one or more numerical values.

Referring to FIG. 5, the operational circuit 410 according to an embodiment may include a converter 530, connected to the port 520-3 of the multiplier 520 and the port 580-3 of the adder 580, that outputs bits indicating one or more numerical values to at least one of the first channel O1 and the second channel O2 based on bits received from the ports 520-3, 580-3. For example, the converter 530 may obtain one or more numerical values to be output through at least one of the first channel O1 or the second channel O2 by converting bits output from the port 580-3 and/or bits output from the port 520-3 according to the data type of the one or more multipliers and/or the one or more multiplicands input to the operational circuit 410.

Referring to FIG. 5, the converter 530 may include a bit selector 540 including a port 540-1 for receiving bits output from the port 520-3 of the multiplier 520 and a port 540-2 for outputting bits corresponding to a portion of the bits received through the port 540-1. The converter 530 may include a bit adjuster 550 including a port 550-1 for receiving bits output from the port 520-3 of the multiplier 520 and a port 550-2 for outputting one or more bits to a second channel O2 of the operational circuit 410 based on bits received through the port 550-1. The converter 530 may include a switch 560 including a port 560-1 connected to the port 540-2 of the bit selector 540, a port 560-2 connected to the port 520-3 of the multiplier 520, a port 560-3 for receiving a signal(SEL) from a controller (e.g., the controller 420 of FIGS. 4A to 4B) corresponding to the operational circuit 410, and a port 560-4 for outputting bits of any one of the ports 560-1 and 560-2 based on the signal received by the port 560-3. The converter 530 may include a shift register 570 including a port 570-1 for receiving bits output from the port 560-4 of the switch 560, a port 570-2 for receiving bits output from the port 580-3 of the adder 580, and a port 570-3 for outputting bits indicating the result of shifting the bits of the port 570-1, based on the bits received through the port 570-2. The first channel O1 of the operational circuit 410 may correspond to the port 570-3 of the shift register 570. For example, each of the ports 570-3 and 550-2 of the operational circuit 410 may correspond to ports for outputting numerical values.

In an embodiment, as the converter 530 is controlled by a controller (e.g., the controller 420 of FIGS. 4A to 4B) of the operational circuit 410, bits output from the port 520-3 of the multiplier 520 may be processed based on a data type corresponding to numerical values input to the operational circuit 410. For example, the signal path in the converter 530 may be changed according to the data type. The controller corresponding to the operational circuit 410 may change bits input to the ports(510-1, 510-2, 520-1, 580-1, and 580-2) of the operational circuit 410 according to the data type. The controller corresponding to the operational circuit 410 may selectively activate the combiner 510 and/or the adder 580 according to the data type.

Hereinafter, referring to FIGS. 6A to 6C, in the operational circuit 410 according to an embodiment, signal paths adjusted according to data types of numerical values received by the operational circuit 410 will be described.

Figure 6A:
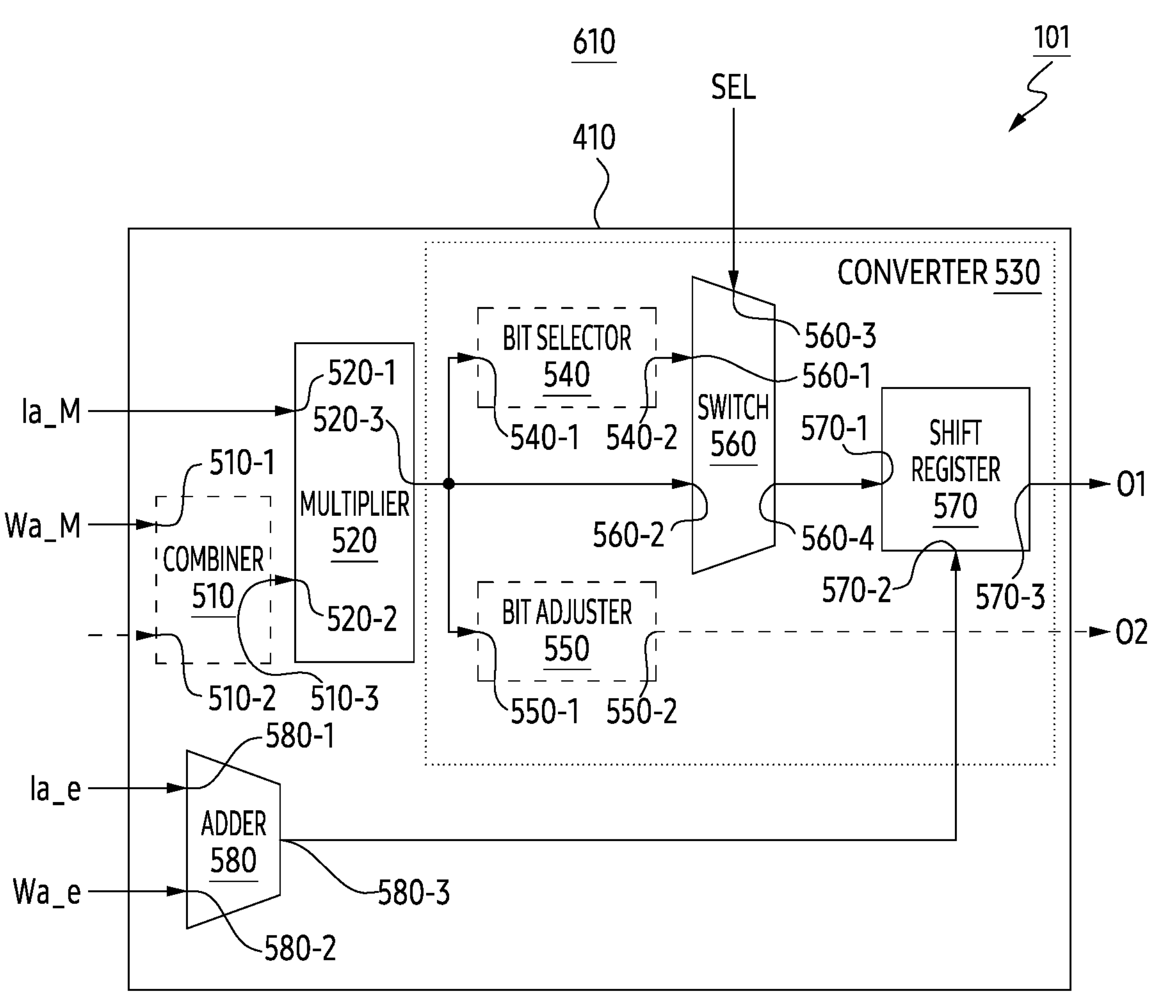
FIGS. 6A to 6C are diagrams for explaining different states of the operational circuit of FIG. 5.
Figure 6B:
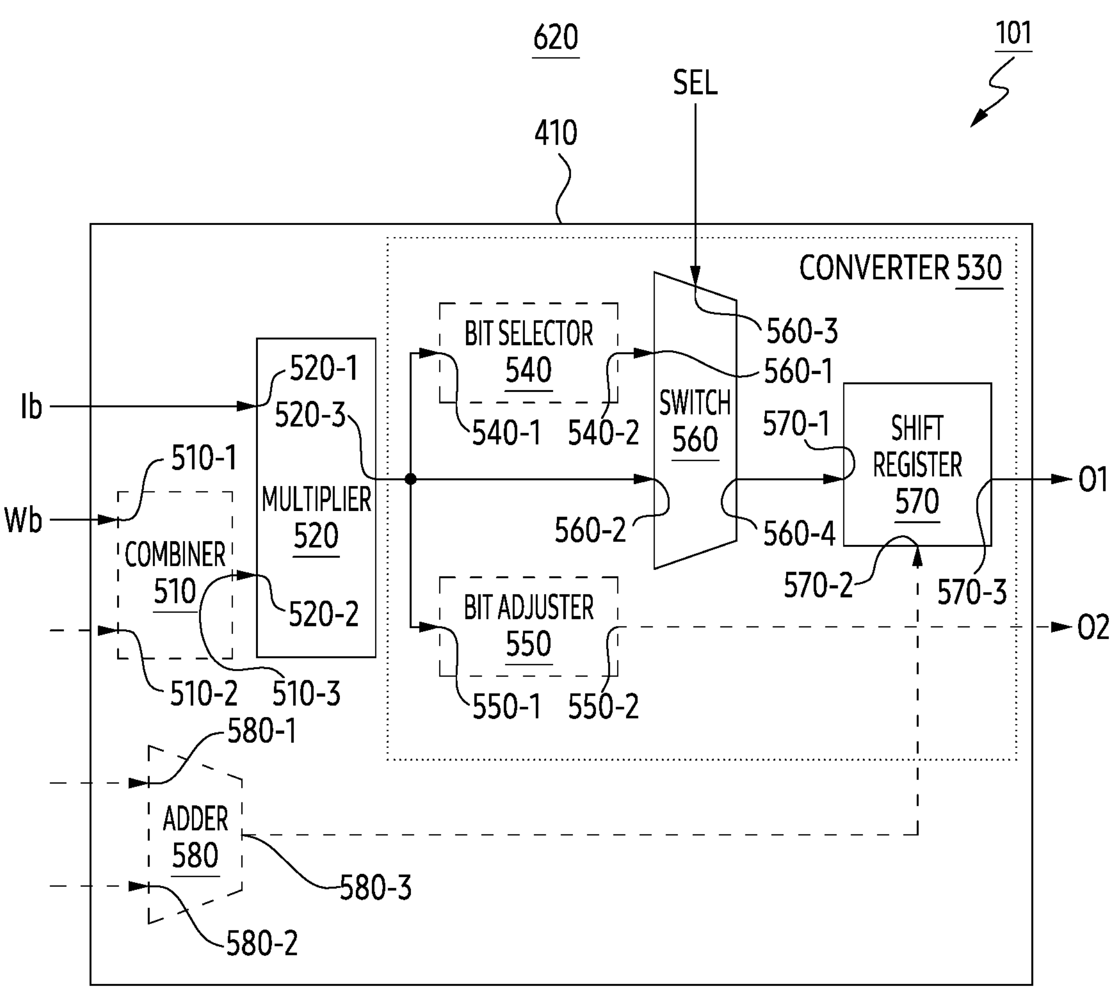
Figure 6C:
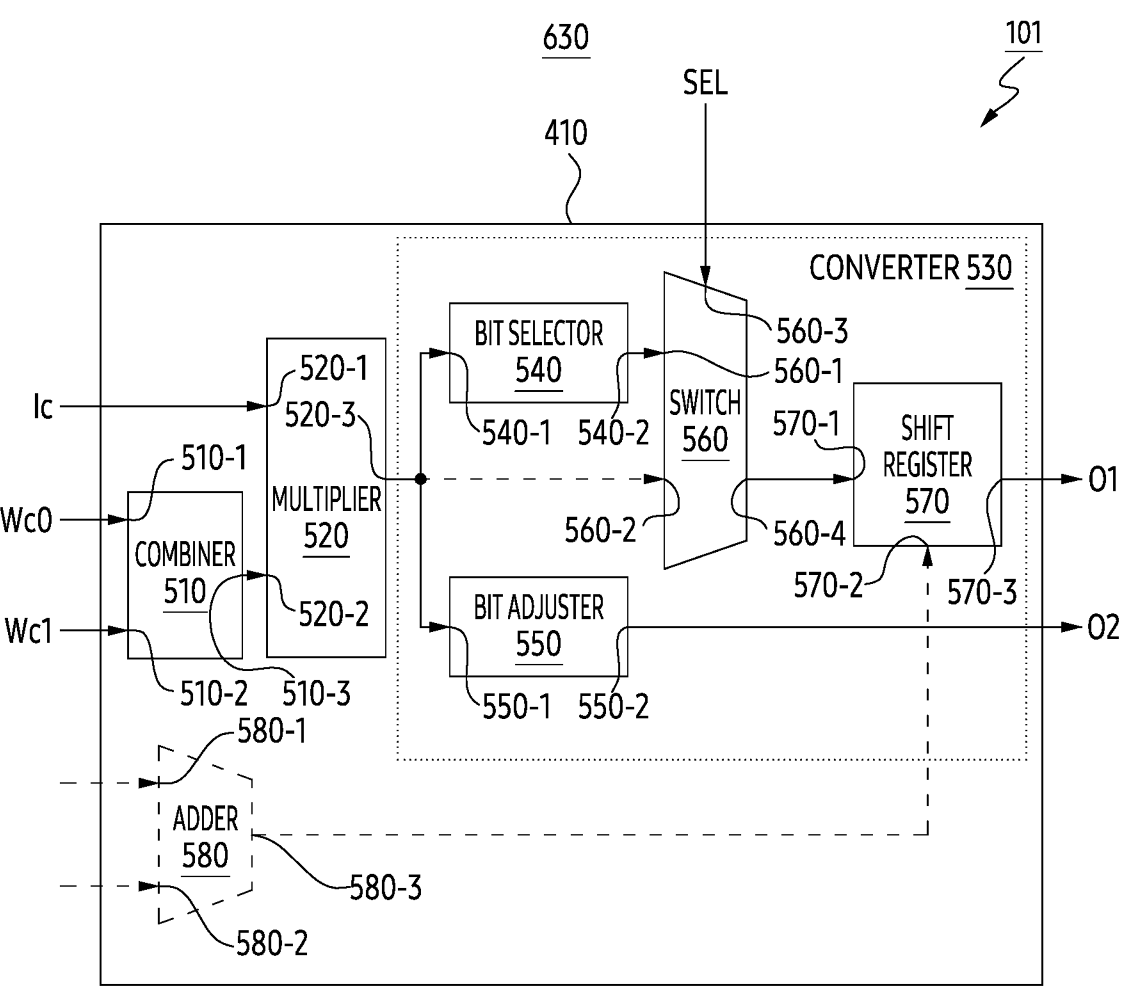

FIGS. 6A to 6C are diagrams for explaining different states (610, 620, 630) of the operational circuit 410 of FIG. 5. The electronic device 101 of FIGS. 6A to 6C may correspond to the electronic device 101 of FIGS. 1 to 2, 4A to 4B and 5, and/or an example of the electronic device of FIG. 3. For example, the operational circuit 410 of FIGS. 6A to 6C may correspond to an example of the operational circuit 410 of FIG. 4A and/or the operational circuit 410 of FIG. 5.

FIG. 6A is an exemplary diagram for explaining an operation of the operational circuit 410 in a state 610 in which a multiplication operation based on a first data type for indicating a floating-point number is performed. The first data type may correspond to, for example, a data type for indicating a floating-point number along 16 bits. For example, the first data type may correspond to, for example, the data type FP16 of the half-precision floating point format of IEEE 754. In this case, the most significant bit (MSB) among the 16 bits indicates the sign of the floating-point number. Among the 16 bits, 5 bits adjacent to the most significant bit (MSB) indicate the exponent of the floating-point number. The remaining 10 bits including a least significant bit (LSB) among the 16 bits indicate a mantissa of the floating-point number.

For example, the numerical value Wa is indicated along a plurality of bits based on the first data type corresponding to the half-precision floating point format of IEEE 754. The bits may include bits corresponding to Wa_s, Wa_M, and Wa_e of Equation 1.

$$Wa=(-1)^{Wa\_s}\times 2^{Wa\_e-127}\times \mathrm{Wa\_M} \quad \text{[Equation 1]}$$

Referring to Equation 1, Wa_s is a numerical value indicating a sign of Wa, Wa_M is a numerical value indicating a normalized mantissa of Wa, and Wa_e is a numerical value indicating a biased exponent of Wa. Bits corresponding to the numerical value Wa may sequentially include 1 bit indicating Was, 5 bits indicating Wa_e, and 10 bits indicating Wa_M, from MSB.

Hereinafter, in a state 610 performing a multiplication operation based on a first data type corresponding to the half-precision floating point format, an operation in which the electronic device 101 performs a multiplication operation of a numerical value Wa and a numerical value Ia using the operational circuit 410 will be described. For example, the numerical value Wa may be one of the weights allocated to the connection line of FIG. 3 and/or the elements of the matrix indicating the kernel in the CNN. For example, the numerical value Ia may be one of the numerical values allocated to the node of FIG. 3 and/or elements of another matrix to be applied to a matrix indicating the kernel in the CNN. Hereinafter, it is assumed that the numerical value Ia_s indicates a sign corresponding to the numerical value Ia in the first data type, the numerical value Ia_e indicates an exponent corresponding to the numerical value Ia in the first data type, and the numerical value Ia_M indicates a mantissa corresponding to the numerical value Ia in the first data type.

Referring to FIG. 6A, in the state 610, the numerical values Wa, Ia, and each of the mantissa Wa_M and Ia_M may be input to the ports 520-1 and 520-2 of the multiplier 520. For example, as the combiner 510 of the operational circuit 410 is deactivated in the state 610, a mantissa Wa_M input to the port 510-1 of the combiner 510 may be transmitted to the port 520-2 of the multiplier 520 by bypassing the combiner 510. The deactivation of the combiner 510 may be controlled by a controller (e.g., the controller 420 of FIGS. 4A to 4B) connected to the operational circuit 410 and/or the operational circuit 410.

The multiplier 520 according to an embodiment may perform a multiplication operation on numerical values respectively indicated by 13 bits and 12 bits. For example, through the port 520-1, the multiplier 520 may receive a numerical value indicated along 13 bits. Through the port 520-2, the multiplier 520 may receive a numerical value indicated along 12 bits. When receiving Ia_M and Wa_M indicated based on 10-bits through each of the ports 520-1 and 520-2, the multiplier 520 may obtain Ia_M indicated by 13 bits and Wa_M indicated by 12 bits using a sign extension. The sign extension may be performed, for example, based on each of Wa_s and Ia_s indicating signs of each of the numerical values Wa and Ia. In an embodiment, the multiplier 520 may perform a multiplication operation for Ia_M and Wa_M indicated by 13 bits and 12 bits, respectively. The multiplier 520 may output, for example, a product of Ia_M and Wa_M indicated by 24 bits through the port 520-3.

Referring to FIG. 6A, in the state 610, exponents Wa_e and Ia_e of each of the numerical values Wa and Ia may be input to ports 580-1 and 580-2 of the adder 580. The adder 580 may be activated by a controller connected to the operational circuit 410 and/or the operational circuit 410 in the state 610. The adder 580 may output a sum of Wa_e and Ia_e by performing an addition operation on Wa_e and Ia_e indicated by 5 bits through port 580-3.

Referring to FIG. 6A, in the state 610, the bit selector 540 and the bit adjuster 550 included in the converter 530 may be deactivated. In the state 610, the switch 560 of the converter 530 may connect the port 560-2 corresponding to the port 520-3 of the multiplier 520 among the ports 560-1 and 560-2 to the port 560-4 based on a signal received through the port 560-3. For example, the connection between the ports 560-2 and 560-4 in the switch 560 may be input through the ports 560-3 and established by a signal SEL provided from a controller corresponding to the operational circuit 410. As the ports 560-2 and 560-4 are connected to each other, bits output from the port 520-3 of the multiplier 520 may be output through the port 560-4 of the switch 560. In this case, the shift register 570 may receive the product of Ia_M and Wa_M output from the multiplier 520 through the port 570-1. In the state of receiving the product of Ia_M and Wa_M, as the sum of Wa_e and Ia_e is received through the port 570-2, the shift register 570 may shift the product of Ia_M and Wa_M based on the received sum of Wa_e and Ia_e. Shifting the product of Ia_M and Wa_M based on the sum of Wa_e and Ia_e may correspond to an operation of normalizing a mantissa of a floating-point number.

In the state 610, the operational circuit 410 may output bits stored in the shift register 570 through the first channel O1. For example, the operational circuit 410 may output bits indicating the product of Wa and Ia according to the bits (e.g., 32 bits) of number of equal to or greater than 16 bits of the first data type by concatenating bits indicating the product of shifted Ia_M and Wa_M, bits indicating the sum of Wa_e and Ia_e, and bits indicating the sign of the product of Ia_M and Wa_M. Bits output through the first channel O1 and indicating the product of Wa and Ia may be stored, for example, in the first accumulation circuit 430-1 of FIG. 4A.

FIG. 6B is an exemplary diagram for describing an operation of operational circuit 410 in a state 620 of performing a multiplication operation based on a second data type for indicating an integer number. The second data type may correspond to, for example, a data type INT8 for indicating a fixed point number or an integer number along 8 bits. In this case, the MSB among 8 bits indicates the sign of an integer number, and the remaining 7 bits indicate the absolute value of the integer number.

Hereinafter, in a state 620 of performing a multiplication operation based on a second data type for indicating an integer number along 8 bits, an operation in which the electronic device 101 performs a multiplication operation of a numerical value Wb and a numerical value Ib using the operational circuit 410 will be described. For example, the numerical value Wb may be one of the weights allocated to the connecting lines of FIG. 3 and/or the elements of the matrix indicating the kernel in the CNN. For example, the numerical value Ib may be one of the numerical values allocated to the node of FIG. 3 and/or elements of another matrix to be applied to a matrix indicating a kernel in the CNN.

Referring to FIG. 6B, in the state 620, numerical values Wb and Ib may be input to ports 520-1 and 520-2 of the multiplier 520. Similar to the state 610 of FIG. 6A, as the combiner 510 of the operational circuit 410 is deactivated, a numerical value Wb input to the port 510-1 of the combiner 510 may be transmitted to the port 520-2 of the multiplier 520 by bypassing the combiner 510.

The multiplier 520 according to an embodiment may obtain Ib indicated by 13 bits and Wb indicated by 12 bits using a sign extension. The sign extension may be performed, for example, based on bits (e.g., MSB of bits indicating numerical values Wb and Ib) indicating signs of each of the numerical values Wb and Ib. The multiplier 520 may output, for example, a product of Wb and Ib indicated by 24 bits through the port 520-3.

Referring to FIG. 6B, in the state 620, the adder 580 may be deactivated or bits indicating a specified numerical value (e.g., 0) may be input to the ports 580-1 and 580-2 of the adder 580. The deactivation of the adder 580 may be performed, for example, by a controller connected to the operational circuit 410 and/or the operational circuit 410 identifying a request to perform a multiplication operation based on the second data type. As the adder 580 is deactivated, bits transmitted by the adder 580 to the port 570-2 of the shift register 570 may indicate a specified numerical value (e.g., 0) that at least temporarily stops shifting of bits by the shift register 570.

Referring to FIG. 6B, in the state 620, similar to the state 610, the bit selector 540 and the bit adjuster 550 included in the converter 530 may be deactivated. In the state 620, the switch 560 of the converter 530 may connect the port 560-2 corresponding to the port 520-3 of the multiplier 520 to the port 560-4 based on the signal SEL received through the port 560-3. In this case, bits output from the port 520-3 of the multiplier 520 and indicating the product of Wb and Ib may be output to the port 570-1 of the shift register 570 through the port 560-4. As the adder 580 is deactivated, bits input to the port 570-1 may be output independently of the shift in the port 570-3 of the shift register 570. For example, bits (e.g., bits of the number of 8 bits or more of the second data type) indicating the product of Wb and Ib may be output to the first channel O1 of the operational circuit 410 through the port 570-3. Bits output through the first channel O1 and indicating the product of Wb and Ib may be stored, for example, in the first accumulation circuit 430-1 of FIG. 4A.

FIG. 6C is an exemplary diagram for explaining an operation of the operational circuit 410 in a state 630 of performing a multiplication operation based on a third data type distinguish from the second data type of FIG. 6B for indicating an integer number. For example, the third data type may correspond to a data type INT4 for indicating a fixed decimal number or an integer number along four bits. In this case, MSB among the four bits indicates the sign of the integer number, and the remaining three bits indicate the absolute value of the integer number.

Hereinafter, in a state 630 of performing a multiplication operation based on a third data type for indicating an integer number along four bits, an operation in which the electronic device 101 performs a multiplication operation of a numerical value Wc0, a numerical value Wc1, and a numerical value Ic using the operational circuit 410 will be described. For example, the numerical value Wc0 and the numerical value Wc1 may be one of the weights allocated to the connection line of FIG. 3 and/or elements of the matrix indicating the kernel in the CNN. For example, the numerical value Ic may be one of the numerical values allocated to the node of FIG. 3 and/or elements of another matrix to be applied to a matrix indicating the kernel in the CNN. The multiplication operation based on the third data type may cause activation of all of the first channel O1 and the second channel O2, independently from the states 610 and 620 in which the first channel O1 is used among the first channel O1 and the second channel O2. The electronic device 101 according to an embodiment may output two numerical values (e.g., Wc0×Ic and Wc1×Ic) corresponding to a result of applying a multiplier (e.g., numerical value Ic) to each of the multiplicands (e.g., numerical value Wc0, numerical value Wc1) through the first channel O1 and the second channel O2.

Referring to FIG. 6C, in the state 630, numerical values Wc0 and Wc1 may be input to ports 510-1 and 510-2 of the combiner 510. In response to identifying a request to perform a multiplication operation based on a third data type, the controller corresponding to the operational circuit 410 and/or the operational circuit 410 of the electronic device 101 may activate the combiner 510. In the activated state, the combiner 510 according to an embodiment may be received through each of the ports 510-1 and 510-2 and may combine bits corresponding to each of the numerical values Wc0 and Wc1.

For example, in a state of receiving numerical values Wc0 and Wc1 indicated by using four bits along the third data type through each of the ports 510-1 and 510-2, four bits including three bits in contact with the LSB and the LSB among the bits output from the port 510-3 of the combiner 510 may be received through the port 510-1 and correspond to four bits indicating the numerical value Wc0. In the above example, among bits output from the port 510-3 of the combiner 510, the four bits including the MSB and the three bits contiguous with the MSB may be received via the port 510-2 and correspond to the four bits indicating the numerical value Wc1. An operation in which the combiner 510 of the electronic device 101 according to an embodiment combines bits indicating numerical values Wc0 and Wc1 will be described later with reference to FIG. 7.

Referring to FIG. 6C, in the state 630, the multiplier 520 may be received through bits indicating a numerical value Ic received through the port 520-1, the port 520-2 and perform a multiplication operation of bits output from the port 510-3 of the combiner 510. The bits received by the multiplier 520 through the port 520-2 may correspond to bits in which the numerical values Wc0 and Wc1 are combined by the combiner 510. The multiplier 520 may output a result of performing a multiplication operation through the port 520-3.

Referring to FIG. 6C, in the state 630, the bit selector 540 and the bit adjuster 550 included in the converter 530 may be activated. The bit selector 540 and the bit adjuster 550 may be activated, for example, in response to the operational circuit 410 receiving numerical values Wc0, Wc1, and Ic based on the third data type. The bit selector 540 may receive bits output from the port 520-3 through the port 540-1. In response to receiving the bits, the bit selector 540 may extract a portion of the received bits (8 bits including 7 bits concatenating with LSB and LSB). The bit selector 540 may output the extracted bits through the port 540-2.

The switch 560 may output bits received from the port 560-1 among the ports 560-1 and 560-2 through the port 560-4, based on the signal SEL received through the port 560-3. Since the port 560-1 of the switch 560 corresponds to the port 540-2 of the bit selector 540, the switch 560 may output bits output from the bit selector 540 through the port 560-4. For example, the signal SEL input to the port 560-3 of the switch 560 may be provided from a controller that inputs numerical values Wc0, Wc1, and Ic based on the third data type to the operational circuit 410.

Referring to FIG. 6C, in the state 630, the adder 580 may be deactivated. As the adder 580 is deactivated, the shift register 570 may output bits received from the port 570-1 through the port 570-3. For example, deactivation of the adder 580 may cause at least temporary interruption of the shift operation in the shift register 570. Since the port 570-3 corresponds to the first channel O1 of the operational circuit 410, and the bits output from the port 540-2 are not adjusted by the switch 560 and the shift register 570, the operational circuit 410 may output bits output from the port 540-2 of the bit selector 540 through the first channel O1. The bits output through the first channel O1 may correspond to the product of the numerical values Wc0 and Ic.

In response to receiving bits output from port 520-3 through port 550-1, the bit adjuster 550 of the operational circuit 410 according to an embodiment may adjust one or more other bits based on at least one of the received bits (e.g., bits corresponding to a specified number of digits). The bit adjuster 550 may output one or more adjusted other bits to the second channel O2 of the operational circuit 410 through the port 550-2. The adjusted one or more other bits may correspond to the product of the numerical values Wc1 and Ic. The numerical values output from each of the first channel O1 and the second channel O2 may be stored in each of the first accumulation circuit 430-1 and the second accumulation circuit 430-2 of FIG. 4A. The number of bits of each of the numerical values stored in each of the first accumulation circuit 430-1 and the second accumulation circuit 430-2 may be a number (e.g., 8 bits) equal to or greater than 4 bits of the third data type.

As described above, in a state of performing a multiplication operation based on the third data type of state 530, the operational circuit 410 according to an embodiment may output a result of multiplying each of a plurality of multiplicands by a multiplier through different channels (e.g., the first channel O1 and the second channel O2), by performing a multiplication operation between a plurality of multiplicands (e.g., numeric values Wc0, Wc1) and multipliers (e.g., numeric value Ic). In a state of performing a multiplication operation based on a data type (e.g., the first data type and the second data type corresponding to each of the states 610 and 620) distinguished from the third data type, the operational circuit 410 may output a result of performing a multiplication operation between a single multiplicand and a single multiplier through a single channel (e.g., a first channel O1).

Hereinafter, in the state 630 of FIG. 6C, an example of an operation in which the operational circuit 410 according to an embodiment performs a multiplication operation between a plurality of multiplicands (e.g., numerical values Wc0 and Wc1) and a multiplier (e.g., numerical value Ic) will be described.

Figure 7:
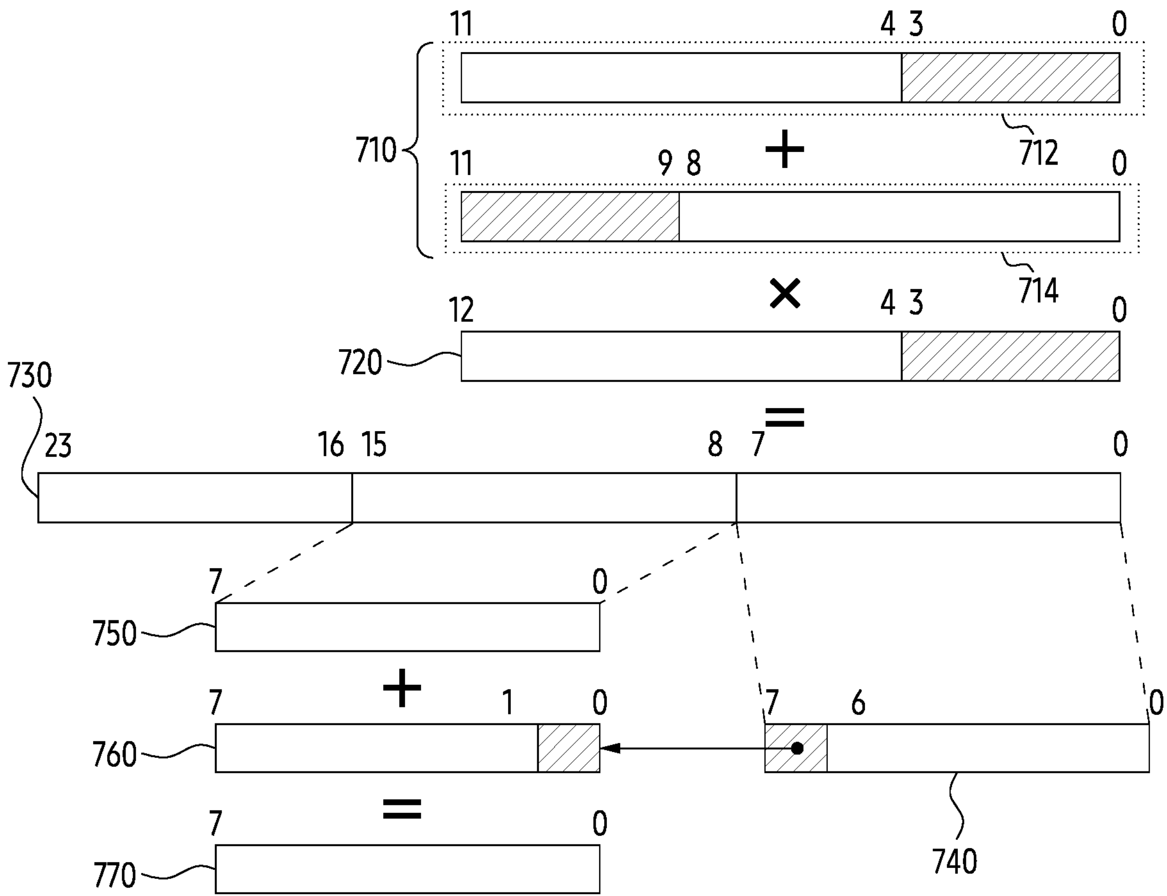
FIG. 7 is a diagram for explaining an operation of performing a multiplication operation on integer numbers using a multiplier related to a mantissa of a floating-point number in the operational circuit of FIG. 5.

FIG. 7 is a diagram for explaining an operation of performing an integer numbers multiplication operation using a multiplier related to a mantissa of a floating-point number in the operational circuit of FIG. 5. The electronic device of FIG. 7 may correspond to an example of the electronic device 101 of FIGS. 1 to 2, 4A to 4B, 5 and 6A to 6C, and/or the electronic device of FIG. 3.

Hereinafter, for example, as in the state 630 of FIG. 6C, an operation of the electronic device in a state of performing a multiplication operation based on a specified data type (e.g., the third data type of FIG. 6C) for indicating an integer number along 4 bits will be described. For example, in a state where the NPU (e.g., NPU 210 of FIG. 2) of the electronic device according to an embodiment executes a function based on CNN, the NPU may perform a plurality of multiplication operations based on CNN.

For example, when performing a convolution operation of 1×1, the NPU may obtain a plurality of numerical values based on the third matrix of 2×2×2 by performing a convolution operation between a plurality of numerical values based on a first matrix of 2×2×1 and a plurality of numerical values based on a second matrix of 1×1×1×2. In the above example, the first matrix may correspond to a matrix indicating input data, and the second matrix may correspond to a matrix indicating weight. In the above example, the NPU according to an embodiment may perform a multiplication operation based on a combination of numerical values included in the first matrix and numerical values included in the second matrix by controlling each of a plurality of operational circuits (e.g., the operational circuit 410 of FIGS. 4 to 5 and 6A to 6C) included in a plurality of neural engines (e.g., the neural engine 240 of FIG. 2) included in the NPU. In the above example, when each of the first matrix and the second matrix corresponds to a specified data type for indicating an integer number along four bits, the NPU according to an embodiment may simultaneously obtain numerical values (W0×I0, W1×I0) to which weights W0 and W1 included in the second matrix are respectively applied to the numerical value I0 included in the first matrix from a single operational circuit. Hereinafter, an operation in which the operational circuit of the NPU according to an embodiment performs a multiplication operation based on the numerical value I0 and the weights W0 and W1 will be described.

Referring to FIG. 7, a combiner (e.g., combiner 510 of FIGS. 5, 6A to 6C) of operational circuit may receive bits indicating each of the weights W0 and W1 through different ports (e.g., ports 510-1 and 510-2 of FIG. 5 and FIG. 6A to 6C). The number of bits indicating each of the weights W0 and W1 may correspond to the number (e.g., 4) according to the specified data type.

In order to perform a multiplication operation between integer numbers indicated along bits less than the mantissas using a multiplier that performs a multiplication operation between mantissas of floating-point numbers, the combiner of the operational circuit according to an embodiment may combine bits indicating the integer numbers. Referring to FIG. 7, 12 bits 710 for combining and outputting weights W0 and W1 indicated by 4 bits received by a combiner through different ports are illustrated. Referring to FIG. 7, the bits 710 output by the combiner may correspond to a result of performing a binary addition operation on 12 bits 714 obtained by shifting 12 bits 712 obtained by performing sign extension on the weight W0 indicated by 4 bits and 4 bits indicating the weight W1.

For example, when the weight W0 corresponds to −8, the binary numerical value corresponding to the weight W0 may be indicated as 1000 along a specified data type based on 4 bits. From bits 1000 indicating the weight W0, the combiner may obtain 12 bits 712 using a sign extension. For example, 12 bits 712 corresponding to the weight W0 indicated by 1000 may be 111111111000. For example, when the weight W1 corresponds to −7, the binary numerical value corresponding to the weight W1 may be indicated as 1001. In this case, the 12 bits 714 obtained by shifting the 4 bits corresponding to W1 may be 100100000000. When the weight W0 corresponds to −8 and the weight W1 corresponds to −7, bits 710 output by the combiner may correspond to the sum of 111111111000 and 100100000000. For example, the bits 710 may correspond to {W0+W1<<81 with respect to the weights W0 and W1.

The multiplier (e.g., the multiplier 520 of FIGS. 5, 6A to 6C) of the operational circuit according to an embodiment may output bits 730 by performing a binary multiplication operation between the bits 710 output from the combiner receiving the weights W0 and W1, and the bits 720 corresponding to the numerical value 10. The bits 720 may include 12 bits obtained by performing a sign extension on a numerical value I0 indicated along the 4 bits. For example, when the numerical value I0 corresponds to −8 (displayed as 1000 along 4 bits), the bits 720 may be 111111111000. In this case, 24 bits 730 output from the multiplier may be 000000000011100001000000.

In an embodiment, since the combiner outputs bits indicating {W0+W1<<8} from weights W0 and W1, as a result of the multiplier performing the multiplication operation between the bits output from the combiner and the bits indicating the numerical value 10, P may be indicated as Equation 2.

$$P = I0 \times \{W0 + W1 \ll 8\} = (I0 \times W0) + \{(I0 \times W1) \ll 8\} \quad \text{[Equation 2]}$$

The bit selector and the bit adjuster included in the converter (e.g., the converter 530 of FIGS. 5, 6A to 6C) of the operational circuit that receives bits output from the multiplier may output a first integer number P0 corresponding to a result obtained by multiplying the received bits by the weight W0 and the numerical value I0 and a second integer number P1 corresponding to the result obtained by multiplying the weight W1 by the numerical value I0. For example, for P in Equation 2, the first integer number P0 output by the bit selector of the converter may correspond to 8 bits P[7:0] including LSB and 7 bits adjacent to the LSB from among bits indicating P. Referring to FIG. 7, since bits 730 output from the multiplier correspond to P of Equation 2, the bit adjuster of the converter may extract 8 bits 740 disposed at a lower digit among the bits 730 to obtain a first integer number P0.

For example, with respect to P of Equation 2, the second integer number P1 output by the bit adjuster of the converter may be indicated as Equation 3. For example, the bit adjuster may compensate for a change caused by a sign extension to obtain the second integer number P1.

$$P1 = W1 \times I0 = P[15:8] - \{8 \times P0[7]\} = P[15:8] + P[7] \quad \text{[Equation 3]}$$

P[15:8] of Equation 3 may correspond to a portion 750 of the bits 730 output from the multiplier. The bit adjuster of the converter may obtain bits 770 corresponding to P1 of Equation 3 by adding bits 760 including bits (e.g., P[7]) corresponding to a specified number of digits in bits 730 to the portion 750. For example, as described in FIGS. 5 and/or 6C, bits 740 indicating the first integer number P0 and bits 770 indicating the second integer number P1 may be output through the first channel O1 and the second channel O2 of the operational circuit, respectively.

In the example of receiving the weight W0=−8, the weight W1=−7, and the numerical value I0=−8, 24 bits 730 output from the multiplier are P=000000000011100001000000. In the above example, bits indicating the first integer number P0 output by the operational circuit through the first channel O1 are P[7:0]=01000000. The binary numeric value 01000000 corresponds to 64=(−8)×(−8), so W0×I0. In the above example, bits indicating the second integer P1 output by the operational circuit through the second channel O2 are P[15:8]+P[7]=00111000. The binary numeric value 00111000 corresponds to 56=(−8)×(−7), so W1×I0. For example, the operational circuit may simultaneously output a result (W0×I0, W1×I0) obtained by multiplying each of a plurality of multiplicands by the multiplier.

For example, based on the 8 bits, each of the bits 740 and 770 that are output through the first channel O1 and the second channel O2 and indicates each of the first integer number P0 and the second integer number P1 may be accumulated in the first accumulation circuit 430-1 and the second accumulation circuit 430-2 of FIG. 4A. The numerical values accumulated on each of the first accumulation circuit 430-1 and the second accumulation circuit 430-2 and indicated based on the 8 bits may be converted into the specified data type for indicating an integer number along 4 bits by a neural engine (e.g., the neural engine 240 of FIG. 4A). The numerical values converted to the specified data type may correspond to a weighted sum of nodes included in a specific layer of the neural network.

As described above, the operational circuit of the electronic device according to an embodiment may perform a multiplication operation between one or more multiplicands and multipliers based on different data types (e.g., FP16, INT8, INT4). The number of multiplication operations that the operational circuit of the electronic device according to an embodiment may perform in a single processing cycle may be differentiated based on a data type selected from among data types. For example, when the number of bits indicating a numerical value is distinguished according to data types, in a state that operates based on a data type indicating a numerical value along a relatively small number of bits (e.g., state 630 of FIG. 6C), the electronic device may simultaneously perform a larger number of multiplication operations than other data types.

Hereinafter, referring to FIGS. 8, 9A to 9D and/or 10, another example of an operational circuit included in an NPU of an electronic device according to an embodiment will be described.

Figure 8:
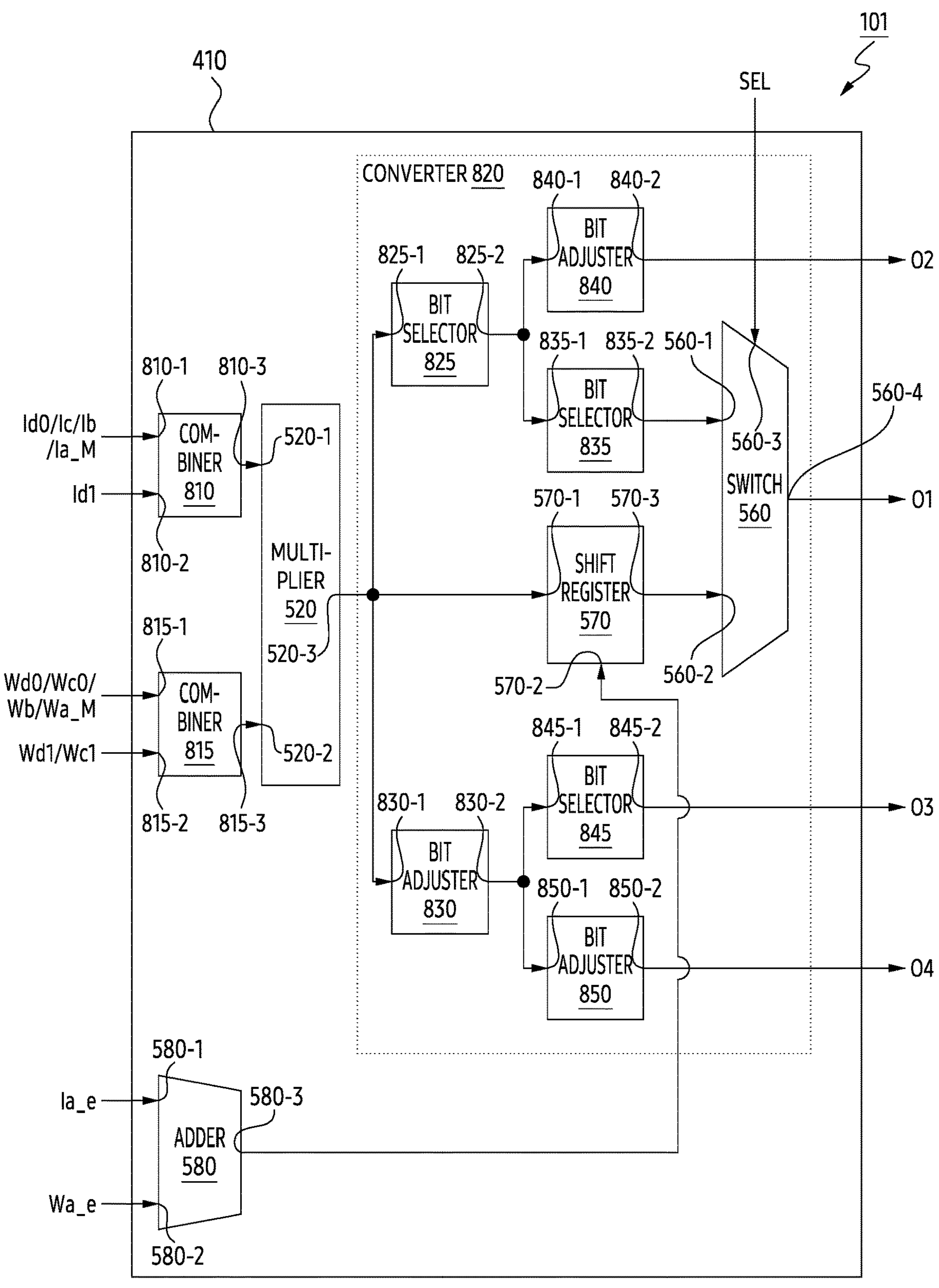
FIG. 8 is a block diagram for explaining another example of an operational circuit of an electronic device according to an embodiment.

FIG. 8 is a block diagram illustrating another example of an operational circuit 410 of an electronic device 101 according to an embodiment. The electronic device 101 of FIG. 8 may correspond to the electronic device 101 of FIGS. 1 to 2 and 4A to 4B, and/or an example of the electronic device of FIG. 3. For example, the operational circuit 410 of FIG. 5 may correspond to an example of the operational circuit 410 of FIG. 4B.

Referring to FIG. 8, the operational circuit 410 according to an embodiment may include combiners 810, 815, a multiplier 520, a converter 820, an adder 580, or a combination thereof. The operational circuit 410 according to an embodiment may perform a multiplication operation based on one or more multipliers and one or more multiplicands. For example, weights allocated to each of the connection lines connecting the plurality of layers of FIG. 3 correspond to an example of the one or more multipliers, and numerical values allocated to each of the nodes included in a plurality of layers of FIG. 3 correspond to an example of the one or more multiplicands.

Referring to FIG. 8, the operational circuit 410 may include a combiner 810 including ports 810-1 and 810-2 for receiving bits indicating one or more multiplicands and port 810-3 for outputting bits to which the one or more multiplicands are combined. Similarly, the operational circuit 410 may include combiner 815 including ports 815-1 and 815-2 for receiving bits indicating one or more multipliers, and port 815-3 for outputting bits to which the one or more multipliers are combined. The operational circuit 410 may include a multiplier 520 including a port 520-1 connected to the port 810-3 of the combiner 810, a port 520-2 connected to the port 815-3 of combiner 915, and a port 520-3 for outputting bits corresponding to a result of performing a binary multiplication operation corresponding to the bits received from the ports 520-1. and 520-2. The operational circuit 410 may include an adder 580 including a port 580-1 for receiving a portion of the bits indicating multiplicand, a port 580-2 for receiving bits indicating multipliers, and a port 580-3 for outputting bits indicating a result of performing a binary addition operation corresponding to the bits received from the ports 580-1, 580-2. For example, ports 810-1, 810-2, 815-1, 815-2, 580-1 and 580-2 of operational circuit 410 may correspond to ports on which operational circuit 410 receives one or more numerical values. The multiplier 520 and the adder 580 of FIG. 8 may correspond to each of the multiplier 520 and the adder 580 of FIG. 5.

Referring to FIG. 8, the operational circuit 410 according to an embodiment may include a converter 820 connected to a port 520-3 of the multiplier 520 and a port 580-3 of the adder 580 to output bits indicating one or more numerical values in at least one of four channels (e.g., the first channel O1 to the fourth channel O4) based on bits received from the ports 520-3, 580-3. For example, the converter 820 may obtain one or more numerical values to be output through at least one of the four channels by converting bits output from port 520-3 according to the bits output from the port 580-3 and/or the data type of the one or more multipliers and/or the one or more multiplicands input to the operational circuit 410.

Referring to FIG. 8, the converter 820 may include a bit selector 825 including a port 825-1 for receiving bits output from the port 520-3 of the multiplier 520 and a port 825-2 for outputting bits corresponding to a portion of the bits received through the port 825-1. The converter 820 may include a bit adjuster 830 including a port 830-1 for receiving bits output from the port 520-3 of the multiplier 520 and a port 830-2 for changing and outputting at least one of the received bits. Each of the bit selector 825 and the bit adjuster 830 of FIG. 8 may correspond to the bit selector 540 and the bit adjuster 550 of FIG. 4.

Referring to FIG. 8, the converter 820 may include a bit adjuster 840 including a port 840-1 connected to the port 825-2 of the bit adjuster 825 and a port 840-2 corresponding to the second channel O2 of the operational circuit 410. The converter 820 may include a bit selector 835 including a port 835-1 connected to the port 825-2 of the bit adjuster 825 and a port 835-2 that selects and outputs a portion of the bits received through the port 835-1.

Referring to FIG. 8, the converter 820 may include a shift register 570 including a port 570-1 connected to a port 520-3 of the multiplier 520, a port 570-2 connected to a port 580-3 of the adder 580, and a port 570-3 on which bits indicating a result of shifting bits received through the port 570-1 based on bits received from the port 570-2 are output. Referring to FIG. 8, the converter 820 may include a switch 560 including a port 560-1 connected to a port 835-2 of a bit selector 835, a port 560-2 connected to a port 570-3 of a shift register 570, a port 560-3 for receiving a signal SEL from a controller corresponding to the operational circuit 410 (e.g., the controller 420 of FIGS. 4A to 4B), and a port 560-4 for outputting bits of any one of the ports 560-1 and 560-2 based on a signal received by the port 560-3. Each of the shift register 570 and the switch 560 of FIG. 8 may correspond to the shift register 570 and the switch 560 of FIG. 5. The port 560-4 of the switch 560 may correspond to the first channel O1 of the operational circuit 410.

Referring to FIG. 8, the converter 820 may include a bit selector 845 including a port 845-1 connected to a port 830-2 of the bit adjuster 830 and a port 845-2 corresponding to a third channel O3 of the operational circuit 410. The converter 820 may include a bit adjuster 850 including a port 850-1 connected to port 830-2 of bit adjuster 830 and a port 850-2 corresponding to the fourth channel O4 of the operational circuit 410. Each of the bit adjusters 840 and 850 may output a result of changing at least one of bits received from the ports 840-1 and 850-1 through the ports 840-2 and 850-2. Each of the bit selectors 835 and 845 may select a portion of bits received from the ports 835-1 and 845-1 and output the selected bits to the ports 835-2 and 845-2.

In an embodiment, as the converter 820 is controlled by the controller (e.g., the controller 420 of FIGS. 4A to 4B) of the operational circuit 410, bits output from the port 520-3 of the multiplier 520 may be adjusted and/or divided based on a data type corresponding to numerical values input to the operational circuit 410. For example, a signal path in the converter 820 may be changed according to the data type. The controller corresponding to the operational circuit 410 may change bits input to the ports 810-1, 810-2, 815-1, 815-2, 580-1, and 580-2 of the operational circuit 410 according to the data type. The controller corresponding to the operational circuit 410 may selectively activate the combiners 810 and 815 and/or the adder 580 according to the data type.

Hereinafter, with reference to FIGS. 9A to 9D, in the operational circuit 410 according to an embodiment, signal paths adjusted according to the data type of numerical values received by the operational circuit 410 will be described.

FIGS. 9A to 9D are diagrams for explaining different states (e.g., states 910, 920, 930, 940) of the operational circuit of FIG. 5. The electronic devices 101 of FIGS. 9A to 9D may correspond to the electronic devices 101 of FIGS. 1 to 2, 4A to 4B and 8 and/or an example of the electronic device of FIG. 3. For example, the operational circuit 410 of FIGS. 9A to 9D may correspond to the operational circuit 410 of FIGS. 4B and/or an example of the operational circuit 410 of FIG. 8.

Figure 9A:
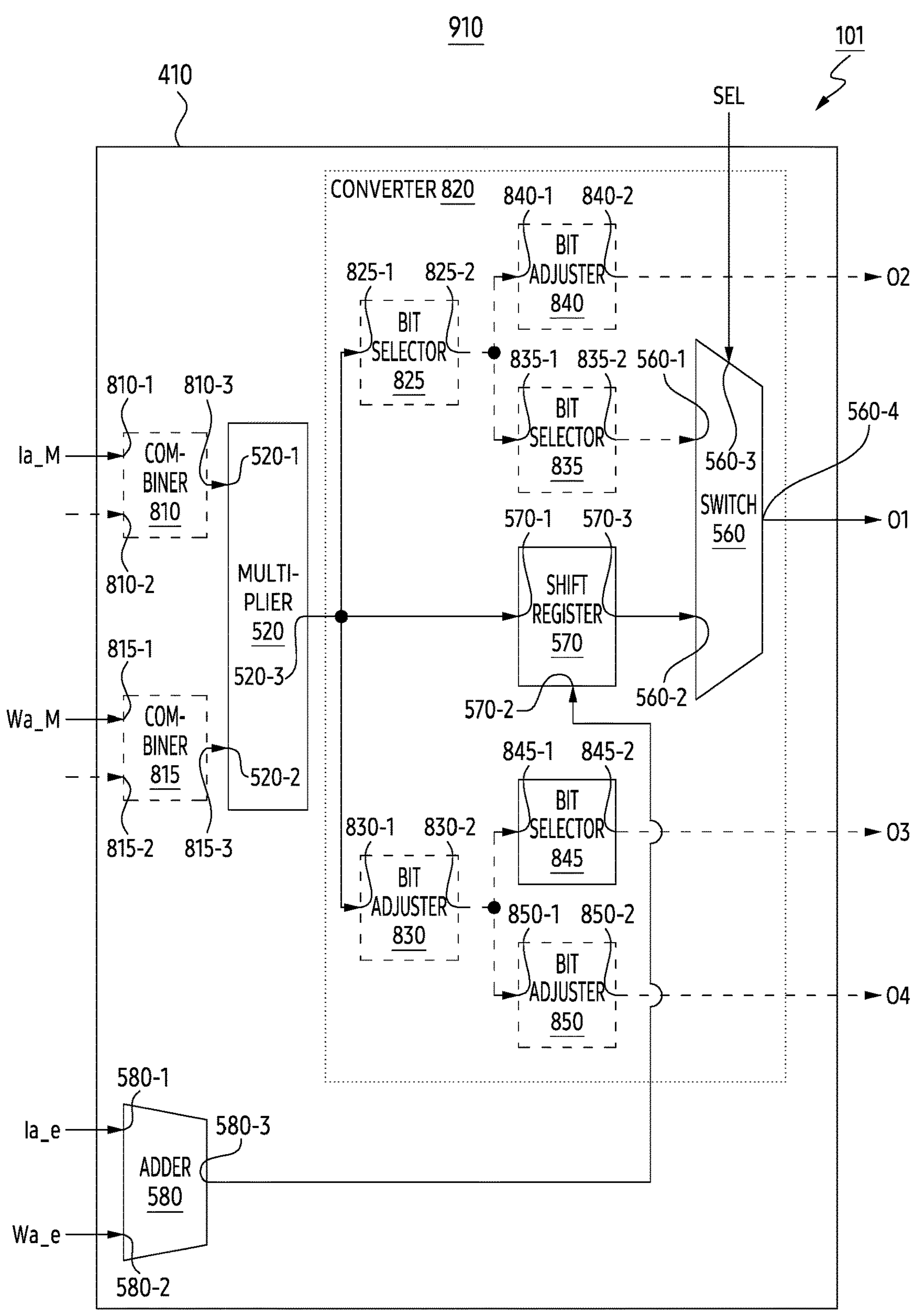
FIGS. 9A to 9D are diagrams for explaining different states of the operational circuit of FIG. 8.

FIG. 9A is an exemplary diagram illustrating an operation of an operational circuit 410 in a state 910 that performs a multiplication operation based on a first data type for indicating a floating-point number. For example, the first data type may correspond to the data type FP16 of the half-precision floating point format of IEEE 754 described above in FIG. 6A. Hereinafter, in the state 910 of performing a multiplication operation based on the first data type corresponding to the half-precision floating point format, an operation in which the electronic device 101 performs a multiplication operation of the numerical value Wa and the numerical value Ia using the operational circuit 410 will be described. For example, the numerical value Wa may be one of the weights allocated to the connection line of FIG. 3 and/or one of the elements of a matrix indicating the kernel in the CNN. For example, the numerical value Ia may be one of the numerical values allocated to the nodes of FIG. 3 and/or elements of another matrix to be applied to a matrix indicating the kernel in CNN. Hereinafter, it is assumed that each of the numerical values Wa_s, Wa_e, and Wa_M corresponds to a code of the numerical value Wa, an exponent, and a mantissa in the first data type and each of the numerical values Ia_s, Ia_e, and Ia_M corresponds to a code of the numerical value Ia, an exponent, and a mantissa in the first data type.

Referring to FIG. 9A, in state 910, numerical values Wa, Ia, each of mantissas Wa_M and Ia_M may be input to ports 520-1 and 520-2 of the multiplier 520. For example, as the combiners 810 and 815 of the operational circuit 410 are deactivated in the state 910, the mantissas Ia_M and Wa_M input to the ports 810-1 and 815-1 of the combiners 810 and 815, respectively, may be transmitted to the ports 520-1 and 520-2 of the multiplier 520 by bypassing the combiners 810 and 815. The deactivation of the combiners 810 and 815 may be controlled by a controller (e.g., the controller 420 of FIGS. 4A to 4B) connected to the operational circuit 410 and/or the operational circuit 410.

The multiplier 520 according to an embodiment may perform a multiplication operation on numerical values respectively indicated by 13 bits and 12 bits. For example, through the port 520-1, the multiplier 520 may receive a numerical value indicated along 13 bits. Through the port 520-2, the multiplier 520 may receive a numerical value indicated along 12 bits. When receiving Ia_M and Wa_M indicated based on 10 bits through each of the ports 520-1 and 520-2, the multiplier 520 may obtain Ia_M indicated by 13 bits and Wa_M indicated by 12 bits using a sign extension. The sign extension may be performed, for example, based on the each of Wa_s and Ia_s indicating respectively the sign of the numerical values Wa, Ia. In an embodiment, the multiplier 520 may perform multiplication operations on Ia_M and Wa_M respectively indicated by 13 bits and 12 bits. The multiplier 520 may output, for example, a product of Ia_M and Wa_M indicated by 24 bits through the port 520-3.

Referring to FIG. 9A, in state 910, exponents Wa_e and Ia_e of each of the numerical values Wa and Ia may be input to the ports 580-1 and 580-2 of the adder 580. The adder 580 may be activated by a controller connected to the operational circuit 410 and/or the operational circuit 410 in the state 610. The adder 580 may perform an addition operation on Wa_e and Ia_e indicated by 5 bits to output a sum of Wa_e and Ia_e through the port 580-3.

Referring to FIG. 9A, the shift register 570 may receive a product of Ia_M and Wa_M output from the multiplier 520 through the port 570-1. In the state where the product of Ia_M and Wa_M is received, as the sum of Wa_e and Ia_e is received through the port 570-2, the shift register 570 may shift the product of Ia_M and Wa_M based on the sum of the received Wa_e and Ia_e. Shifting the product of Ia_M and Wa_M based on the sum of Wa_e and Ia_e may correspond to an operation of normalizing a mantissa of a floating-point number. In state 910, based on the product of the normalized Ia_M and Wa_M, and the sum of Wa_e and Ia_e received from the adder 580, the shift register 570 may output bits indicating a product of floating-point numbers Wa and Ia through port 570-2.

Referring to FIG. 9A, in the state 910, the bit selector 825 and the bit adjuster 830 included in the converter 820 may be deactivated. As the bit selector 825 and the bit adjuster 830 are deactivated, the bit selectors 835 and 845 and the bit adjusters 840 and 850 connected to the bit selector 825 and the bit adjuster 830 may be deactivated. In the state 910, the switch 560 of the converter 820 may connect the port 560-2 corresponding to the port 570-3 of the shift register 570 among the ports 560-1 and 560-2 to the port 560-4 corresponding to the first channel O1. The connection between the ports 560-2 and 560-4 in switch 560 may be established by a signal SEL input through port 560-3 and, for example, provided from a controller corresponding to operational circuit 410. As the ports 560-2 and 560-4 are connected to each other, bits output from the port 520-3 of the multiplier 520 may be output through the port 560-4 of the switch 560.

As described above, in the state 610, the operational circuit 410 of the electronic device 101 according to an embodiment may output bits stored in the shift register 570 through the first channel O1. For example, the operational circuit 410 may output bits indicating a product of Wa and Ia according to bits (e.g., 32 bits) of number equal to or greater than 16 bits of the first data type by concatenating bits indicating the product of shifted Ia_M and Wa_M, bits indicating the sum of Wa_e and Ia_e, and bits indicating the sign of the product of Ia_M and Wa_M. Bits output through the first channel O1 and indicating the product of Wa and Ia may be stored, for example, in the first accumulation circuit 430-1 of FIG. 4B.

Figure 9B:
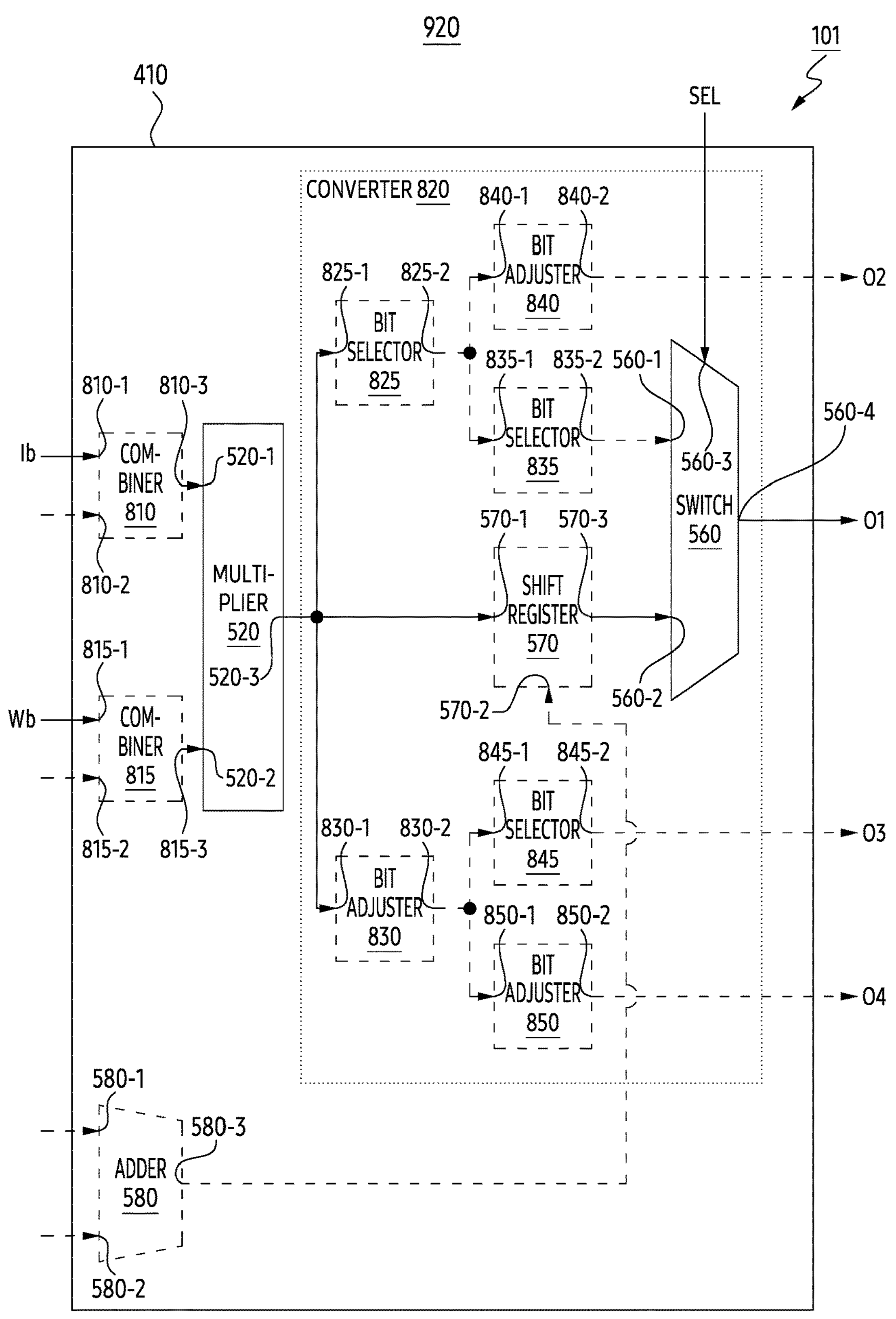

FIG. 9B is an exemplary diagram illustrating an operation of an operational circuit 410 in a state 920 that performs a multiplication operation based on a second data type for indicating an integer number. For example, the second data type may correspond to the data type INT8 of FIG. 9B.

Hereinafter, in a state 920 in which a multiplication operation based on a second data type for indicating an integer number along 8 bits is performed, an operation in which the electronic device 101 performs a multiplication operation of the numerical value Wb and the numerical value Ib using the operational circuit 410 will be described. For example, the numerical value Wb may be one of the weights allocated to the connection line of FIG. 3 and/or elements of a matrix indicating the kernel in the CNN. For example, the numerical value Ib may be one of the numerical values allocated to the node of FIG. 3 and/or elements of another matrix to be applied to the matrix indicating the kernel in the CNN.

Referring to FIG. 9B, in the state 920, numerical values Wb and Ib may be input to ports 520-1 and 520-2 of the multiplier 520. Similar to the state 910 of FIG. 9A, as the combiners 810 and 815 of the operational circuit 410 are deactivated, numerical values Ib and Wb input to the ports 810-1 and 815-1 of the combiners 810 and 815 may be transmitted to each of the ports 520-1 and 520-2 of the multiplier 520 by bypassing the combiners 810 and 815.

The multiplier 520 according to an embodiment may obtain Ib indicated by 13 bits and Wb indicated by 12 bits using a sign extension. The sign extension may be performed, for example, based on a bit indicating a sign of each of numerical values Wb and Ib (e.g., MSB of bits indicating numerical values Wb and Ib). The multiplier 520 may output, for example, a product of Wb and Ib indicated by 24 bits through the port 520-3.

Referring to FIG. 9B, in the state 620, the adder 580 may be deactivated, or bits indicating a specified numerical value (e.g., 0) may be input to the ports 580-1 and 580-2 of the adder 580. The deactivation of the adder 580 may be performed, for example, by a controller connected to the operational circuit 410 and/or the operational circuit 410 that identifies a request to perform a multiplication operation based on the second data type. As the adder 580 is deactivated, the bits transmitted by the adder 580 to the port 570-2 of the shift register 570 may indicate a specified numerical value (e.g., 0) that at least temporarily stops shifting of bits by the shift register 570.

Referring to FIG. 9B, in a state 920, similarly to the state 910, the bit selectors 825, 835, 845 and the bit adjusters 830, 840, 850 included in the converter 820 may be deactivated. In state 920, the switch 560 of the converter 820 may connect the port 560-2 corresponding to the port 570-3 of the shift register 570 to the port 560-4 based on the signal SEL received through the port 560-3. In this case, bits output from the port 570-3 of the shift register 570 and indicating the product of Wb and Ib may be output to the first channel O1 of the operational circuit 410 through the port 560-4. As the adder 580 is deactivated, bits input from the port 570-3 of the shift register 570 to the port 570-1 may be output independently of the shift. For example, bits (e.g., bits of numbers more than 8 bits of the second data type) indicating the product of Wb and Ib may be output to the first channel O1 of the operational circuit 410. Bits output through the first channel O1 and indicating the product of Wb and Ib may be stored, for example, in the first accumulation circuit 430-1 of FIG. 4A.

Figure 9C:
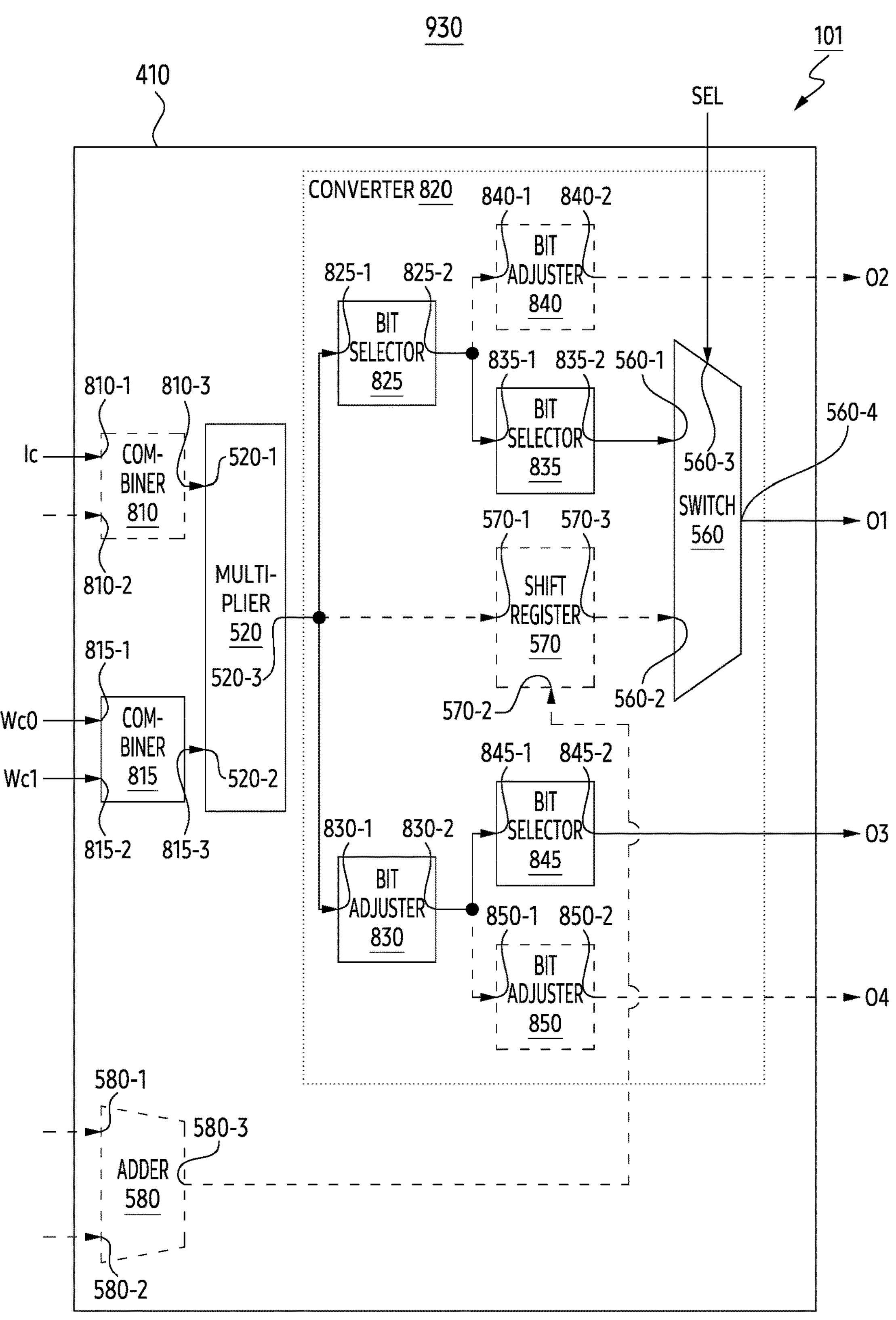

FIG. 9C is an exemplary diagram for describing an operation of operational circuit 410 in a state 930 that performs a multiplication operation based on a third data type for indicating an integer number, distinguished from the second data type of FIG. 9B. The third data type may correspond to, for example, the data type INT4 of FIG. 6C. Hereinafter, in a state 930 in which a multiplication operation based on a third data type for indicating an integer number along four bits is performed, an operation in which the electronic device 101 performs a multiplication operation of a numerical value Wc0, a numerical value We 1, and a numerical value Ic using the operational circuit 410 will be described. For example, the numerical value Wc0 and the numerical value Wc1 may be one of the weights allocated to the connection line of FIG. 3 and/or elements of a matrix indicating the kernel in the CNN. For example, the numerical value Ic may be one of the numerical values allocated to the node of FIG. 3 and/or elements of another matrix to be applied to the matrix indicating the kernel in the CNN. The multiplication operation based on the third data type may cause activation of all the first channel O1 and the third channel O3 independently of states 910 and 920 in which the first channel O1 is used in the first channel O1 and the second channel O2. The electronic device 101 according to an embodiment may output two numerical values (e.g., Wc0×Ic and Wc1×Ic) corresponding to a result of applying a multiplier (e.g., numeric value Ic) to each of the multiplicands (e.g., numerical value Wc0, numerical value Wc1) through the first channel O1 and the third channel O2.

Referring to FIG. 9C, in state 930, numerical values Wc0 and Wc1 may be input to ports 815-1 and 815-2 of the combiner 815. In response to identifying a request to perform a multiplication operation based on the third data type, the controller corresponding to the operational circuit 410 and/or the operational circuit 410 of the electronic device 101 may activate the combiner 815. In the activated state, the combiner 815 according to an embodiment may be received through each of the ports 815-1 and 815-2 and may combine bits corresponding to each of the numerical values Wc0 and Wc1. Combining bits corresponding to each of the numerical values Wc0 and Wc1 by the combiner 815 may be performed similarly to the operation of the combiner 510 of FIG. 6C.

Referring to FIG. 9C, in state 930, the multiplier 520 may perform a multiplication operation of bits indicating a numerical value Ic received through the port 520-1 and bits received through the port 520-2 and output from the port 815-3 of the combiner 815. In the state in which the combiner 815 is activated, the combiner 810 receiving the numerical value Ic may be deactivated. As the combiner 810 is deactivated, the numerical value Ic received through the port 810-1 may be transmitted to the port 520-1 of the multiplier 520 by bypassing the combiner 810. The multiplier 520 may output a result of performing a multiplication operation of bits received through the ports 520-1 and 520-2 through the port 520-3.

Referring to FIG. 9C, in the state 930, bit selectors 825, 835, and 845 included in the converter 820 and the bit adjuster 830 may be activated. The bit selector 825 may receive bits output from the port 520-3 of the multiplier 502 through the port 825-1. In response to receiving the bits, the bit selector 825 may extract a portion of the received bits (e.g., eight bits including an LSB and seven bits contacting the LSB). The bit selector 825 may output the extracted bits through the port 825-2. The bit selector 835 may receive bits selected by the bit selector 825 through the port 835-1 connected to the port 825-2 of the bit selector 825. The bit selector 835 may extract a portion of the bits received through the port 835-1 (e.g., four bits in contact with the LSB and the LSB) and output the extracted bits through the port 835-2. The switch 560 may output bits received from the port 560-1 among the ports 560-1 and 560-2 through the port 560-4, based on the signal SEL received through the port 560-3. Since the port 560-1 of the switch 560 corresponds to the port 835-2 of the bit selector 835, the switch 560 may output bits output from the bit selector 835 through the port 560-4. For example, bits output through the first channel O1 may correspond to the product of numerical values Wc0 and Ic.

Referring to FIG. 9C, in the state 930, the adder 580 may be deactivated. As the adder 580 is deactivated, the shift register 570 may directly output bits received from the port 570-1 through the port 570-3.

Bit adjuster 830 of operational circuit 410 according to an embodiment may adjust one or more other bits based on at least one of the received bits (e.g., bits corresponding to a specified number of digits) in response to receiving bits output from port 520-3 through port 830-1. The bit adjuster 830 may output the adjusted one or more other bits through the port 830-2. The bit selector 845 including a port 845-1 connected to the port 830-1 of the bit adjuster 830 may extract a portion of the bits (e.g., four bits in contact with the LSB and the LSB) adjusted by the bit adjuster 830 and output them through the port 840-2 corresponding to the third channel O3. The bits output through the third channel O3 may correspond to the product of the numerical values Wc1 and Ic. Numerical values output from each of the first channel O1 and the third channel O3 may be stored in each of the first accumulation circuit 430-1 and the third accumulation circuit 430-3 of FIG. 4B. The number of bits of each of the numerical values stored in each of the first accumulation circuit 430-1 and the third accumulation circuit 430-3 may be a number (e.g., 8 bits) or more of 4 bits of the third data type.

As described above, in a state in which a multiplication operation is performed based on the third data type of the state 930, the operational circuit 410 according to an embodiment may perform a multiplication operation between multipliers (e.g., numerical values Ic) and a plurality of multiplicand (e.g., numerical values Wc0, Wc1) and output a result of multiplying each of a plurality of multiplicands by a multiplier through different channels (e.g., the first channel O1 and the second channel O2). In state 930 of FIG. 9C, an operation in which the operational circuit 410 performs a multiplication operation between a plurality of multiplicands (e.g., numeric values Wc0, Wc1) and multipliers (e.g., a numerical value Ic) may be performed similarly to FIGS. 6C and/or 7.

Figure 9D:
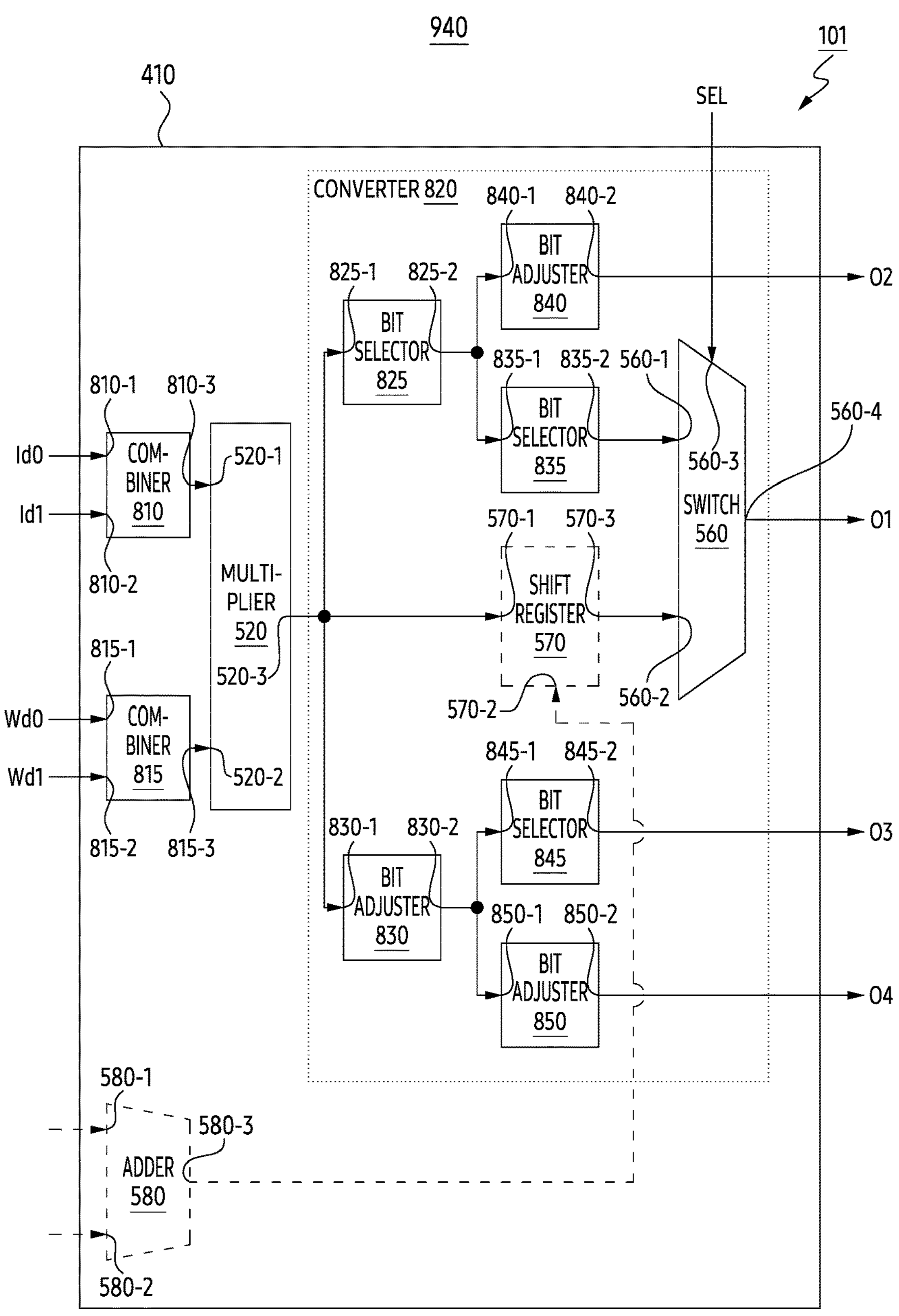

FIG. 9D is an exemplary diagram illustrating an operation of operational circuit 410 in a state 940 of performing a multiplication operation based on the fourth data type, which is distinguished from the second data type of FIG. 9C and indicates an integer number. The fourth data type may correspond to, for example, a data type INT2 for indicating a fixed-point number or an integer number along 2 bits. Hereinafter, an operation in which the electronic device 101 obtains products of combination of any one of the numerical values Wd0, Wd1 and any one of the numerical values Id0, Id1 by using the operational circuit 410 will be described, in a state 940 of performing a multiplication operation based on the fourth data type for indicating an integer number along 2 bits. For example, numerical values Id0 and Id1 are numerical values included in input data to be input to a specific layer among a plurality of layers of the neural network. For example, numerical values Wd0 and Wd1 are weights corresponding to the specific layer. The electronic device 101 according to an embodiment may activate all the first channels O1 to fourth channels O4 in a state 940 of performing multiplication operations based on the fourth data type. For example, the electronic device 101 may output four numerical values (e.g., Wd0×Id0, Wd1×Id0, Wd0×Id1 and Wd1×Id1) corresponding to a result of applying multipliers(e.g., numeric values Id0, Id1) to each of the multiplicands(e.g., numeric values Wd0, Wd1) through the first channel O1 to the fourth channel O4, respectively.

Referring to FIG. 9D, in state 940, as the combiner 810 is activated, multipliers (e.g., numerical values Id0 and Id1) input to the ports 810-1 and 810-2 may be combined by the combiner 810. For example, bits output through the port 810-3 of the combiner 810 may indicate the multipliers through different digits. In state 940, as the combiner 815 is activated, multiplicands (e.g., numerical values Wd0 and Wd1) input to the ports 815-1 and 815-2 may be combined by a combiner 815. For example, bits output through the port 815-3 of the combiner 815 may indicate the multiplicand through different digits. An operation of combining numerical values by the combiners 810 and 815 of the electronic device 101 according to an exemplary embodiment will be described later with reference to FIG. 10.

Referring to FIG. 9D, in state 940, the multiplier 520 may perform a multiplication operation of bits indicating each of combinations of multiplicands receiving through each of ports 520-1 and 520-2 and combinations of multipliers. The multiplier 520 may output a result of performing the multiplication operation through the port 520-3. In the state 940, the adder 580 of the operational circuit 410 may be deactivated.

Referring to FIG. 9D, in a state 940 of performing a multiplication operation based on a fourth data type, bit selectors 825, 835, and 845 and bit adjusters 830, 840, and 850 may be activated. The bit selector 825 may extract bits output from the multiplier 520, similar to the bit selector 825 in state 930 of FIG. 9C and/or the bit selector 540 of FIG. 6C (e.g., a portion of the bits output from the port 520-3) (e.g., 8 bits including LSB and 7 bits contiguous with LSB). The bit selector 825 may output the extracted bits through the port 825-2.

Referring to FIG. 9D, similar to the state 930 of FIG. 9C, the bit selector 835 may extract a portion of the bits received through the port 835-1 and output from the port 825-2 and output the bits through the port 835-2. As the switch 560 is controlled similarly to the state 930 of FIG. 9C, bits output through the port 835-2 may be output through the first channel O1 of the operational circuit 410. For example, bits output through the first channel O1 may indicate a product of numerical values Wd0×Id0. The bit adjuster 840 may adjust at least one of bits received through the port 840-1 and output from the port 825-2 to output the bits through the port 840-2 corresponding to the second channel O2. The bits output through the second channel O2 may indicate a product of numerical values Wd1×Id0.

Referring to FIG. 9D, similar to the bit selector 830 in state 930 of FIG. 9C and/or the bit adjuster 550 of FIG. 6C, the bit adjuster 830 may output a result of adjusting one or more other bits based on at least one of the bits outputs from the multiplier 520 through the port 830-2. The bits output through the port 830-2 may be transmitted to the port 845-1 of the bit selector 845 and the port 850-1 of the bit adjuster 850. Similar to the state 930, the bit selector 845 may extract a portion of the bits received through the port 845-1 and output the extracted bits to the port 840-2 corresponding to the third channel O3. The bits output through the third channel O3 may indicate a product of numerical values Wd0×d1. The bit adjuster 850 may output a result of adjusting bits received through the port 850-1 through the port 850-2 corresponding to the fourth channel O4. The bits output through the fourth channel O4 may indicate a product of numerical values Wd1×Id1. Numerical values output from each of the first channel O1 to the fourth channel O4 may be stored in each of the first accumulation circuits 430-1 to 430-4 of FIG. 4B. The number of bits of each of the numerical values stored in each of the first accumulation circuits 430-1 to the fourth accumulation circuits 430-4 may be a number (e.g., 4 bits) equal to or greater than the second bits of the fourth data type.

Hereinafter, in the state 940 of FIG. 9D, an example of an operation in which the operational circuit 410 according to an embodiment performs a multiplication operation between a plurality of multiplicand (e.g., numeric values Wd0 and Wd1) and a plurality of multipliers (e.g., numerical values Id0 and Id1) will be described.

Figure 10:
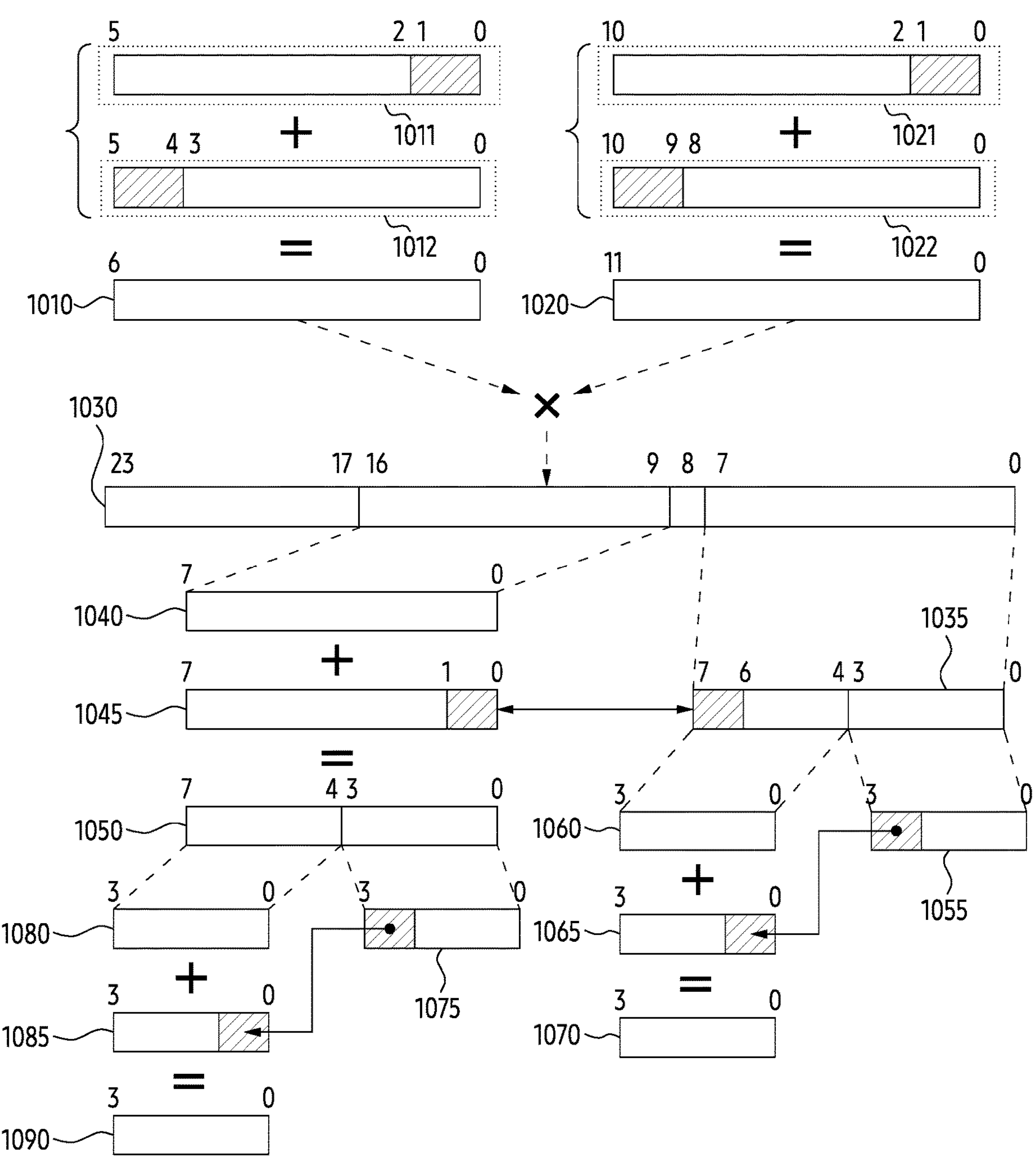
FIG. 10 is a diagram for explaining an operation of performing a multiplication operation of integer numbers using a multiplier related to a mantissa of a floating-point number in the operational circuit of FIG. 8

FIG. 10 is a diagram for explaining an operation of performing a multiplication operation on integer numbers using a multiplier related to a mantissa of a floating-point number in the operational circuit of FIG. 8. The electronic device of FIG. 10 may correspond to the electronic device 101 of FIGS. 1 to 2, 4A to 4B, 8 and 9A to 9D, and/or an example of the electronic device of FIG. 3.

Hereinafter, for example, as in the state 940 of FIG. 9D, based on a specified data type (e.g., the fourth data type of FIG. 9D) for indicating an integer number along 2 bits, an operation in which an electronic device performs a multiplication operation between a plurality of multiplicands (e.g., numerical values Wd0 and Wd1) and a plurality of multipliers (e.g., numerical values Id0, Id1) according to an embodiment will be described.

The first combiner (e.g., the combiner 810 of FIG. 9D) of the operational circuit according to an embodiment may combine bits indicating each of a plurality of multipliers in response to receiving a plurality of multipliers (e.g., numerical values Id0 and Id1). Referring to FIG. 10, 12 bits 1020 that the first combiner outputs by combining numerical values Id0 and Id1 indicated by 2 bits are illustrated. The bits 1020 output by the first combiner may correspond to the result of performing the binary addition operation on 11 bits 1021 obtained by performing a sign extension on a numerical value Id0 indicated by 2 bits and 11 bits 1022 obtained by shifting 2 bits indicating the numerical value Id1. For example, the first combiner may perform a binary addition operation based on 11 bits. For example, when numerical values Id0 and Id1 respectively correspond to 1 and −2, the bits 1021 are 00000000001 by performing a sign extension on the numerical value Id0, and the bits 1022 are 10000000000 by shifting the numerical value Id1.

The second combiner (e.g., a combiner 815 of FIG. 9D) of the operational circuit according to an embodiment may combine bits indicating each of a plurality of multiplicands, in response to receiving a plurality of multiplicands (e.g., weights Wd0, Wd1). Referring to FIG. 10, seven bits 1010 that the second combiner outputs by combining weights Wd0 and Wd1 indicated by 2 bits are illustrated. The bits 1010 output by the second combiner may correspond to a result of performing binary addition operations on the 6 bits 1011 obtained by performing a sign extension on the weight Wd0 indicated by 2 bits and the 6 bits 1012 obtained by shifting 2 bits indicating the weight Wd1. For example, the second combiner may perform a binary addition operation based on 6 bits. For example, when the weights Wd0 and Wd1 are −2 and −1, respectively, the bits 1011 are the sign-extended binary value 111110 of the weight Wd0, and the bits 1012 are the binary value 110000 obtained by shifting the weight Wd1.

The multiplier of the operational circuit according to an embodiment may output bits 1030 by performing a binary multiplication operation between bits 1010 and 1020 output from each of the first combiner and the second combiner. In the above example, the 24 bits 1030 output from the multiplier are P=000000000100011111101110 (an example in which the weights Wd0 and Wd1 are −2 and −1, and the numerical values Id0 and Id1 correspond to 1 and −2, respectively).

In an embodiment, the first bit selector (e.g., bit selector 825 of FIGS. 8 and/or 9D) connected to the multiplier may extract eight bits 1035 (e.g., P[7:0]) including LSB and seven bits adjacent to LSB from among bits 1030 indicating the output P of the multiplier. The first bit adjuster (e.g., the bit adjuster 830 of FIG. 8 and/or FIG. 9D) connected to the multiplier may adjust bits 1040 corresponding to a specified portion (e.g., P[16:9]) of the bits 1030 based on a bit different from the portion (e.g., P[8]). For example, the first bit adjuster may output bits 1050 indicating a result (P1=P[16:9]+P[8]) of adding bits 1045 (e.g., bits 1045 including P[8] and filled with zeros in the other digits) based on bits different from the portion. In the above example, the bits 1050 are P1=00100100.

Referring to FIG. 10, as described above with reference to FIG. 9D, the bits 1035 extracted by the first bit selector may be input to the second bit adjuster (e.g., the bit adjuster 840 of FIG. 9D) connected to the bit selector and the second bit selector (e.g., the bit selector 835 of FIG. 9D). The second bit selector may output a portion of the bits 1035 (e.g., bits 1055 corresponding to four bits (e.g., P[3:0]) including an LSB of the bits 1035 and three bits adjacent to the LSB). The bits 1055 may correspond to, for example, a product of Wd0×Id0 output through the first channel O1. In the above example, the bits 1055 are 1110 and correspond to Wd0×Id0 because −2=−2×1. The second bit adjuster may output bits 1070 indicating a result of adding bits 1065 based on bits (e.g., P[3]) of a specified digit among bits 1035 to four bits (e.g., P[7:4]) 1060 including an MSB and three bits adjacent to the MSB among the bits 1035. In the example above, bits 1070 correspond to −1=−1×1=Wd1×Id0 since P[7:4]+P[3]=1111. The bits 1070 may be output to the second channel O2 by the second bit adjuster.

Referring to FIG. 10, bits 1050 (e.g., bits indicating P1=P[16:9]+P[8]) output by the first bit adjuster may be input to a third bit adjuster (e.g., bit adjuster 850 in FIG. 9D) connected to the first bit adjuster and a third bit selector (e.g., bit selector 845 in FIG. 9D). The third bit selector may output a portion (e.g., four bits including an LSB of the bits 1050 and three bits adjacent to the LSB) (e.g., bits 1075 corresponding to P1[3:0]) of the bits 1050. The bits 1075 may correspond to, for example, a product of Wd0×Id1 output through a third channel O3. In the above example, since the bits 1075 are P1[3:0]=0100, they correspond to 4=−2×−2=Wd0×Id1. The bits 1075 may be output to the third channel O3 by the third bit selector. The third bit adjuster may output bits 1090 indicating a result of adding the bits 1085 based on a specified digit (e.g., P11[3]) among the bits 1050 to the four bits (e.g., P1[7:4]) 1080 including MSB and three bits adjacent to the MSB among the bits 1050. In the example above, bits 1090 correspond to 2=−1×−2=Wd1×Id1, since P1[7:4]+P1[3]=0010. For example, the operational circuit may simultaneously output all the products between two multiplicands and two multipliers.

For example, each of the bits that output through the first channel O1 to the fourth channel O4 and indicating, based on 4 bits, indication products between two multiplicands and two multipliers 1055, 1070, 1075, and 1090 may be accumulated in each of the first accumulation circuits 430-1 to fourth accumulation circuits 430-4 of FIG. 4B. The products that accumulated in each of the first accumulation circuits 430-1 to the fourth accumulation circuits 430-4 and indicated based on the 4 bits may be converted into the specified data type for indicating an integer number along two bits by a neural engine (e.g., the neural engine 240 of FIG. 4B). The products converted into the specified data type may correspond to a weighted sum of nodes included in a specific layer of a neural network.

As described above, the operational circuit of the electronic device according to an embodiment may perform a multiplication operation between one or more multiplicands based on different data types (e.g., FP16, INT8, INT4, INT2) and one or more multipliers. The data types may be independently set in each of a plurality of layers included in the neural network. As the operational circuit of the electronic device according to an embodiment performs a multiplication operation based on the data type of each of the layers, the size of data input and/or output by an NPU including an operational circuit into a memory may be differentiated according to the data type. As the size of the data is differentiated, traffic between the NPU and the memory may be reduced.

Hereinafter, operations of an electronic device according to an embodiment will be described with reference to FIGS. 11 to 15.

FIG. 11 is a flowchart 1100 illustrating an operation in which an electronic device processes input data based on a neural network according to an embodiment. The electronic device of FIG. 11 may correspond to an example of the electronic device of FIGS. 1 to 10. For example, the operation of the electronic device of FIG. 11 may be performed by the electronic device 101 of FIG. 2, the NPU 210, and/or the controller 260.

Referring to FIG. 11, in operation 1110, an electronic device according to an embodiment may identify a request to obtain output data from a neural network using input data. The request may be identified by, for example, an application executing on the processor of the electronic device (e.g., the processor 120 of FIG. 1 and/or FIG. 2). Referring to FIG. 2, in response to executing an instruction for calling an API related to a function related to the NPU 210 among instructions, processor 120 may identify at least one of input data to be input to NPU 210 or data type of the input data based on the executed instruction. The API may be called by an application (or system software included in an operating system) including functions related to a neural network such as face recognition, image recognition based on an always-on camera, voice recognition, and/or handwriting recognition. The API may cause at least partial activation of the NPU 210. The processor 120 may request the NPU 210 to obtain output data corresponding to the input data while transmitting the data type and input data. In one configuration, the instruction for calling an API related to a function related to NPU 210 may be generated by a compiler (e.g., a neural network compiler) for generating an instruction set for NPU 210. The instruction may indicate a data type of each of the layers included in the neural network. The instruction may indicate connections between nodes included in the layers (e.g., a graph).

Referring to FIG. 11, in operation 1120, the electronic device according to an embodiment may identify a plurality of weights distinguished by a plurality of layers of the neural network in the memory. For example, the electronic device may identify a plurality of weights indicating the neural network from the memory (e.g., the memory 130 of FIG. 1 and/or FIG. 2). Independently from identifying a plurality of weights, the electronic device may identify input data related to the request of operation 1110. The input data may include, for example, a data set corresponding to the input layer of the neural network.

Referring to FIG. 11, in operation 1130, the electronic device according to an embodiment may select at least one neural engine to perform operations based on weights corresponding to a specific layer among a plurality of layers, from among the neural engines of the NPU. The neural network of operation 1110 may include a sequence of a plurality of layers. As described below, the specific layer may be gradually selected from the first layer in a sequence of the plurality of layers. The selection of the neural engine by the electronic device according to an embodiment may be based on the number of times of calculating the weighted sum based on a specific layer.

Referring to FIG. 11, in operation 1140, the electronic device according to an embodiment may be the selected at least one neural engine and may input at least a portion of weights corresponding to a specific layer. The weight input to the neural engine may be a numerical value displayed according to a data type identifiable by one or more operational circuits (e.g., the operational circuit 410 of FIGS. 4A to 4B) included in the neural engine.

Referring to FIG. 11, in operation 1150, the electronic device according to an embodiment may transmit input data to at least one selected neural engine to obtain result data obtained by processing input data based on weights input to the neural engine. The input data may correspond to input data related to the request, and/or may include numerical values allocated to nodes included in the front layer of the specific layer in a sequence of the plurality of layers. The neural engine may obtain one or more weights and the weighted sum of the input data, using one or more operational circuits included in the neural engine, in response to receiving one or more weights of operation 1140 and input data of operation 1150. The operation of obtaining the weight sum by the one or more operational circuits may be performed, for example, similarly to FIG. 5 to FIG. 10.

Referring to FIG. 11, in operation 1160, the electronic device according to an embodiment may determine whether a specific layer of operations 1130 and 1140 corresponds to the last layer of a plurality of layers. When the specific layer does not correspond to the last layer (1160—no), in operation 1170, the electronic device according to an embodiment may select a next layer of a specific layer as a specific layer for obtaining result data. After selecting the next layer as the specific layer, the electronic device may repeatedly perform operations 1130, 1140, 1150, and 1160.

When the specific layer corresponds to the last layer (1160—yes), in operation 1180, the electronic device according to an embodiment may output the obtained result data as output data corresponding to the identified request. For example, the output data may correspond to data output from the last layer in the sequence of a plurality of layers related to the neural network of operation 1110. Referring to FIG. 2, the NPU 210 of the electronic device 101 according to an embodiment may output the output data of operation 1180 to the processor 120. When the NPU 210 outputs the output data to the processor 120, an event (or software interrupt) notifying the generation of the output data corresponding to the request of operation 111 may occur. In response to identifying the occurrence of the event, the processor 120 may execute one or more instructions corresponding to the event to execute one or more functions for processing the output data of operation 1180.

Hereinafter, operations of the neural engines of the operations 1130, 1140, and 1150 will be described in detail with reference to FIG. 12.

Figure 12:
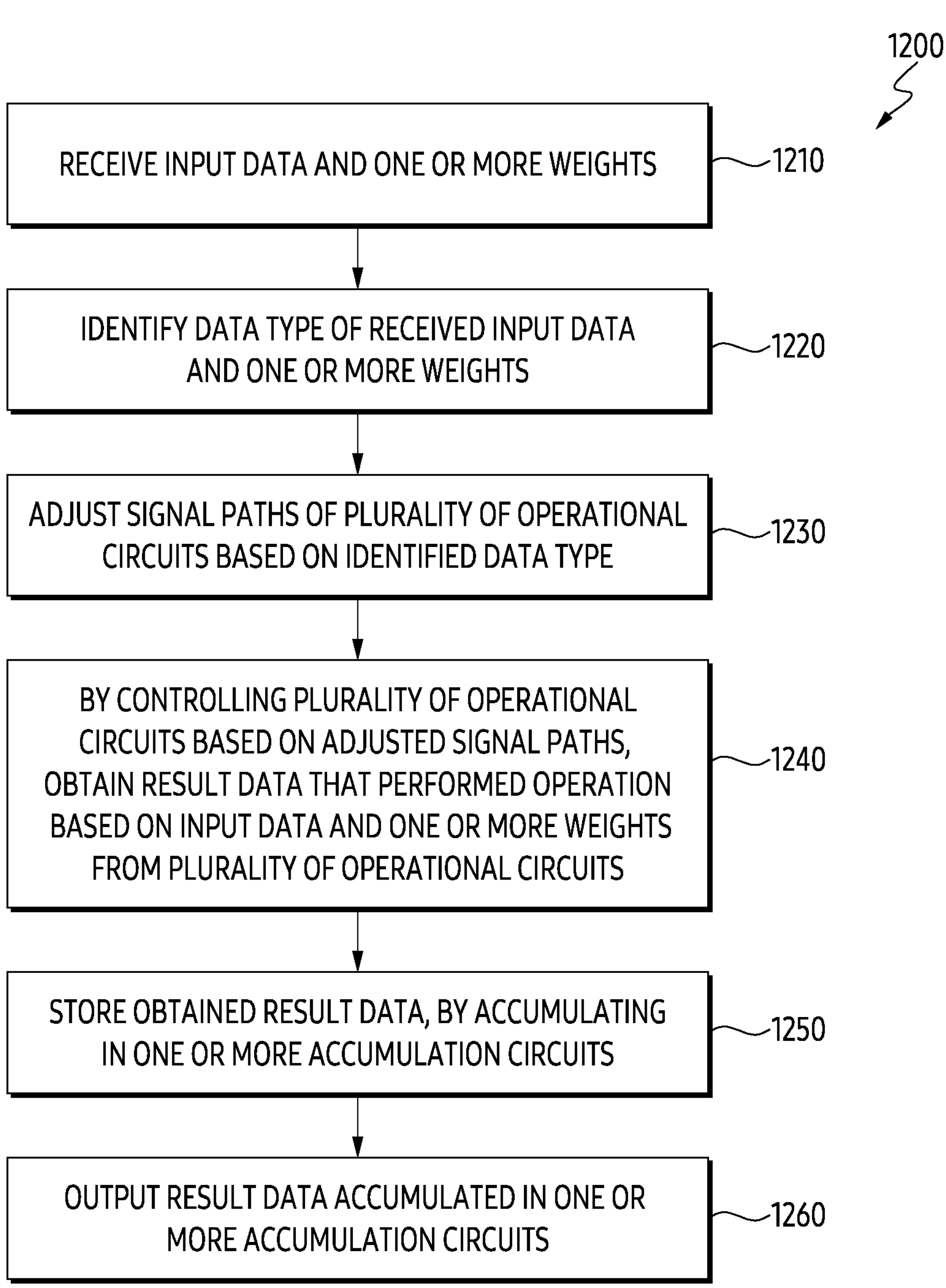
FIG. 12 is a flowchart for explaining an operation of controlling one or more neural engines by an electronic device according to an embodiment.

FIG. 12 is a flowchart 1200 illustrating an operation of controlling one or more neural engines by an electronic device according to an embodiment. The electronic device of FIG. 12 may correspond to an example of the electronic device of FIGS. 1 to 11. For example, the operation of the electronic device of FIG. 12 may be performed by the electronic device 101 of FIG. 2, the NPU 210, the neural engine 240 of FIGS. 4A to 4B, and/or the controller 420. For example, the operation of FIG. 12 may be related to the operations 1130, 1140, and 1150 of FIG. 11.

Referring to FIG. 12, in operation 1210, a neural engine of an electronic device according to an embodiment may receive input data and one or more weights. For example, the electronic device may input the input data and one or more weights to the neural engine by performing at least one of operations 1140 and 1150 of FIG. 11. Input data input to the neural engine and one or more weights may be stored in a buffer of the neural engine (e.g., buffer 250 of FIG. 2).

Referring to FIG. 12, in operation 1220, the neural engine of the electronic device according to an embodiment may identify the received input data and data types of one or more weights. The data type may be related to the number of bits used to indicate the input data and the one or more weights. The data type may match the data type of the input data or may be adjusted by the processor of the electronic device (e.g., the processor 120 of FIGS. 1 and/or 2). In an embodiment, the processor may change the data type based on the bandwidth of the memory (e.g., the memory 130 of FIG. 2). For example, when a portion of the bandwidth is occupied by another processor (e.g., processor 120 in FIG. 2 and/or GPU 220) different from the NPU (e.g., NPU 210 in FIG. 2) including the neural engine, the processor may change the data type to another data type in which a relatively small number of bits are used to the NPU to occupy less than another portion of the bandwidth so that less than another portion of the bandwidth is occupied by the NPU. For example, the processor may change the data type based on a parameter indicating a state of a battery, such as a state of charge (SoC). For example, when the battery has an SoC less than a specified threshold, the electronic device may change the data type to reduce power consumption of the NPU and the memory by the operations of FIG. 12.

Referring to FIG. 12, in operation 1230, the neural engine of the electronic device according to an embodiment may adjust signal paths of a plurality of operational circuits included in the neural engine based on the identified data type. For example, changing the signal path of the operational circuit by the neural engine may include controlling, activating, or deactivating combiner included in the operational circuit (e.g., combiners 510, 810, 815 of FIGS. 5 and/or 8), switch (e.g., switch 560 in FIG. 5 and/or FIG. 8), adder (e.g., the adder 580 of FIG. 5 and/or FIG. 8) and/or converters (e.g., converters 530 and 820 of FIGS. 5 and/or 8). An example in which a neural engine according to an embodiment adjusts a signal path according to a data type may correspond to FIGS. 6A to 6C and/or FIGS. 9A to 9D. Referring to FIG. 12, in operation 1240, the neural engine of the electronic device according to an embodiment may obtain result data of performing an operation based on input data and one or more weights from a plurality of operational circuits by controlling a plurality of operational circuits based on the controlled signal paths.

Referring to FIG. 12, in operation 1250, the electronic device according to an embodiment may accumulate and store result data obtained based on operation 1240 in one or more accumulated circuits. For example, the neural engine may accumulate numerical values output from each of a plurality of operational circuits in an accumulation circuit (e.g., the accumulation circuit 430 of FIGS. 4A to 4B). The operation of storing the result data in the accumulated circuit by the neural engine may be differentiated according to the data type identified in operation 1220.

Referring to FIG. 12, in operation 1260, the neural engine of the electronic device according to an embodiment may output result data accumulated in one or more accumulated circuits. For example, as the result data of operation 1150 of FIG. 11, the result data of operation 1260 may be output. The result data output by the neural engine of the electronic device may include, for example, numerical values allocated to each of nodes included in one layer among a plurality of layers included in the neural network.

FIG. 13 is a flowchart 1300 illustrating an operation in which an electronic device according to an embodiment, performs an operation based on different data types. The electronic device of FIG. 13 may correspond to an example of the electronic device of FIGS. 1 to 12. For example, the operation of the electronic device of FIG. 13 may be performed by the electronic device 101 of FIG. 2, the NPU 210, the neural engine 240, the operational circuit 410 of FIGS. 4A to 4B, and/or the controller 420. For example, the operation of FIG. 13 may be related to the operation 1240 of FIG. 12.

Referring to FIG. 13, in operation 1310, an operational circuit of an NPU of an electronic device according to an embodiment may receive input data and a weight. In operation 1320, the operational circuit of the NPU of the electronic device according to an embodiment may determine whether input data and weights of the first data type for indicating the floating-point number have been received in operation 1310.

In operation 1330, in response to receiving input data and weights of the first data type for indicating floating-point number (1320—yes), the operational circuit of the NPU of the electronic device according to an embodiment may obtain a result obtained by multiplying the mantissas from bits of the third port of the multiplier by inputting the mantissa of the first floating-point number indicated by the input data and the mantissa of the second floating-point number corresponding to the weight, respectively, the first port and the second port of the multiplier of the operational circuit. The multiplier of the operational circuit may include, for example, the multiplier 520 of FIGS. 5 and/or 8.

Referring to FIG. 13, in operation 1340, the operational circuit of the NPU of the electronic device according to an embodiment may obtain a result of adding exponents from the adder by inputting an exponent of the first floating-point number and an exponent of the second floating-point number in each of the first port and the second port of the adder. The adder of the operational circuit may include, for example, the adder 580 of FIGS. 5 and/or 8.

Referring to FIG. 13, in operation 1350, the operational circuit of the NPU of the electronic device according to an embodiment may obtain a third floating-point number corresponding to a result of multiplying the first floating-point number and the second floating-point number, based on the result obtained from the adder, by shifting the result obtained from the multiplier. Shifting the result obtained from the multiplier by the operational circuit may correspond to an example of an operation of normalizing a result obtained by multiplying mantissas output from the multiplier.

In operation 1360, in response to not receiving input data and weights of the first data type for indicating floating-point number (1320—no), the operational circuit may input a third integer number to which a first integer number and a second integer number indicated by input data based on the second data type are combined, to the first port of the multiplier and input a fourth integer number indicated by the second data type, to the second port. For example, in the state of receiving a first integer based on a second data type distinguished from the first data type, a second integer, and a fourth integer, the operational circuit may perform operation 1360. The third integer number to be input to the first port of the multiplier may be obtained, for example, based on the combiner 510 of FIG. 5.

Referring to FIG. 13, in operation 1370, the operational circuit of the NPU of the electronic device according to an embodiment may obtain a result of multiplying the first integer number and the fourth integer number and a result obtained by multiplying the second integer number and the fourth integer number based on the bits of the third port of the multiplier. For example, the operational circuit may obtain a fifth integer number indicating a result of multiplying the first integer number and the fourth integer number using a converter (e.g., the converter 530 of FIG. 5 and/or the converter 820 of FIG. 8) and a sixth integer number indicating the result of multiplying the second integer number and the fourth integer number.

Referring to FIG. 13, in operation 1380, an operational circuit of an NPU of an electronic device according to an embodiment may output a result of performing an operation related to input data and a weight. In the state of receiving input data and weights of the first data type (1320—yes), the result of outputting the operational circuit based on operation 1380 may include the third floating-point number of the operation 1350. In a state in which input data (e.g., the fourth integer number) of a second data type distinguished from the first data type, weights (e.g., the first integer number), and the second integer number are received, the electronic device may output the fifth integer number and the sixth integer number of operation 1370. For example, operations 1330, 1340, and 1350 may correspond to the state 610 of FIG. 6A and/or the state 910 of FIG. 9A.

Figure 14:
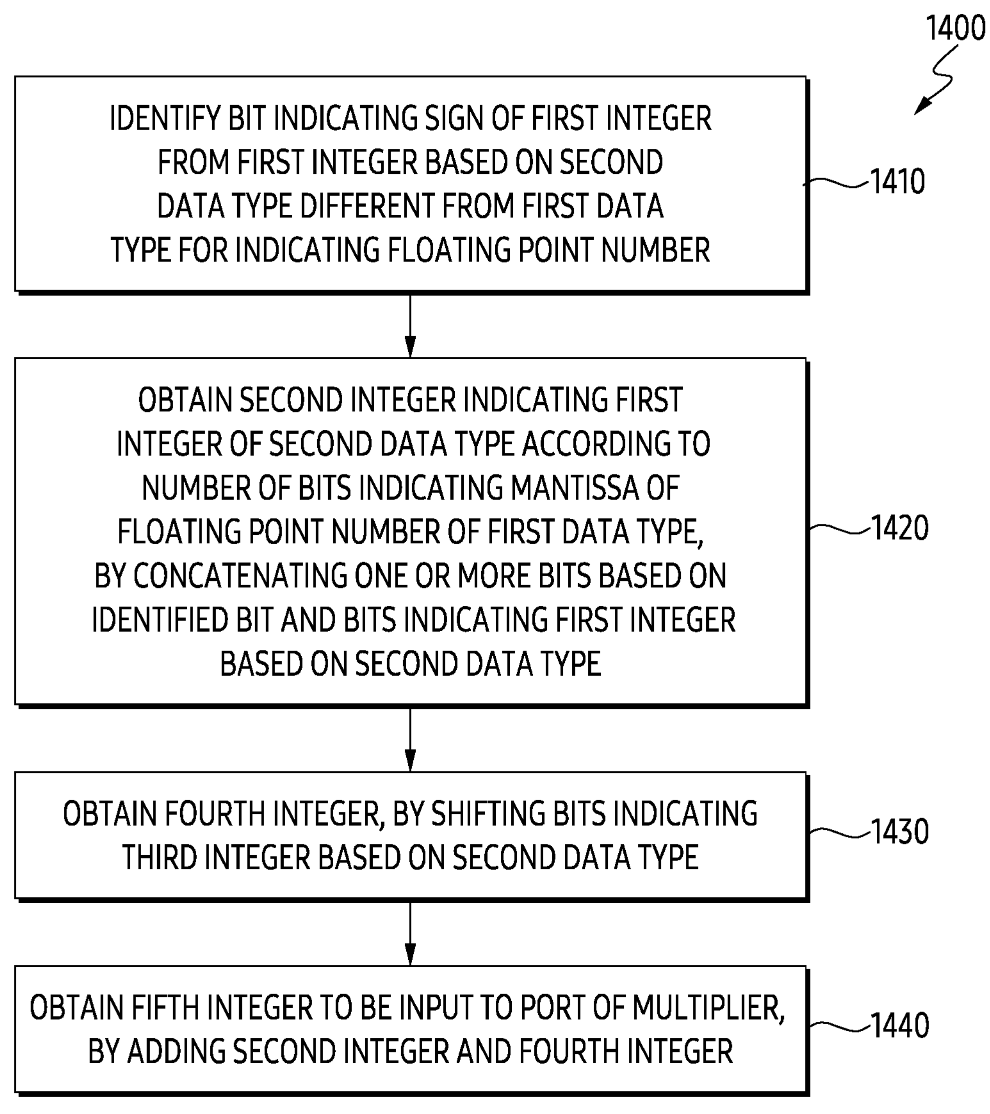
FIG. 14 is a flowchart for explaining an operation performed by an electronic device according to an embodiment to obtain one or more integer numbers to be input to a multiplier related to a mantissa of a floating-point number.

FIG. 14 is a flowchart 1400 for explaining an operation performed by an electronic device according to an embodiment to obtain one or more integer numbers to be input to a multiplier related to a mantissa of a floating-point number. The electronic device of FIG. 14 may correspond to an example of the electronic device of FIGS. 1 to 13. For example, the operation of the electronic device of FIG. 14 may be performed by the combiner 510 of FIG. 5 and/or the combiners 810 and 815 of FIG. 8.

Referring to FIG. 14, in operation 1410, a combiner included in an operational circuit of an electronic device according to an embodiment may identify a bit indicating a sign of the first integer number from a first integer number based on a second data type different from the first data type for indicating a floating-point number. The combiner may selectively perform operation 1410 in response to receiving the first integer number based on the second data type.

Referring to FIG. 14, in operation 1420, the combiner included in the operational circuit of the electronic device according to an embodiment may obtain a second integer indicating the first integer number of the second data type according to the number of bits indicating the mantissa of the floating-point number of the first data type by concatenating one or more bits based on the identified bit to bits indicating a first integer number based on the second data type. For example, in response to receiving the first integer number indicated along the four bits, the combiner may obtain a second integer number indicating the first integer number along 12 bits corresponding to the number of bits indicating the mantissa of the floating-point number. Concatenating one or more bits by a combiner based on operation 1420 may involve sign extension of a first integer number. The second integer number obtained by the combiner based on operation 1420 may correspond to, for example, an integer number indicated by the bits 712 of FIG. 7.

Referring to FIG. 14, in operation 1430, the combiner included in an operational circuit of an electronic device according to an embodiment may obtain a fourth integer by shifting bits indicating a third integer number based on the second data type. For example, a combiner may obtain the fourth integer number by shifting the bits indicating the third integer based on the number of bits indicating the mantissa of the floating-point number. The fourth integer number obtained by the combiner based on operation 1430 may correspond to, for example, an integer number indicated by the bits 714 of FIG. 7.

Referring to FIG. 14, in operation 1440, the combiner included in the operational circuit of the electronic device according to an embodiment may obtain a fifth integer number to be input to a port of the multiplier by adding the second integer and the fourth integer of each of the operations 1420 and 1430. The fifth integer number obtained by the combiner based on operation 1440 may correspond to, for example, an integer number indicated by the bits 710 of FIG. 7.

Figure 15:
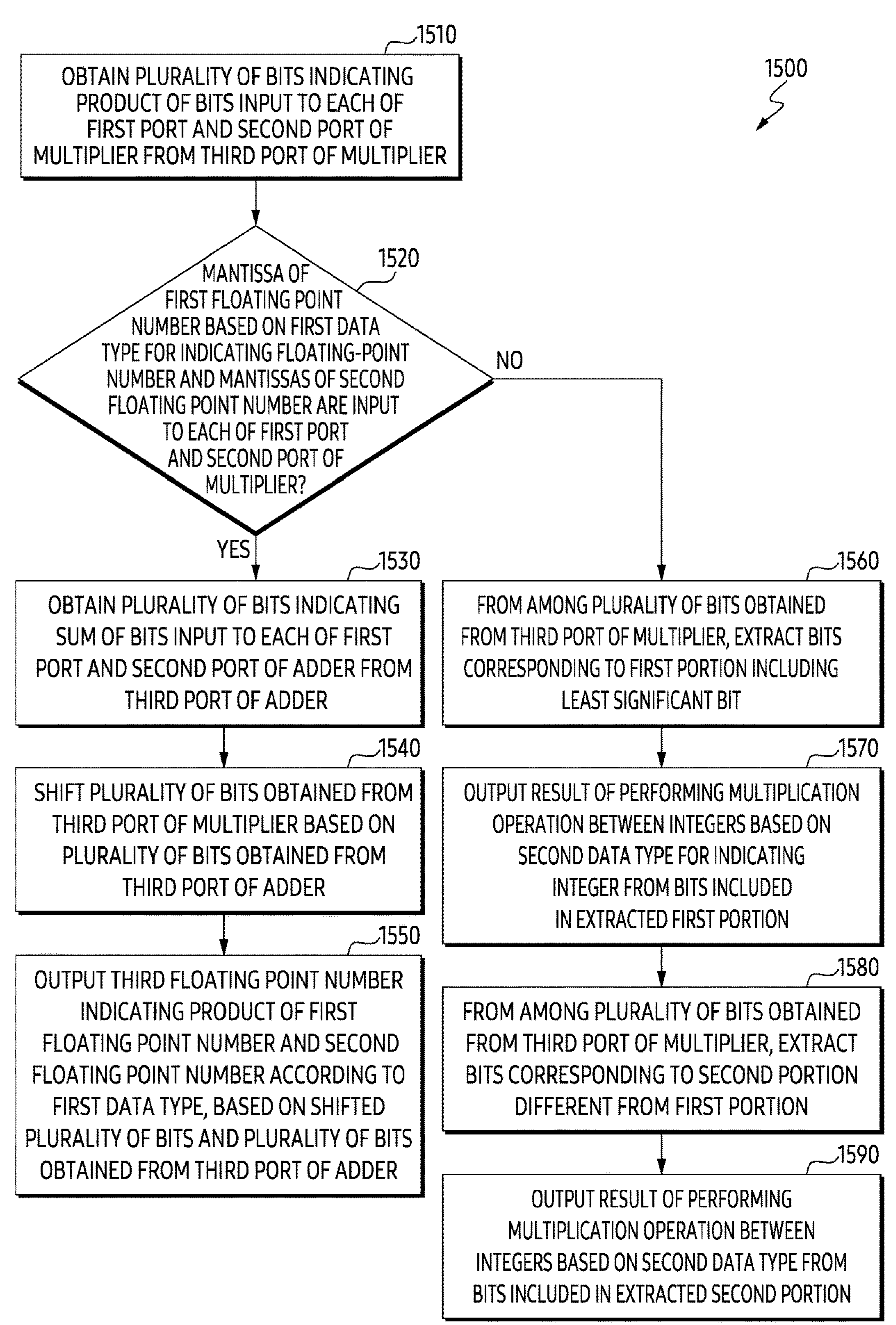
FIG. 15 is a flowchart for explaining an operation performed by an electronic device according to an embodiment based on bits output from a multiplier of an operational circuit.

FIG. 15 is a flowchart 1500 for explaining an operation performed by an electronic device according to an embodiment based on bits output from a multiplier of an operational circuit. The electronic device of FIG. 15 may correspond to an example of the electronic device of FIGS. 1 to 14. For example, the operation of the electronic device of FIG. 14 may be performed by the converter 530 of FIG. 5 and/or the converter 820 of FIG. 8.

Referring to FIG. 15, in operation 1510, the converter of the operational circuit of the electronic device according to an embodiment may obtain a plurality of bits indicating a product of bits input to each of the first port and the second port of the multiplier from the third port of the multiplier. In operation 1520, the converter of the electronic device according to an embodiment may determine whether a mantissa of the first floating-point number based on the first data type for indicating the floating-point number and a mantissa of a second floating-point number are input to each of the first port and the second port of the multiplier.

In operation 1530, in a state in which the mantissa of the first floating-point number and the mantissa of the second floating-point number based on a first data type are input to the first port and the second port of a multiplier, respectively (1520—Yes), the converter of the operational circuit of the electronic device according to an embodiment may obtain a plurality of bits indicating a sum of bits input to each of the first port and the second port of the adder from the third port of the adder. For example, the electronic device may perform operation 1530 similar to operation 1340 of FIG. 13.

Referring to FIG. 15, in operation 1540, the converter of the operational circuit of the electronic device according to an embodiment may shift the plurality of bits obtained from the third port of the multiplier based on the plurality of bits obtained from the third port of the adder. For example, the electronic device may perform operation 1540 similar to operation 1350 of FIG. 13. In operation 1550, the electronic device according to an embodiment may output a third floating-point number indicating a product of a first floating-point number and a second floating-point number based on the shifted plurality of bits and the plurality of bits obtained from the third port of the adder. The third floating point may be indicated based on the number of bits indicated by the first data type or more bits. The electronic device performing operations 1530, 1540, and 1550 may correspond to the state 610 of FIG. 6A and/or the state 910 of FIG. 9A.

In operation 1560, in a state in which bits based on a second data type different from the first data type are input to the first port and the second port of the multiplier (1520—NO), the converter of the operational circuit of the electronic device according to an embodiment may extract bits corresponding to the first portion including the least significant bit from among the plurality of bits obtained from the third port of the multiplier based on the operation 1510. In operation 1570, the converter of the operational circuit of the electronic device may output a result of performing a multiplication operation between integer numbers based on a second data type for indicating integer number from the bits included in the first portion extracted based on operation 1560. For example, when the operational circuit receives (e.g., weights Wc0 and Wc1 of FIG. 6C and/or FIG. 9C) and multiplier (e.g., numerical values Ic of FIG. 6C and/or FIG. 9C) indicated along the 4 bits, the electronic device may output the bits included in the extracted first portion as a product of a first multiplicand among the multiplicands and a multiplier. For another example, when the operational circuit receives multiplicands (e.g., weights Wd0 and Wd1 in FIG. 9D) and multipliers (e.g., numerical values Id0, Id1 of FIG. 9D) indicated along 2 bits, the electronic device may output a product of a first multiplicand and a first multiplier and a product of a second multiplicand and a first multiplier among the multiplicands from the bits included in the extracted first portion. Each of the product of the first multiplicand and the second multiplier and the product of the second multiplicand and the first multiplier may be expressed based on the 4 or more bits (e.g., 8 bits) of the second data type.

Referring to FIG. 15, in operation 1580, the converter of the operational circuit of the electronic device according to an embodiment may extract bits corresponding to a second portion contacting the first portion from a plurality of bits obtained from the third port of the multiplier. In operation 1590, the converter of the operational circuit of the electronic device may output a result of performing a multiplication operation between integer numbers based on the second data type from bits included in the extracted second portion. In the above example in which the operational circuit receives multiplicands (e.g., weights Wc0 and Wc1 of FIG. 6C and/or FIG. 9C) and multipliers (e.g., numerical values Ic of FIG. 6C and/or FIG. 9C) indicated along 4 bits, the electronic device may output bits included in the extracted second portion as a product of a second multiplicand among the multiplicands and a multiplier. In the other example above, in which the operational circuit receives multiplicands and multipliers indicated along 2 bits, the electronic device may output a product of a first multiplicand (e.g., weights Wd0, Wd1 in FIG. 9D) and a second multiplier (e.g., numerical values Id0, Id1 of FIG. 9D) and a product of a second multiplicand and a second multiplier among the multiplicands from the bits included in the extracted second portion. Each of the product of the first multiplicand and the second multiplier and the product of the second multiplicand and the second multiplier may be indicated based on the 4 or more bits (e.g., 8 bits) of the second data type.

According to an embodiment, an electronic device may includes an operational circuit. The operational circuit may includes a combiner to combine, in response to receiving a request for performing multiplication based on a plurality of integer numbers of a second data type for indicating integers that is different from a first data type for indicating floating-point numbers, a first integer number and a second integer number among the plurality of integer numbers. The operational circuit may includes a multiplier to obtain a product of bits corresponding to mantissas of the floating-point numbers, where in the bits are distinguished by the first data type, and wherein a third integer number of the plurality of integer numbers is inputted to a first port of the multiplier, and a fourth integer number indicating a combination of the first integer number and the second integer number is inputted to a second port of the multiplier. The operational circuit may includes a converter to output, in response to identifying a fifth integer number indicating a multiplication of the third integer number and the fourth integer number from a third port of the multiplier that is different from the first port and the second port, a sixth integer number indicating a multiplication of the first integer number and the third integer number, and a seventh integer number indicating a multiplication of the second integer number and the third integer number, based on the identified fifth integer number.

For example, the combiner may output the fourth integer number by combining the first integer number, being indicated according to the number of bits for indicating mantissa of a floating-point number of the first data type by using sign extension, and the second integer number, shifted based on a number of bits for indicating the integer number of the second data type.

For example, the converter may include a bit selector obtaining the sixth integer number by extracting bits corresponding to a first portion among bits of the third port indicating the fifth integer number; and a bit adjuster obtaining the seventh integer number based on bits corresponding to a second portion distinct from the first portion among the bits of the third port and at least one bit among bits indicating the sixth integer number.

For example, the bit adjuster of the converter may obtain the seventh integer number by combining one or more bits corresponding to the second portion and a most significant bit among the bits corresponding to the first portion.

For example, the electronic device may further include a shift register, and the converter may further include a switch transmits, in a state receiving the request, the sixth integer number to the shift register, and transmits, in another state receiving another request different from the request, the fifth integer number to the shift register.

For example, the multiplier may output, in response to identifying the fourth integer number outputted from the combiner, the fifth integer number by performing multiplication of the identified fourth integer number and the third integer number indicated according to number of bits for indicating a mantissa of a floating-point number in the first data type by using sign extension.

For example, the multiplier, in response to receiving another request different from the request for performing multiplication of a first floating-point number and a second floating-point number based on the first data type, by performing a multiplication of a first mantissa of the first floating-point number and a second mantissa of the second floating-point number, may output a third mantissa, wherein the first mantissas and the second mantissa may be input to the multiplier by bypassing the combiner.

For example, the operational circuit may further include an adder to output a third exponent, by performing adding of the first exponent of the first floating-point number and the second exponent of the second floating-point number; and a shift register to shift, based on the third exponent outputted from the adder, the third mantissa.

According to an embodiment, a method may includes combining, in response to receiving a request for performing multiplication based on a plurality of integer numbers of a second data type for indicating integers that is different from a first data type for indicating floating-point numbers, a first integer number and a second integer number among the plurality of integer numbers; transmitting, to a first port of a multiplier for obtaining a product of bits corresponding to mantissas of the floating-point numbers distinguished by the first data type, a third integer number of the plurality of integer numbers based on number of bits of the mantissas The method may includes transmitting, in a state transmitting the third integer number to the first port, a fourth integer number indicating a combination of the first integer number and the second integer number to a second port of the multiplier different from the first port. The method may includes obtaining, in response to identifying a fifth integer number indicating a multiplication of the third integer number and the fourth integer number from a third port of the multiplier that is different from the first port and the second port of the multiplier, a sixth integer number indicating a multiplication of the first integer number and the third integer number, and a seventh integer number indicating a multiplication of the second integer number and the third integer number, based on the identified fifth integer number.

For example, the combining may further include identifying the first integer number, by using sign extension, according to number of bits indicating a mantissa of the floating-point number in the first data type; shifting the second integer number based on number of bits indicating an integer number in the second data type and based on the first integer number; and obtaining, by adding the first integer number indicated according to a mantissa of the floating-point number and the shifted second integer number, the fourth integer number.

For example, the obtaining may further include obtaining a sixth integer number, by extracting bits corresponding to a first portion of the bits of the third port indicating the fifth integer number; and obtaining a seventh integer number, based on bits corresponding to a second portion different from the first portion of the bits of the third port and at least one bit indicating the sixth integer number.

For example, the obtaining the seventh integer number may further include obtaining the seventh integer number by combining a most significant bit of the bits corresponding to the first portion and one or more bits corresponding to the second portion.

For example, the transmitting the third integer number may further include transmitting the third integer number indicated according to number of bits indicating a mantissa of a floating-point number in the first data type by using sign extension.

For example, the method may further include inputting, in response to receiving another request for performing multiplication of a first floating-point number and a second floating-point number based on the first data type, a first mantissa of the first floating-point number to the first port of the multiplier, and a second mantissa of the second floating-point number to the second port of the multiplier; and obtaining, in a state inputting the first mantissa to the first port and the second mantissa to the second port, a third mantissa corresponding to multiplication of the first mantissa and the second mantissa from the third port of the multiplier.

For example, the method may further include obtaining, in response to receiving another request, a third exponent by performing adding of a first exponent of the first floating-point number and a second exponent of the second floating-point number; and shifting the third mantissa based on the obtained third exponent.

According to an embodiment, an electronic device may includes a first combiner to combine, in response to receiving a request for performing multiplication based on a plurality of integer numbers of a second data type for indicating integers that is different from a first data type for indicating floating-point numbers, a first integer number and a second integer number among the plurality of integer numbers. The electronic device may includes a second combiner to combine, in response to receiving the request, a third integer number and a fourth integer number among the plurality of integer numbers. The electronic device may includes a multiplier obtaining multiplication of bits corresponding to mantissas of the floating-point numbers distinguished by the first data type, wherein a fifth integer number indicating combination of the first integer number and the second integer number by the first combiner is inputted to a first port of the multiplier, and a sixth integer number indicating a combination of the third integer number and the fourth integer number by the second combiner. The electronic device may includes a converter to obtain, in response to identifying a seventh integer number indicating multiplication of the fifth integer number and the sixth integer number from a third port different from the first port and the second port of the multiplier, based on the seventh integer number, multiplication of one of the first integer number and the second integer number, and one of the third integer number or the third integer number.

For example, the multiplier may receive, in response to identifying another request for performing multiplication regarding a first floating-point number and a second floating-point number in the first data type, a first mantissa of the first floating-point number via the first port and a second mantissa of the second floating-point number via the second port, by bypassing the first combiner and the second combiner.

For example, the electronic device may further include an adder to output, in response to receiving the another request, a third exponent by performing adding of a first exponent of the first floating-point number and a second exponent of the second floating-point number; and a shift register to shift, based on the third exponent outputted from the adder, a third mantissa corresponding to multiplication of the first mantissa and the second mantissa that is outputted from the multiplier.

For example, the first combiner may output the fifth integer number by combining the first integer number, being indicated based on bits exceeding the number of bits indicating an integer number of the second data type by using sign extension, and the second integer number shifted based on the number of bits for indicating an integer number of the second data type.

For example, the converter may include a first bit selector to extract bits corresponding to a first portion of bits of the third port indicating the seventh integer number; a second bit selector to obtain, by extracting bits corresponding to a third portion including a least significant bit among bits extracted from the first bit selector, multiplication of the first integer number and the third integer number; a first bit adjuster to obtain, by adjusting bits corresponding to a fourth portion different from the third portion among bits extracted from the first bit selector based on at least one bits corresponding to the third portion, multiplication of the first integer number and the fourth integer number; a second bit adjuster to adjust, based on at least one bits corresponding to the first portion, bits corresponding to a second portion different from the first portion among bits of the third port; a third bit selector to obtain, by extracting bits corresponding to a fifth portion including a least significant bit among bits adjusted by the second bit adjuster, multiplication of the second integer number and the third integer number; and a third bit adjuster to obtain, by adjusting bits corresponding to a sixth portion different from the fifth portion among bits adjusted by the second bit adjuster, multiplication of the second integer number and the fourth integer number.

According to an embodiment, a method may includes, in response to receiving a request for performing multiplication based on a plurality of integer numbers of a second data type for indicating integers that is different from a first data type for indicating floating-point numbers, combining a first integer number and a second integer number among the plurality of integer numbers. The method may includes, in response to receiving the request, combining a third integer number and a fourth integer number among the plurality of integer numbers; inputting each of the fifth integer number indicating a combination of the first integer number and the second integer number and the sixth integer number indicating a combination of the third integer number and the fourth integer number into a first port and a second port of a multiplier for obtaining a product of bits corresponding to mantissas of the floating-point numbers distinguished by the first data type. The method may includes, in response to identifying a seventh integer number indicating multiplication of the fifth integer number and the sixth integer number from a third port different from the first port and the second port of the multiplier, based on the seventh integer number, obtaining multiplication of one of the first integer number or the second integer number, and one of the third integer number or the third integer number.

According to an embodiment, an electronic device may includes a processor; a memory; and a neural processing unit comprising a neural engine for training a neural network having a plurality of layers, the neural engine includes: an accumulation circuit; and an operational circuit comprising a combiner, a multiplier, an adder, and a converter, the converter comprising a bit selector, a bit adjuster, a switch, and a shift register. The controller may accumulate and store, in the accumulation circuit, numerical values output from different channels of the operational circuit to calculate a weighted sum corresponding to nodes included in a specific layer of the neural network. The controller may selectively activates at least one of the combiner, the adder, the bit selector, or the bit adjuster based at least in part on an operating state.

For example, the neural network engine may combines, using the combiner, in response to receiving a request for performing multiplication based on a plurality of integer numbers of a second data type for indicating integers that is different from a first data type for indicating floating-point numbers, a first integer number and a second integer number among the plurality of integer numbers. The neural engine may obtains, using the multiplier, a product of bits corresponding to mantissas of the floating-point numbers, wherein the bits are distinguished by the first data type, and wherein a third integer number of the plurality of integer numbers is inputted to a first port of the multiplier, and a fourth integer number indicating a combination of the first integer number and the second integer number is inputted to a second port of the multiplier. The neural engine may outputs, using the converter, in response to identifying a fifth integer number indicating a multiplication of the third integer number and the fourth integer number from a third port of the multiplier that is different from the first port and the second port, a sixth integer number indicating a multiplication of the first integer number and the third integer number, and a seventh integer number indicating a multiplication of the second integer number and the third integer number, based on the identified fifth integer number.

The device described above may be implemented as a hardware component, a software component, and/or a combination of a hardware component and a software component. For example, the devices and components described in the embodiments may be implemented with one or more general purpose computers, such as a processor, a controller, ALU (arithmetic logic unit), a digital signal processor, a microcomputer, FPGA (field programmable gate array), PLU(programmable logic unit), microcomputer, or any other device that may execute and respond to instructions. The processing apparatus may perform an operating system OS and one or more software applications performed on the operating system. In addition, the processing device may access, store, manipulate, process, and generate data in response to the execution of the software. For convenience of understanding, one processing device may be described as being used, but those skilled in the art may see that the processing device may include a plurality of processing elements and/or a plurality of types of processing elements. For example, the processing apparatus may include a plurality of processors or one processor and one controller. Other processing configurations, such as parallel processors, are also possible.

The software may include a computer program, code, instruction, or a combination of one or more of them, and may configure the processing unit to behave as desired or command the processing unit independently or collectively. Software and/or data may be interpreted by the processing unit or embodied in any type of machine, component, physical device, computer storage medium, or device to provide instructions or data to the processing unit. Software may be distributed over networked computer systems and stored or executed in a distributed manner. Software and data may be stored in one or more computer-readable recording media.

The method according to the embodiment may be implemented in the form of a program instruction that may be performed through various computer means and recorded in a computer-readable medium. In this case, the medium may continue to store a computer-executable program or may temporarily store the program for execution or download. In addition, the medium may be various recording or storage means in the form of a single or several pieces of hardware combined but is not limited to a medium directly connected to a computer system and may exist distributed on a network. Examples of media may include magnetic media such as hard disks, floppy disks and magnetic tapes, optical recording media such as CD-ROM and DVD, magneto-optical media such as optical disks, and program instructions such as ROM, RAM, and flash memory. Examples of other media may include recording media or storage media managed by an app store that distributes applications, sites that supply or distribute various other software, and servers.

Although embodiments have been described according to limited embodiments and drawings as above, various modifications and modifications are possible from the above description to those of ordinary skill in the art. For example, appropriate results may be achieved even if the described techniques are performed in a different order from the described methods, and/or components such as systems, structures, devices, circuits, etc. are combined or combined in different forms from the described methods or replaced by other components or equivalents.

Therefore, other implementations, other embodiments, and equivalents to the scope of claims are also within the scope of claims described later.

What is claimed is:

1. An electronic device, comprising an operational circuitry, the operational circuitry comprising:

a combiner circuitry to combine, in response to receiving a request for performing multiplication based on a plurality of integer numbers of a second data type for indicating integers that is different from a first data type for indicating floating-point numbers, a first integer number and a second integer number among the plurality of integer numbers;

a multiplier circuitry to obtain a product of bits corresponding to mantissas of the floating-point numbers, wherein the bits are distinguished by the first data type, and wherein a third integer number of the plurality of integer numbers is inputted to a first port of the multiplier, and a fourth integer number indicating a combination of the first integer number and the second integer number is inputted to a second port of the multiplier; and a conversion circuitry to output, in response to identifying a fifth integer number indicating a multiplication of the third integer number and the fourth integer number from a third port of the multiplier that is different from the first port and the second port, a sixth integer number indicating a multiplication of the first integer number and the third integer number, and a seventh integer number indicating a multiplication of the second integer number and the third integer number, based on the identified fifth integer number.

2. The electronic device of claim 1, wherein the combiner circuitry outputs the fourth integer number by combining the first integer number, indicated according to a number of bits for indicating a mantissa of a floating-point number of the first data type by using a sign extension, and the second integer number, shifted based on a number of bits for indicating the integer number of the second data type.

3. The electronic device of claim 1, wherein the conversion circuitry comprises:

a bit selection circuitry obtaining the sixth integer number by extracting bits corresponding to a first portion among bits of the third port indicating the fifth integer number; and a bit adjustment circuitry obtaining the seventh integer number based on bits corresponding to a second portion distinct from the first portion among the bits of the third port and at least one bit among bits indicating the sixth integer number.

4. The electronic device of claim 3, wherein the bit adjustment circuitry of the conversion circuitry obtains the seventh integer number by combining one or more bits corresponding to the second portion and a most significant bit among the bits corresponding to the first portion.

5. The electronic device of claim 3, wherein the conversion circuitry comprising:

a shift register; and a switch transmitting, in a state receiving the request, the sixth integer number to the shift register, and transmitting, in another state receiving another request different from the request, the fifth integer number to the shift register.

6. The electronic device of claim 1, wherein the multiplier circuitry outputs, in response to identifying the fourth integer number outputted from the combiner circuitry, the fifth integer number by performing multiplication of the identified fourth integer number and the third integer number indicated according to number of bits for indicating a mantissa of a floating-point number in the first data type by using sign extension.

7. The electronic device of claim 1, wherein the multiplier circuitry, in response to receiving another request different from the request for performing multiplication of a first floating-point number and a second floating-point number based on the first data type, by performing a multiplication of a first mantissa of the first floating-point number and a second mantissa of the second floating-point number, outputs a third mantissa, and wherein the first mantissa and the second mantissa are input to the multiplier by bypassing the combiner circuitry.

8. The electronic device of claim 7, wherein the operational circuitry further comprises:

an adder circuitry to output a third exponent by adding the first exponent of the first floating-point number and the second exponent of the second floating-point number; and a shift register to shift, based on the third exponent outputted from the adder, the third mantissa.

9. A method of electronic device, comprising:

combining, in response to receiving a request for performing multiplication based on a plurality of integer numbers of a second data type for indicating integers that is different from a first data type for indicating floating-point numbers, a first integer number and a second integer number among the plurality of integer numbers;

transmitting, to a first port of a multiplier for obtaining a product of bits corresponding to mantissas of the floating-point numbers distinguished by the first data type, a third integer number of the plurality of integer numbers based on number of bits of the mantissas;

transmitting, in a state that the third integer number is transmitted to the first port, a fourth integer number indicating a combination of the first integer number and the second integer number to a second port of the multiplier different from the first port; and obtaining, in response to identifying a fifth integer number indicating a multiplication of the third integer number and the fourth integer number from a third port of the multiplier that is different from the first port and the second port of the multiplier, a sixth integer number indicating a multiplication of the first integer number and the third integer number, and a seventh integer number indicating a multiplication of the second integer number and the third integer number, based on the identified fifth integer number.

10. The method of claim 9, wherein the combining further comprises:

identifying the first integer number, by using sign extension, according to number of bits indicating a mantissa of the floating-point number in the first data type;

shifting the second integer number based on number of bits indicating an integer number in the second data type and based on the first integer number; and obtaining, by adding the first integer number indicated according to a mantissa of the floating-point number and the shifted second integer number, the fourth integer number.

11. The method of claim 9, wherein the obtaining further comprises:

obtaining a sixth integer number, by extracting bits corresponding to a first portion of the bits of the third port indicating the fifth integer number; and obtaining a seventh integer number, based on bits corresponding to a second portion different from the first portion of the bits of the third port and at least one bit indicating the sixth integer number.

12. The method of claim 11, wherein the obtaining the seventh integer number further comprises:

obtaining the seventh integer number by combining a most significant bit of the bits corresponding to the first portion and one or more bits corresponding to the second portion.

13. The method of claim 9, wherein the transmitting the third integer number further comprises:

transmitting the third integer number indicated according to number of bits indicating a mantissa of a floating-point number in the first data type by using sign extension.

14. The method of claim 9, further comprising:

inputting, in response to receiving another request for performing multiplication of a first floating-point number and a second floating-point number based on the first data type, a first mantissa of the first floating-point number to the first port of the multiplier, and a second mantissa of the second floating-point number to the second port of the multiplier; and obtaining, in a state that the first mantissa is inputted to the first port and the second mantissa is inputted to the second port, a third mantissa corresponding to multiplication of the first mantissa and the second mantissa from the third port of the multiplier.

15. The method of claim 14, further comprising:

obtaining, in response to receiving the another request, a third exponent by performing adding of a first exponent of the first floating-point number and a second exponent of the second floating-point number; and shifting the third mantissa based on the obtained third exponent.

16. An electronic device, comprising:

a first combiner circuitry to combine, in response to receiving a request for performing multiplication based on a plurality of integer numbers of a second data type for indicating integers that is different from a first data type for indicating floating-point numbers, a first integer number and a second integer number among the plurality of integer numbers;

a second combiner circuitry to combine, in response to receiving the request, a third integer number and a fourth integer number among the plurality of integer numbers;

a multiplier circuitry to obtain multiplication of bits corresponding to mantissas of the floating-point numbers distinguished by the first data type, wherein a fifth integer number indicating combination of the first integer number and the second integer number by the first combiner circuitry is inputted to a first port of the multiplier, and a sixth integer number indicating a combination of the third integer number and the fourth integer number by the second combiner circuitry;

a conversion circuitry to obtain, in response to identifying a seventh integer number indicating multiplication of the fifth integer number and the sixth integer number from a third port different from the first port and the second port of the multiplier, based on the seventh integer number, multiplication of one of the first integer number or the second integer number, and one of the third integer number or the fourth integer number.

17. The electronic device of claim 16, wherein the multiplier circuitry receives, in response to identifying another request for performing multiplication regarding a first floating-point number and a second floating-point number in the first data type, a first mantissa of the first floating-point number via the first port and a second mantissa of the second floating-point number via the second port, by bypassing the first combiner circuitry and the second combiner circuitry.

18. The electronic device of claim 17, further comprising:

an adder circuitry to output, in response to receiving the another request, a third exponent by performing adding of a first exponent of the first floating-point number and a second exponent of the second floating-point number; and a shift register to shift, based on the third exponent outputted from the adder, a third mantissa corresponding to multiplication of the first mantissa and the second mantissa that is outputted from the multiplier.

19. The electronic device of claim 16, wherein the first combiner circuitry outputs the fifth integer number by combining the first integer number, being indicated based on bits exceeding the number of bits indicating an integer number of the second data type, using sign extension, and the second integer number shifted based on the number of bits indicating an integer number of the second data type.

20. The electronic device of claim 16, wherein the conversion circuitry further comprises:

a first bit selection circuitry to extract bits corresponding to a first portion of bits of the third port indicating the seventh integer number;

a second bit selection circuitry to obtain, by extracting bits corresponding to a third portion including a least significant bit among bits extracted from the first bit selection circuitry, multiplication of the first integer number and the third integer number;

a first bit adjustment circuitry to obtain, by adjusting bits corresponding to a fourth portion different from the third portion among bits extracted from the first bit selection circuitry based on at least one bit corresponding to the third portion, multiplication of the first integer number and the fourth integer number;

a second bit adjustment circuitry to adjust, based on at least one bit corresponding to the first portion, bits corresponding to a second portion different from the first portion among bits of the third port;

a third bit selection circuitry to obtain, by extracting bits corresponding to a fifth portion including a least significant bit among bits adjusted by the second bit adjustment circuitry, multiplication of the second integer number and the third integer number; and a third bit adjustment circuitry to obtain, by adjusting bits corresponding to a sixth portion different from the fifth portion among bits adjusted by the second bit adjustment circuitry, multiplication of the second integer number and the fourth integer number.

* * * * *